(12) United States Patent
Mueck et al.

(10) Patent No.: US 10,924,306 B2
(45) Date of Patent: Feb. 16, 2021

(54) COMMUNICATION DEVICE AND METHOD FOR RADIO COMMUNICATION

(71) Applicant: Intel IP Corporation, Santa Clara, CA (US)

(72) Inventors: Markus Dominik Mueck, Unterhaching (DE); Ingolf Karls, Feldkirchen (DE); Christian Drewes, Germering (DE); Erfan Majeed, Duisburg (DE); Guido Bruck, Voerde (DE); Peter Jung, Duisburg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/490,117

(22) PCT Filed: Mar. 14, 2018

(86) PCT No.: PCT/US2018/022295
§ 371 (c)(1),
(2) Date: Aug. 30, 2019

(87) PCT Pub. No.: WO2018/182970
PCT Pub. Date: Oct. 4, 2018

(65) Prior Publication Data
US 2020/0076653 A1     Mar. 5, 2020

(30) Foreign Application Priority Data

Mar. 31, 2017   (EP) .................................. 17164234

(51) Int. Cl.
*H04B 7/02*   (2018.01)
*H04L 25/03*   (2006.01)
(Continued)

(52) U.S. Cl.
CPC ....... *H04L 25/03343* (2013.01); *H04B 7/043* (2013.01); *H04B 7/0421* (2013.01);
(Continued)

(58) Field of Classification Search
CPC .......... H04L 25/03343; H04L 25/0248; H04L 25/03961; H04B 7/0421; H04B 7/043;
(Continued)

(56) References Cited

U.S. PATENT DOCUMENTS

2008/0304587 A1* 12/2008 Setoh .................. H04L 27/2662
375/260
2009/0286482 A1   11/2009 Gorokhov et al.
(Continued)

FOREIGN PATENT DOCUMENTS

EP   2639969 A1   9/2013

OTHER PUBLICATIONS

Cadambe V R et al, "Interference Alignment and Degrees of Freedom of the K-User Interference Channel", IEEE Transactions on Information Theory, Aug. 2008, pp. 3425-3441, vol. 54, No. 8, IEEE.
(Continued)

*Primary Examiner* — Helene E Tayong
(74) *Attorney, Agent, or Firm* — Viering, Jentschura & Partner MBB

(57) ABSTRACT

A communication device is provided that includes a baseband circuit and a transmitter configured to transmit a first signal and a projected signal. The baseband circuit is configured to determine the projected signal based on an estimated signal state information such that an energy of a shaped projected signal is smaller than an energy of a shaped signal. The estimated signal state information is an estimate of a signal state information based on the first signal and a received signal that is received by a receiver of the second
(Continued)

communication device. The shaped projected signal is the projected signal received by the receiver of the second communication device and filtered by a filter of the second communication device. The shaped signal is the received signal filtered by the filter of the second communication device.

18 Claims, 29 Drawing Sheets

(51) Int. Cl.
| | | |
|---|---|---|
| *H04B 7/0417* | (2017.01) | |
| *H04B 7/0426* | (2017.01) | |
| *H04B 7/0452* | (2017.01) | |
| *H04B 7/0456* | (2017.01) | |
| *H04B 7/06* | (2006.01) | |
| *H04J 11/00* | (2006.01) | |
| *H04L 25/02* | (2006.01) | |

(52) U.S. Cl.
CPC ......... *H04B 7/0443* (2013.01); *H04B 7/0452* (2013.01); *H04B 7/0456* (2013.01); *H04B 7/0617* (2013.01); *H04J 11/0033* (2013.01); *H04L 25/0248* (2013.01); *H04L 25/03961* (2013.01)

(58) Field of Classification Search
CPC .. H04B 7/0443; H04B 7/0452; H04B 7/0456; H04B 7/0617; H04J 11/0033
USPC ......................................................... 375/267
See application file for complete search history.

(56) References Cited

U.S. PATENT DOCUMENTS

| | | | |
|---|---|---|---|
| 2010/0232534 A1 | 9/2010 | Lee et al. | |
| 2011/0255487 A1* | 10/2011 | Jain ...................... | H04B 7/0695 |
| | | | 370/329 |
| 2012/0170442 A1 | 7/2012 | Razaviyayn et al. | |

OTHER PUBLICATIONS

International Search Report issued for corresponding application No. PCT/US2018/022295, dated May 23, 2018, 18 pages (for informational purpose only).
Office Action issued for European application No. 17164234.1, dated Jan. 14, 2019, 5 pages (for informational purpose only).
3rd Generation Partnership Project, "Technical Specification Group Radio Access Network; Evolved Universal Terrestrial Radio Access (E-UTRA); Requirements for support of radio resource management", Jun. 2016, 1483 pages, 3GPP TS 36.133, V12.12.0.
3rd Generation Partnership Project, "LTE; Evolved Universal Terrestrial Radio Access Network (E-UTRAN); Stage 2 functional specification of User Equipment (UE) positioning in E-UTRAN", dated Jan. 2016, 71 pages, 3GPP TS 136.305, version 13.0.0, Release 13.
3rd Generation Partnership Project, "Electromagnetic compatibility and Radio spectrum Matters (ERM); System Reference documents (SRdoc); Mobile broadband services in the 2 300 MHz-2 400 MHz frequency band under Licensed Shared Access regime", dated Jul. 2013, 37 pages, ETSI TR 103 113, V1.1.1.
Federal Communications Commission, "Report and Order and Second Further Notice of Proposed Rulemaking", released Apr. 21, 2015, 187 pages, Washington, D.C.
3rd Generation Partnership Project, "Technical Specification Group Radio Access Network; Evolved Universal Terrestrial Radio Access (E-UTRA); User Equipment (UE) procedures in idle mode", Dec. 2014, 37 pages, 3GPP TS 36.304, V12.3.0.

* cited by examiner

US 10,924,306 B2

COMMUNICATION DEVICE AND METHOD FOR RADIO COMMUNICATION

CROSS-REFERENCE TO RELATED APPLICATIONS

This application is a national stage entry according to 35 U.S.C. § 371 of PCT Application No. PCT/US2018/022295 filed on Mar. 14, 2018, which claims priority to European Patent Application Serial No. 17 164 234.1, which was filed on Mar. 31, 2017, both of which are incorporated herein by reference in their entirety

TECHNICAL FIELD

The present disclosure relates to communication devices and methods for radio communication.

BACKGROUND

In a scenario, a base station provides a wireless connection in a frequency range of an incumbent base station to a communication device. The communication device may be connected to another communication device via another wireless connection. It may be desirable to minimize an interference of signals of the base station with received signals of the other wireless connection that are received by the communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
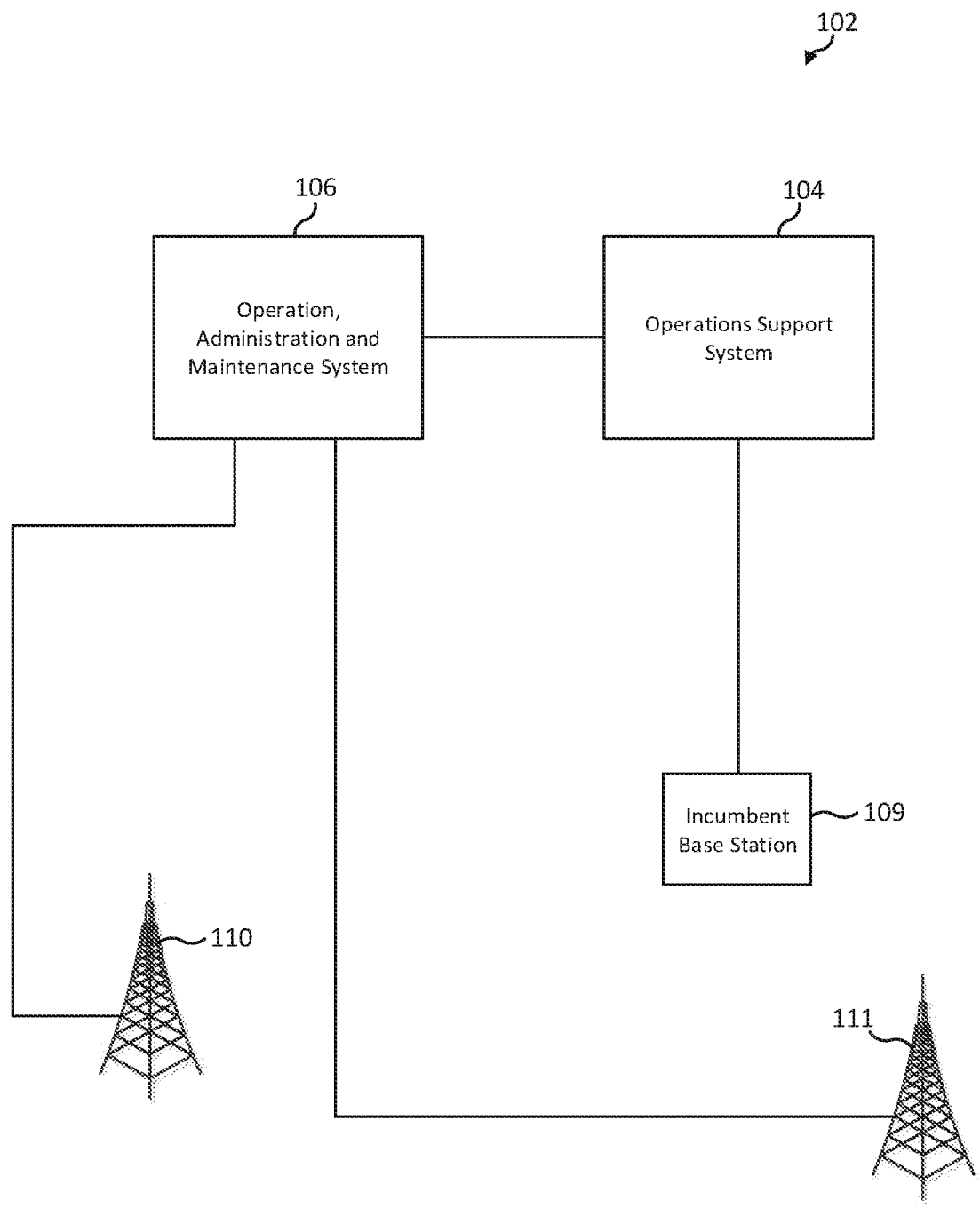
FIG. 1 shows a schematic drawing of a mobile radio communication system that may be configured to operate as a Licensed Shared Access (LSA) system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

A "circuit" may be understood as any kind of a logic implementing entity, which may be special purpose circuitry or a processor executing software stored in a memory, firmware, or any combination thereof. Further, a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry"

in the claims included herein, the use of "circuit" may be understood as collectively referring to two or more circuits.

A first communication device may be located in a restricted zone in which an incumbent base station provides radio frequency connections in a shared frequency range. A second communication device, e.g. a base station, may receive approval to connect via radio frequency connections in the shared frequency range in a transmission area that overlaps with the transmission area of the incumbent base station. The incumbent base station receives signals from a third communication device in the shared frequency range. The second communication device utilizes the first communication device to reduce the interference energy that the incumbent base station receives from the second communication device. Further, the second communication device utilizes the first communication device to reduce the interference energy that the incumbent base station receives from a fourth communication device.

Various aspects of this disclosure provide a communication device that may include a circuit and a transmitter configured to transmit a first signal and a projected signal. The circuit may be configured to determine the projected signal based on an estimated signal state information such that an energy of a shaped projected signal is smaller than an energy of a shaped signal. The estimated signal state information may be an estimate of a signal state information based on the first signal and a received signal that is received by a receiver of a second communication device. The shaped projected signal may be the projected signal received by the receiver of the second communication device and filtered by a filter of the second communication device. The shaped signal may be the received signal filtered by the filter of the second communication device. Thus, the communication device may be configured to effectively reduce the impact of interference signals on the second communication device. Further, the communication device may be configured to determine a reduced interference signal independent from feedback of the second communication device. Moreover, the communication device may be configured to flexibly adapt the reduction of the impact of interference signals to the filter of the second communication device.

The present disclosure provides a communication device may include a circuit and a receiver configured to receive signals from a first communication device. The circuit may be configured to determine a formed signal based on a location information of a second communication device such that a received second energy based on the formed signal that is received from the second communication device is smaller than a received first energy based on the formed signal that is received from the first communication device. Thus, the communication device is configured to reliably and efficiently reduce the received interference energy of a second communication device relative to the first communication device. Further, the communication device may be configured to flexibly reduce the received interference energy of a broad range of communication devices.

Various aspects of this disclosure provide a communication device that may include a receiver configured to receive a first signal from a base station and a second signal from a first communication device. The communication device may include a determination circuit configured to determine a first power level of the first signal and a second power level of the second signal. The communication device may include a circuit configured to determine a power ratio of the first power level to the second power level. The first signal and the second signal may be based on a shared frequency. The communication device may be configured to determine a third signal that comprises an interference parameter information based on the power ratio. Thus, the communication device, e.g. the circuit, may be configured to determine relative power levels of signals that are based on a shared frequency. Further, the communication device may be configured to probe relative power levels of signals that are remote to another communication device.

Various aspects provide a base station that may include a transmitter configured to transmit signals based on a shared frequency. Further, the base station may include a receiver configured to receive a connection request signal based on the shared frequency from a first communication device. Moreover, the base station may include a circuit configured to determine a first signal based on the shared frequency that comprises a request information of an interference parameter. Further, the circuit may be configured to determine signals based on the interference parameter to transmit based on the shared frequency. Thus, the base station may be configured to determine signals that are adapted to a distant interference situation. Further, the base station may be configured to flexibly target specific communication devices that are suitable to determine an interference parameter of a distant interference situation.

This disclosure provides a communication device that may include a receiver configured to receive signals from base stations. The communication device may include a circuit configured to select a first base station from the base stations. A first signal may be transmitted from the first base station and a received first signal may be received from a second communication device. A second signal may be transmitted from a third communication device and a received second signal may be received from the second communication device. A parameter may be based on a first power level of the received first signal and a second power level of the received second signal. Further, the first base station may be selected based on the parameter. Thus, the communication device may be configured to select a base station that provides a strong signal relative to the interference in the cell of the base station. Further, the communication device may be configured to increase the spectrum efficiency by exploiting frequencies of restricted spectrum.

Various aspects of this disclosure provide a communication system that may include a first communication device configured to determine an estimated signal state information. Further, the communication system may include a base station configured to transmit a first signal and a projected signal and to determine the projected signal based on an estimated signal state information such that an energy of a shaped projected signal is smaller than an energy of a shaped signal. The estimated signal state information may be an estimate of a signal state information based on the first signal and a received signal that is received by a receiver of a second communication device. The shaped projected signal may be the projected signal received by the receiver of the second communication device and filtered by a filter of the second communication device. The shaped signal may be the received signal filtered by the filter of the second communication device. Thus, the communication system may be configured to effectively reduce the impact of interference signals on the second communication device. Further, the communication system may be configured to determine a reduced interference signal independent from feedback of the second communication device. Moreover, the communication system may be configured to flexibly adapt the reduction of the impact of interference signals to the filter of the second communication device. Further, the communication system may be configured to effectively determine an estimated signal state information exclusively by devices of the system.

FIG. 1 shows a schematic diagram of a scenario in which a mobile radio communication system 102 may be configured to operate as a Licensed Shared Access (LSA) system. The mobile radio communication system 102 may include an operations support system 104, an Operation, Administration and Maintenance (OAM) system 106 of a Mobile Network Operator (MNO), an incumbent base station 107, a first base station 110 of the MNO and a second base station 111 of the MNO. The incumbent base station 107 may be configured to provide radio frequency connections in a first radio frequency range. In an example, the first radio frequency range may be the frequency band between 2300 MHz and 2400 MHz or a frequency of the frequency band. Further, the operations support system 104 may include an information repository that may store information related to the availability of radio frequency resources of the incumbent base station 107 to base stations of the MNO. The information related to the availability of radio frequency resources may include a geographical region and a first time period in which frequency resources of the incumbent base station 107 are available for a shared operation.

The second base station 111 of the MNO may be configured to provide radio frequency connections in the first radio frequency range in a second time period of the first time period if the radio frequency resources of the incumbent base station 107 are indicated as available in the operations support system 104 in the second time period. The first radio frequency range may be a shared frequency range that is shared between the incumbent base station 107 and the second base station 111. If the second time period is expired the OAM system 106 may be configured to instruct the second base station 111 to disable radio frequency transmissions in the first radio frequency range.

In an example, the incumbent base station 107 may be configured to provide radio frequency connections in a third radio frequency range that may be adjacent to the first radio frequency range or may have a common range that is common to the first radio frequency range and the third radio frequency range.

Figure 2:
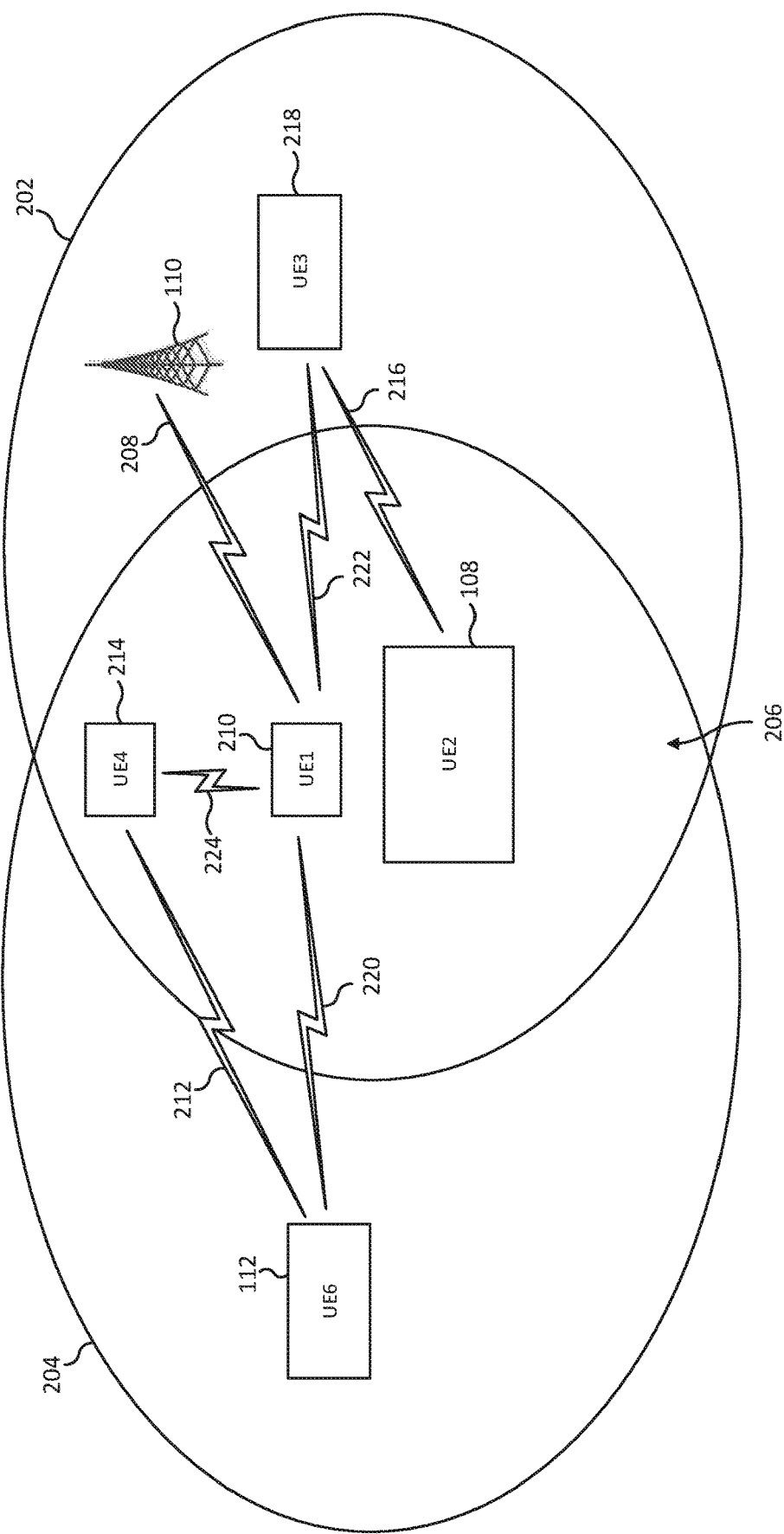
FIG. 2 shows a schematic drawing of a scenario in which a second communication device, the first base station and a sixth communication device may be configured to connect via radio frequency connections.

FIG. 2 shows a schematic drawing of a scenario in which a second communication device 108, the first base station 110 and a sixth communication device 112 may be configured to connect via radio frequency connections.

In an example, the scenario may be based on the mobile radio communication system 102.

In an example, the sixth communication device 112 may be the second base station 111.

In an example, the second communication device 108 may be the incumbent base station 107.

The second communication device 108 may be configured to provide radio frequency connections in a first cell 202 in the first radio frequency range. The first base station 110 may be configured to provide radio frequency connections in a second radio frequency range that is different from the first radio frequency range. The sixth communication device 112 may be configured to connect via radio frequency connections in a second cell 204 in the first radio frequency range. The second cell 204 covers an area 206 that is covered by the first cell 202.

The first base station 110 may be configured to provide a first radio frequency connection 208 to a first communication device 210 that may be located in the area 206. The first communication device 210 may be referenced as user equipment 1 (UE1). The sixth communication device 112 may be configured to connect via a second radio frequency connection 212 to a fourth communication device 214 that may be located in the area 206. The fourth communication device 214 may be referenced as user equipment 4 (UE4).

In a scenario, the fourth communication device 214 may have been moved in the second cell 204 from outside of the area 206 to the area 206. Further, the second communication device 108 may be configured to provide a third radio frequency connection 216 to a third communication device 218 that may be located in the first cell 202. The third communication device 218 may be referenced as user equipment 3 (UE3).

The sixth communication device 112 may be configured to transmit a first sample signal $t_1$ via a first transmission path 220. The third communication device 218 may be configured to transmit a second sample signal $t_2$ via a second transmission path 222. The fourth communication device 214 may be configured to transmit a third sample signal $t_3$ via a third transmission path 224.

The sixth communication device 112 may be configured to transmit signals based on a Multiple Input Multiple Output (MIMO) technology. The sixth communication device 112 may be configured to transmit the first sample signal $t_1$ based on a second plurality of antennas that includes $N_{6,T}$ antennas and a first precoding vector $q_1$ of dimension $N_{6,T}$.

The third communication device 218 may be configured to transmit signals based on the MIMO technology. The third communication device 218 may be configured to transmit the second sample signal $t_2$ based on a fourth plurality of antennas that includes $N_{3,T}$ antennas and a second precoding vector $q_2$ of dimension $N_{3,T}$.

The fourth communication device 214 may be configured to transmit signals based on the MIMO technology. The fourth communication device 214 may be configured to transmit the third sample signal $t_3$ based on a third plurality of antennas that includes $N_{4,T}$ antennas and a third precoding vector $q_3$ of dimension $N_{4,T}$.

The first communication device 210 may be configured to receive signals based on the first radio frequency range from which a received first sample signal $r_1$ may be shaped based on the first transmission path 220, from which a received second sample signal $r_2$ may be shaped based on the second transmission path 222 and from which a received third sample signal $r_3$ may be shaped based on the third transmission path 224. The received first sample signal $r_1$, the received second sample signal $r_2$ and the received third sample signal $r_3$ may be received based on the first sample signal $t_1$, the second sample signal $t_2$ and the third sample signal $t_3$, respectively.

The received first signal $r_1$ may be related with the first sample signal based on a first signal state operator $H_1$ by a formula (1):

$$r_1 = H_1 t_1. \tag{1}$$

The first sample signal $t_1$ may be based on signal components that may be transmitted based on the second plurality of antennas. The first signal state operator $H_1$ may be a matrix. Further, the first signal state operator $H_1$ may correspond to a linear transfer function that is associated with the first transmission path 220.

The received second signal $r_2$ may be related with the second sample signal $t_2$ based on a second signal state operator $H_2$ by a formula (2):

$$r_2 = H_2 t_2. \tag{2}$$

The second sample signal $t_2$ may be based on at least one signal component that may be transmitted based on at least one antenna of the third communication device 218. The second signal state operator $H_2$ may be a matrix. Further, the second signal state operator $H_2$ may correspond to a linear transfer function that is associated with the second transmission path 222.

The received third signal $r_3$ may be related with the third sample signal $t_3$ based on a third signal state operator $H_3$ by a formula (3):

$$r_3 = H_3 t_3. \qquad (3)$$

The third sample signal $t_3$ may be based on signal components that may be transmitted based on antennas of the third plurality of antennas of the fourth communication device 218. The third signal state operator $H_3$ may be a matrix. Further, the third signal state operator $H_3$ may correspond to a linear transfer function that is associated with the third transmission path 224.

A received aggregate signal r that is received by the first communication device 210 may be related with the sample signals $t_1$, $t_2$ and $t_3$ that are scalars based on the first precoding vector $q_1$, the second precoding vector $q_2$, the third precoding vector $q_3$, the first signal state operator $H_1$, the second signal state operator $H_3$, the third signal state operator $H_3$ and additive white Gaussian noise $n_1$ by a formula (4):

$$r = H_1 q_1 t_1 + H_2 q_2 t_2 + H_3 q_3 t_3 + n_1. \qquad (4)$$

Further, the second communication device 108 may be configured to receive signals based on the first radio frequency range from which a received first interference signal $w_1$ may be shaped based on a transmission path between the sixth communication device 112 and the second communication device 108, from which a received second data signal $w_2$ may be shaped based on a second transmission path between the third communication device 218 and the second communication device 108 and from which a received third interference signal $w_3$ may be shaped based on a transmission path between the fourth communication device 214 and the second communication device 108. The first interference signal $w_1$, the second data signal $w_2$ and the third interference signal $w_3$ may be based on the first sample signal $t_1$, the second sample signal $t_2$ and the third sample signal $t_3$, respectively.

The first interference signal $w_1$ may be related with the first sample signal $t_1$ based on a first signal state matrix $K_1$ that may be based on a signal state information by a formula (5):

$$w_1 = K_1 t_1. \qquad (5)$$

The second data signal $w_2$ may be related with the second sample signal $t_2$ based on a second signal state matrix $K_2$ that may be based on a second signal state information by a formula (6):

$$w_2 = K_2 t_2. \qquad (6)$$

The third interference signal $w_3$ may be related with the third sample signal $t_3$ based on a third signal state matrix $K_3$ that may be based on a third signal state information by a formula (7):

$$w_3 = K_3 t_3. \qquad (7)$$

The second communication device 108 may be configured to receive signals based on the MIMO technology. The second communication device 108 may be configured to receive the first interference signal $w_1$, the second data vector $w_2$ and the third interference vector $w_3$ based on a first plurality of antennas that includes $N_{2,R}$ antennas.

A received aggregate signal w that is received by the second communication device 108 may be related with the sample signals $t_1$, $t_2$ and $t_3$ that are scalars based on the first precoding vector $q_1$, the second precoding vector $q_2$, the third precoding vector $q_3$, the first signal state matrix $K_1$, the second signal state matrix $K_2$, the third signal state matrix $K_3$ and additive white Gaussian noise $n_2$ by a formula (8):

$$w_1 = K_1 q_1 t_1 + K_2 q_2 t_2 + K_3 q_3 t_3 + n_2. \qquad (8)$$

The first signal state operator $H_1$ may be an estimate of the first signal state matrix $K_1$. The second signal state operator $H_2$ may be an estimate of the second signal state matrix $K_2$. The third signal state operator $H_3$ may be an estimate of the third signal state matrix $K_3$.

In an example, the first communication device 210 may be configured to provide the received first sample signal $r_1$, the received second sample signal $r_2$ and the received third sample signal $r_3$ to the sixth communication device 112 via the first base station 110.

In an example, the sixth communication device 112 may be configured to select the first communication device 210 such that features of the first transmission path 220 and the transmission path between the sixth communication device 112 and the second communication device 108 are similar. Further, features of the second transmission path 222 and the transmission path between the third communication device 218 and the second communication device 108 may be similar. Moreover, features of the third transmission path 224 and the transmission path between the fourth communication device 214 and the second communication device 108 may be similar. Thus, the sixth communication device 112 may be configured to determine a reliable data basis.

The received first sample signal $r_1$ may be received at a first time, the received second sample signal $r_2$ may be received at a second time and the received third sample signal $r_3$ may be received at a third time. The first time, the second time and the third time may be times of the second time period. In an example, the first time, the second time and the third time may be different times, respectively. Thus, the first communication device may be configured to receive the most current signals as data basis.

In an example, the first communication device 210 may be configured to transmit signals to the sixth communication device 112 and receive signals from the sixth communication device 112 via at least one of time division multiplexing and frequency division multiplexing. The fourth communication device 214 may be configured to transmit signals to the sixth communication device 112 and receive signals from the sixth communication device 112 via at least one of time division multiplexing and frequency division multiplexing. Thus, the fourth communication device may be configured to connect to the communication devices in a flexible manner.

In an example, a communication system may include the first communication device 210 and the second base station 111.

Figure 3:
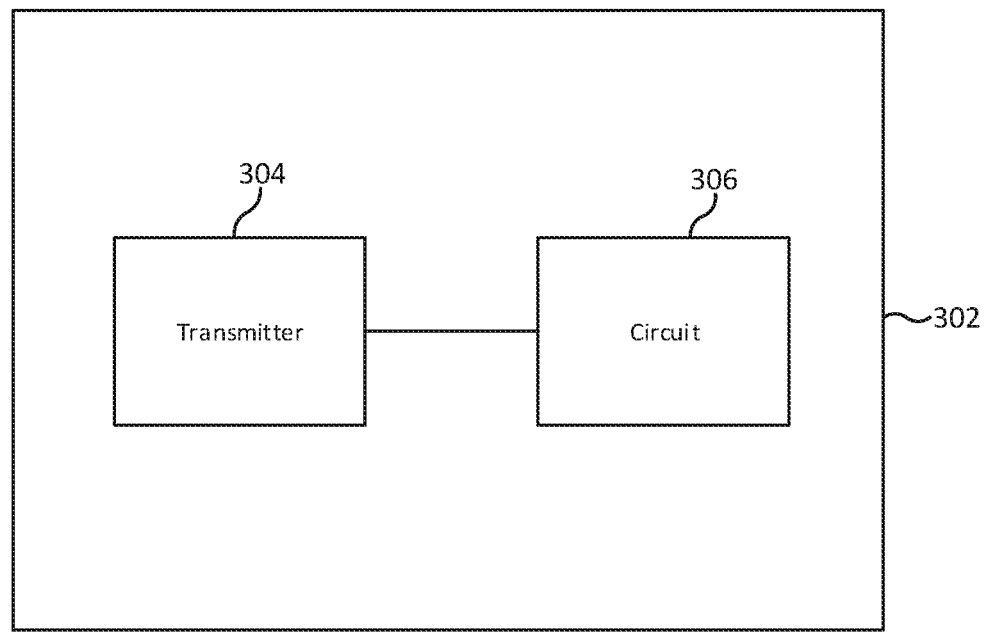
FIG. 3 shows a schematic diagram of a communication device that may include a transmitter and a circuit.

FIG. 3 shows a schematic diagram of a communication device 302 that may include a transmitter 304 and a circuit 306. The circuit 306 may be connected with the transmitter 304.

The communication device 302 may be the sixth communication device 112.

The transmitter 304 may be configured to transmit the first sample signal $t_1$.

The circuit may be configured to determine an estimated signal state information. The estimated signal state information may be an estimate of the signal state information. The estimated signal state information may be based on a first operator $G_1$.

The circuit 306 may be configured to determine a projected first signal $p_1$ based on the estimated signal state information such that an energy of a shaped projected first signal $u_1$ is smaller than an energy of a shaped first signal $s_1$. The circuit 306 may be configured to determine the shaped first signal $s_1$ based on the first sample signal $t_1$, the estimated signal state information and a filter of the second communication device 108. The shaped first signal $s_1$ may be related with the first sample signal $t_1$ based on the first signal state operator $G_1$ by a formula (9):

$$s_1 = G_1 t_1. \tag{9}$$

The circuit 306 may be configured to determine the shaped projected first signal $u_1$ based on the projected first signal $p_1$, the estimated signal state information and the filter of the second communication device 108. The shaped projected first signal $u_1$ may be related with the projected first signal $p_1$ based on the first operator $G_1$ by a formula (10):

$$u_1 = G_1 p_1. \tag{10}$$

The transmitter 304 may be configured to transmit the projected first signal $p_1$.

Thus, the communication device 302 may be configured to effectively reduce interference energies of interference signals that interfere with signals that are transmitted from a third communication device and received from the second communication device.

In an example, the circuit 306 may be a baseband circuit.

In an example, the second communication device 108 may be configured to receive the energy of the shaped projected first signal $u_1$ and the energy of the shaped first signal $s_1$ in a predefined time period.

In an example, the energy of the shaped projected first signal $u_1$ may be an estimated energy of the shaped projected first signal $u_1$. The energy of the shaped first signal $s_1$ may be an estimated energy of the shaped first signal $s_1$.

In an example, the circuit 306 may be configured to estimate the estimated energy of the shaped projected first signal $u_1$ and the estimated energy of the shaped first signal $s_1$ based on the estimated signal state information and the filter of the second communication device 108.

In an example, the circuit 306 may be configured to determine the estimated signal state information based on the first sample signal $t_1$ and the received first sample signal $r_1$. The estimated signal state information may be the first signal state matrix $H_1$.

In an example, the circuit 306 may be configured to receive the estimated signal state information from the first communication device 210.

In an example, the circuit 306 may be configured to determine the estimated signal state information based on a pilot signal that is included in the first sample signal $t_1$ and the received first sample signal $r_1$. Thus, the circuit 306 may be configured to reliably determine the estimated signal state information.

The circuit 306 may be configured to determine the projected first signal $p_1$ based on a first vector $v_1$ of input signals. The first vector $v_1$ may be based on a first plurality of input signals. The components of the first vector $v_1$ may be input signals of the first plurality of input signals, respectively. The input signals of the first plurality of input signals may be transmitted by the antennas of the second plurality of antennas, respectively. Thus, the circuit 306 may be configured to efficiently determine the projected signal based on a multiple input technology.

The circuit 306 may be configured to determine the projected first signal $p_1$ based on a second vector $v_2$ of input signals. The second vector $v_2$ may be based on a second plurality of input signals that correspond to the antennas of the second plurality of antennas. The components of the second vector $v_2$ may be input signals of the second plurality of input signals that are transmitted by the antennas of the second plurality of antennas, respectively.

The circuit 306 may be configured to determine the projected first signal $p_1$ based on a third vector $v_3$ of output signals. The third vector $v_3$ may be based on a third plurality of output signals that are received from the second communication device 108 based on antennas of the first plurality of antennas of the second communication device 108, respectively. The third plurality of output signals may be received based on the projected first signal $p_1$. Thus, the circuit 306 may be configured to efficiently determine projected signals based on a multiple output technology.

The circuit 306 may be configured to determine the projected first signal $p_1$ based on a fourth vector $v_4$ of output signals. The fourth vector $v_4$ may be based on a fourth plurality of output signals that are received from the second communication device 108 based on the antennas of the first plurality of antennas, respectively. The fourth plurality of output signals may be received based on the first sample signal $t_1$.

The circuit 306 may be configured to determine an estimated linear process based on the estimated signal state information such that the estimated linear process is an estimate of a linear process that is based on the signal state information.

In an example, the filter of the second communication device 108 may be an identical pass filter.

The estimated linear process may be the first signal state operator $H_1$. The circuit 306 may be configured to determine the first signal state operator $H_1$ based on the first sample signal $t_1$ and the received first sample signal $r_1$ based on a formula (11):

$$r_1 = H_1 t_1. \tag{11}$$

The circuit 306 may be configured to determine a first scalar product $X_1$ based on the first vector $v_1$ and the third vector $v_3$ by a formula (12):

$$X_1 = v_1 \cdot v_3. \tag{12}$$

The circuit 306 may be configured to determine a second scalar product $X_2$ based on the second vector $v_2$ and the fourth vector $v_4$ by a formula (13):

$$X_2 = v_2 \cdot v_4. \tag{13}$$

The circuit 306 may be configured to determine the first vector $v_1$ such that a first absolute value of the first scalar product $X_1$ is smaller than a second absolute value of the second scalar product $X_2$. Thus, the circuit 306 may be configured to effectively determine projected signals that reduce interference energies of received and filtered projected signals relative to the interference energies of unprojected signals.

In an example, the circuit 306 may be configured to determine the first vector $v_1$ such that the first scalar product $X_1$ is zero.

In an example, the sixth communication device 112 may provide radio frequency connections in the first radio frequency range as a downlink. Thus, an interference of signals with signals of a third communication device that transmits in the same frequency range can flexibly and efficiently be reduced.

In an example, the filter of the second communication device 108 may be based on maximal ratio combining.

In an example, the filter of the second communication device 108 may be a maximum likelihood filter.

The filter of the second communication device 108 may be configured to filter based on a channel state information of the third radio frequency connection 216. The channel state information may be a linear transfer function of a signal that is transmitted from the third communication device 218 and a received signal that is received from the second communication device 108. The second signal state information may be an estimate of the channel state information that may be based on the transmission of signals different from the second sample signal $t_2$.

The circuit may be configured to determine an estimated second signal state information. The estimated second signal state information may be an estimate of the second signal state information. The second signal state information may be based on a signal that is transmitted from the third communication device 218 and a received signal that is received from the second communication device 108. Thus, the circuit 306 may be configured to flexibly determine the projected signal based on the filter of the second communication device 108.

In an example, the signal that is transmitted from the third communication device 218 may be the second sample signal $t_2$. The received signal that is received from the second communication device 108 may be the second interference signal $w_2$.

The circuit 306 may be configured to determine the estimated second signal state information based on the second sample signal $t_2$ and the received second sample signal $r_2$.

In an example, the estimated second signal state information may be the second signal state operator $H_2$.

In an example, the circuit 306 may be configured to determine the estimated second signal state information based on a pilot signal that is included in the second sample signal $t_2$ and the received second sample signal $r_2$. Thus, the circuit 306 may be configured to reliably determine the estimated second signal state information.

In an example, the circuit 306 may be configured to receive the estimated second signal state information from the first communication device 210.

The circuit 306 may be configured to determine the estimated linear process based on the estimated signal state information and the estimated second signal state information.

The circuit 306 may be configured to determine the second signal state operator $H_2$ based on the second sample signal $t_2$ and the received second sample signal $r_2$ based on a formula (14):

$$r_2 = H_2 t_2. \tag{14}$$

The circuit 306 may be configured to determine an estimated linear process matrix $M_1$ of the estimated linear process based on the first signal state operator $H_1$, the second signal state operator $H_2$ and a Hermitian conjugate operator $(\cdot)^H$ by a formula (15):

$$M_1 = H_2 H_1. \tag{15}$$

The circuit 306 may be configured to determine a spectral decomposition of the second vector $v_2$ based on eigenvectors of the estimated linear process matrix $M_1$.

If the second vector $v_2$ is an eigenvector of the estimated linear process matrix $M_1$: The circuit 306 may be configured to determine the first vector $v_1$ such that the first vector $v_1$ is a sum of eigenvectors of the estimated linear process matrix $M_1$ to eigenvalues of the estimated linear process matrix $M_1$ that are smaller than an eigenvalue of the second vector $v_2$ of the estimated linear process matrix $M_1$. Thus, the circuit 306 may be configured to determine the projected first signal $p_1$ in a simple and reliable manner.

If the second vector $v_2$ is a sum of eigenvectors of the estimated linear process matrix $M_1$: The circuit 306 may be configured to determine the first vector $v_1$ such that the first vector $v_1$ is a sum of eigenvectors of the estimated linear process matrix $M_1$ to eigenvalues of the estimated linear process matrix $M_1$ that are smaller than a smallest eigenvalue of the eigenvalues of the sum of eigenvectors of the estimated linear process matrix $M_1$. Thus, the circuit 306 may be configured to determine the projected first signal $p_1$ in a simple and reliable manner.

In an example, if the second vector $v_2$ is an eigenvector of the estimated linear process matrix $M_1$: The circuit 306 may be configured to determine the first vector $v_1$ such that the first vector $v_1$ is an eigenvector of the estimated linear process matrix $M_1$ to an eigenvalue of the estimated linear process matrix $M_1$ that is smaller than an eigenvalue of the second vector $v_2$ of the estimated linear process matrix $M_1$. Thus, the circuit 306 may be configured to determine the projected first signal $p_1$ in a simple and reliable manner.

If the second vector $v_2$ is a sum of eigenvectors of the estimated linear process matrix $M_1$: The circuit 306 may be configured to determine the first vector $v_1$ such that the first vector $v_1$ is an eigenvector of the estimated linear process matrix $M_1$ to an eigenvalue of the estimated linear process matrix $M_1$ that is smaller than eigenvalues of the sum of eigenvectors to the estimated linear process matrix $M_1$. Thus, the circuit 306 may be configured to determine the projected first signal $p_1$ in a simple and reliable manner.

In an example, the circuit 306 may be configured to determine a first projector $P_1$ such that a projection of the first sample signal $t_1$ based on the first projector $P_1$ is the projected first signal $p_1$.

In an example, the first projector $P_1$ may be unitary.

In an example, the circuit 306 may be configured to determine the first projector $P_1$ based on a first matrix that is orthogonal to the estimated linear process matrix $M_1$. The first matrix may be configured to project vectors to a kernel space of the estimated linear process matrix $M_1$. The estimated linear process matrix $M_1$ may be configured to project vectors of the kernel space to a zero vector.

In an example, the circuit 306 may be configured to determine the first projector $P_1$ based on two antennas of the second plurality of antennas, two antennas of the first plurality of antennas, the estimated linear process matrix $M_1$ and a transpose matrix $M_1^T$ by a formula (16):

$$P_1 = \begin{pmatrix} 0 & -1 \\ 1 & 0 \end{pmatrix} M_1^T. \tag{16}$$

In an example, the circuit 306 may be configured to determine the first projector $P_1$ based on two antennas of the second plurality of antennas, two antennas of the first plurality of antennas, a permutation matrix $A$, that may be determined by a formula (17):

$$A = \begin{pmatrix} 0 & -1 \\ 1 & 0 \end{pmatrix}, \quad (17)$$

and the estimated linear process matrix $M_1$ by a formula (18):

$$P_1 = \frac{A \cdot M_1^T}{\|A \cdot M_1^T\|}. \quad (18)$$

In case of four antennas of the first plurality and four antennas of the second plurality the circuit 306 is configured to determine the first projector $P_1$ based on a second matrix B, that may be determined based on a zero matrix $Z_0$ by a formula (19):

$$B = \begin{pmatrix} A & Z_0 \\ Z_0 & A \end{pmatrix}, \quad (19)$$

and the estimated linear process matrix $M_1$ by a formula (20):

$$P_1 = \frac{B \cdot M_1^T}{\|B \cdot M_1^T\|}. \quad (20)$$

In case of a complex matrix $M_1$ the transpose matrix $M_1^T$ may be replaced by a Hermitian conjugate matrix $M_1^H$.

In an example, the circuit 306 may be configured to provide the first projector $P_1$ to the fourth communication device 214.

In an example, the communication device may be a base station.

In an example, the circuit 306 may be configured to select the first communication device 210 from a plurality of communication devices that are located in the area 206 such that a distance from the first communication device 210 to the second communication device 108 is a smallest from the distances of the communication devices of the plurality of communication devices. Thus, an the circuit may be configured to reliably reduce an interference of signals of the communication device with signals from other communication devices in the same frequency range.

In an example, the sixth communication device may be configured to determine the estimated signal state information based on a received sample signal based on a sample signal that is transmitted from the first communication device. The received sample signal may include a pilot signal.

In an example, the received first sample signal $r_1$ may be the received first sample signal $t_1$.

In an example, the received second sample signal $r_2$ may be the received second sample signal $t_2$.

In an example, the first communication device may be configured to transmit a sample signal based on a time division multiplexing technology. The first communication device may be configured to transmit pilot signals in time periods in which no pilot signal is transmitted from the third communication device. Thus, the sixth communication device may be configured to efficiently determine the estimated signal state information based on channel reciprocity.

Further, the first communication device may be configured to transmit null subcarriers based on subcarriers that are transmitted by the third communication device and include pilot signals. Thus, the first communication device may be configured to increase the accuracy of determined channel parameters.

In an example, the sixth communication device may be configured to transmit sample signal based on a frequency division multiplexing technology. The sixth communication device may be configured to transmit pilot signals based on subcarriers based on which null subcarriers are transmitted from the third communication device. Thus, the first communication device may be configured to efficiently determine the estimated signal state information. Further, the sixth communication device may be configured to transmit null subcarriers based on which pilot signals are transmitted by the third communication device. The sixth communication device may be configured to transmit precoded signals instead of null subcarriers. Thus, the sixth communication device may be configured to increase the data rate.

In an example, a communication system may include a control device, the sixth communication device 112 and the second communication device 108. The sixth communication device 112 and the second communication device 108 may be registered in the control device to transmit based on the shared frequency range in a shared area. The shared area may be the area 206. The shared frequency range may be a shared frequency.

In an example, aspects of the sixth communication device 112 based on FIG. 2 may be aspects of the communication device 302.

In an example, the first communication device 302 based FIG. 3 may be based on the communication devices of FIG. 1 and FIG. 2.

Aspects of the communication device 302 of FIG. 3 may be combined with aspects of the scenarios based on FIG. 1 and FIG. 2. In an example, the communication device 302 of FIG. 3 may be based on the communication devices based on FIG. 1 and FIG. 2.

Figure 4:
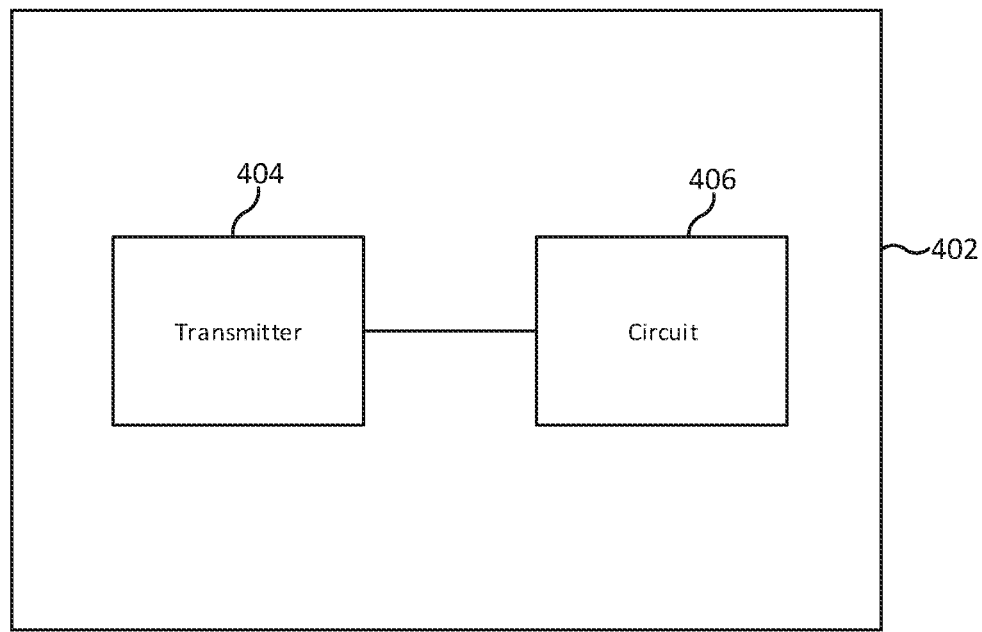
FIG. 4 shows a schematic diagram of a communication device that may include a transmitter and a circuit.

FIG. 4 shows a schematic diagram of a communication device 402 that may include a transmitter 404 and a circuit 406. The circuit 406 may be connected with the transmitter 404.

The circuit 406 may be configured to determine an estimated third signal state information. The estimated third signal state information may be an estimate of the third signal state information. The third signal state information may be based on the third sample signal $t_3$ that is transmitted by the fourth communication device 214 and the received third interference signal that is received from the second communication device 108. The estimated third signal state information may be based on a second operator $G_2$.

The circuit 406 may be configured to determine a second projection information such that an energy of a shaped projected second signal $u_2$ is smaller than an energy of a shaped second signal $s_2$. The circuit 406 may be configured to determine the shaped second signal $s_2$ based on the estimated third signal state information and the filter of the second communication device 108. The shaped second signal $s_2$ may be related with a second signal $a_2$ based on the second operator $G_2$ by a formula (21):

$$s_2 = G_2 a_2. \quad (21)$$

The circuit 406 may be configured to determine a projected second signal $p_2$ that may be projected based on the second projection information and the second signal $a_2$. The second projection information may be a second projector $P_2$. The circuit 406 may be configured to determine the shaped projected second signal $u_2$ based on the projected second signal $p_2$, the estimated third signal state information and the filter of the second communication device 108. The shaped projected second signal $u_2$ may be related with the projected second signal $p_2$ based on the second operator $G_2$ by a formula (22):

$$u_2 = G_2 p_2. \tag{22}$$

Thus, the circuit 406 may be configured to effectively reduce interference energies of interference signals that interfere with signals that are transmitted from a third communication device and received from the second communication device.

In an example, the circuit 406 may be a baseband circuit.

In an example, the fourth communication device 214 may be configured to transmit the second signal $a_2$ and/or the projected second signal $p_2$.

In an example, the second signal $a_2$ may be the third sample signal $t_3$.

In an example, the second communication device 108 may be configured to receive the energy of the shaped projected second signal $u_2$ and the energy of the shaped second signal $s_2$ in a predefined time period.

In an example, the energy of the shaped projected second signal $u_2$ may be an estimated energy of the shaped projected second signal $u_2$. The energy of the shaped second signal $s_2$ may be an estimated energy of the shaped second signal $s_2$.

In an example, the circuit 406 may be configured to estimate the estimated energy of the shaped projected second signal $u_2$ and the estimated energy of the shaped second signal $s_2$ based on the estimated signal state information and the filter of the second communication device 108.

In an example, the transmitter 404 may be configured to transmit the second projection information to the fourth communication device 214.

In an example, the circuit 406 may be configured to receive the estimated third signal state information from the first communication device 210.

In an example, the circuit 406 may be configured to determine the estimated third signal state information based on the third sample signal $t_3$ and the received third sample signal $r_3$. The estimated third signal state information may be the third signal state matrix $H_3$.

In an example, the circuit 406 may be configured to determine the estimated third signal state information based on a pilot signal that is included in the third sample signal $t_3$ and the received third sample signal $r_3$. Thus, the circuit 406 may be configured to reliably determine the estimated signal state information.

The circuit 406 may be configured to determine the projected second signal $p_2$ based on a fifth vector $v_5$ of input signals. The fifth vector $v_5$ may be based on a fifth plurality of input signals that correspond to antennas of the third plurality of antennas of the fourth communication device 214. The components of the fifth vector $v_5$ may be input signals of the fifth plurality of input signals, respectively. The input signals of the fifth plurality of input signals may be transmitted by the antennas of the third plurality of antennas, respectively. Thus, the circuit 406 may be configured to efficiently determine signal projectors based on a multiple input technology.

The circuit 406 may be configured to determine the projected second signal $p_2$ based on a sixth vector $v_6$ of input signals. The sixth vector $v_6$ may be based on a sixth plurality of input signals that correspond to the antennas of the third plurality of antennas. The components of the sixth vector $v_6$ may be input signals of the sixth plurality of input signals that are transmitted by the antennas of the third plurality of antennas, respectively. Thus, the circuit 406 may be configured to efficiently determine signal projectors based on a multiple input technology.

The circuit 406 may be configured to determine the projected second signal $p_2$ based on a seventh vector $v_7$ of output signals. The seventh vector $v_7$ may be based on a seventh plurality of output signals that are received from the second communication device 108. The seventh plurality of output signals may be received based on the projected second signal $p_2$. Thus, the circuit 406 may be configured to efficiently determine signal projectors based on a multiple output technology.

The circuit 406 may be configured to determine the projected second signal $p_2$ based on an eighth vector $v_8$ of output signals. The eighth vector $v_8$ may be based on an eighth plurality of output signals that are received from the second communication device 108. The eighth plurality of output signals may be received based on the second signal $a_2$. Thus, the circuit 406 may be configured to efficiently determine signal projectors based on a multiple output technology.

The circuit 406 may be configured to determine a third scalar product $X_3$ based on the fifth vector $v_5$ and the seventh vector $v_7$ by a formula (23):

$$X_3 = v_5 \cdot v_7. \tag{23}$$

The circuit 406 may be configured to determine a fourth scalar product $X_4$ based on the sixth vector $v_6$ and the eighth vector $v_8$ by a formula (24):

$$X_4 = v_6 \cdot v_8. \tag{24}$$

The circuit 406 may be configured to determine the fifth vector $v_5$ such that a third absolute value of the third scalar product $X_3$ is smaller than a fourth absolute value of the fourth scalar product $X_4$. Thus, the circuit 406 may be configured to effectively determine signal projectors that reduce interference energies of received and filtered projected signals relative to the interference energies of unprojected signals.

In an example, the circuit 406 may be configured to determine the fifth vector $v_5$ such that the third scalar product $X_3$ is zero.

The circuit 406 may be configured to determine an estimated second linear process based on the estimated second signal state information and the estimated third signal state information. The circuit 306 may be configured to determine the third signal state operator $H_3$ based on the third sample signal $t_3$ and the received third sample signal $r_3$ based on a formula (25):

$$r_3 = H_3 t_3 \tag{25}$$

In an example, the estimated third signal state information may be the third signal state operator $H_3$.

The circuit 406 may be configured to determine a second estimated linear process matrix $M_2$ of the estimated second linear process based on the second signal state operator $H_2$, the third signal state operator $H_3$ and a Hermitian conjugate operator $(\cdot)^H$ by a formula (26):

$$M_2 = H_2^H H_3. \tag{26}$$

The circuit 406 may be configured to determine a spectral decomposition of the sixth vector $v_6$ based on eigenvectors of the second estimated linear process matrix $M_2$.

If the sixth vector $v_6$ is an eigenvector of the second estimated linear process matrix $M_2$: The circuit 406 may be configured to determine the fifth vector $v_5$ such that the fifth vector $v_5$ is a sum of eigenvectors of the second estimated linear process matrix $M_2$ to eigenvalues of the second estimated linear process matrix $M_2$ that are smaller than an eigenvalue of the sixth vector $v_6$ of the second estimated linear process matrix $M_2$. Thus, the circuit 406 may be configured to determine the second projection information in a simple and reliable manner.

If the sixth vector $v_6$ is a sum of eigenvectors of the second estimated linear process matrix $M_2$: The circuit 406 may be configured to determine the fifth vector $v_5$ such that the fifth vector $v_5$ is a sum of eigenvectors of the second estimated linear process matrix $M_2$ to eigenvalues of the second estimated linear process matrix $M_2$ that are smaller than a smallest eigenvalue of the eigenvalues of the sum of eigenvectors of the second estimated linear process matrix $M_2$. Thus, the circuit 406 may be configured to determine the second projection information in a simple and reliable manner.

In an example, the second projector $P_2$ may be unitary.

In an example, the circuit 406 may be configured to determine the second projector $P_2$ based on a second matrix that is orthogonal to the second estimated linear process matrix $M_2$. The second matrix may be configured to project vectors to a kernel space of the second estimated linear process matrix $M_2$. The second estimated linear process matrix $M_2$ may be configured to project vectors of the kernel space to a zero vector.

In an example, the circuit 406 may be configured to determine the second projector $P_2$ based on two antennas of the third plurality of antennas, two antennas of the first plurality of antennas, the second estimated linear process matrix $M_2$ and a transpose matrix $M_2^T$ by a formula (27):

$$P_2 = \begin{pmatrix} 0 & -1 \\ 1 & 0 \end{pmatrix} M_2^T. \tag{27}$$

In case of a real matrix $M_2$ the Hermitian conjugation is a transpose of the second estimated linear process matrix $M_2$.

In an example, the circuit 406 may be configured to determine the second projector $P_2$ based on two antennas of the third plurality of antennas, two antennas of the first plurality of antennas, the permutation matrix A, the second estimated linear process matrix $M_2$ and the transpose matrix $M_2^T$ by a formula (28):

$$P_2 = \frac{A \cdot M_2^T}{\|A \cdot M_2^T\|}. \tag{28}$$

In case of four antennas of the third plurality and four antennas of the second plurality the circuit 406 is configured to determine the second projector $P_2$ based on the second matrix B, the second estimated linear process matrix $M_2$ and a transpose matrix $M_2^T$ by a formula (29):

$$P_2 = \frac{B \cdot M_2^T}{\|B \cdot M_2^T\|}. \tag{29}$$

In case of a complex matrix $M_2$ the transpose matrix $M_2^T$ may be replaced by a Hermitian conjugate matrix $M_2^H$.

In an example, the first communication device may be configured to determine the estimated second signal state information based on a received sample signal based on a sample signal that is transmitted from the first communication device. The received sample signal may include a pilot signal.

In an example, the first communication device may be configured to transmit the sample signal based on a time division multiplexing technology. The first communication device may be configured to transmit pilot signals in time periods in which no pilot signal is transmitted from the third communication device. Thus, the first communication device may be configured to efficiently determine the estimated second signal state information based on channel reciprocity. Further, the third communication device may be configured to transmit null subcarriers based on subcarriers that are transmitted by the first communication device and include pilot signals. Thus, the third communication device may be configured to increase the accuracy of determined channel parameters.

In an example, the received third sample signal $r_3$ may be the received third sample signal $t_3$.

In an example, the third communication device may be configured to transmit sample signal based on a frequency division multiplexing technology. The third communication device may be configured to transmit pilot signals based on subcarriers based on which null subcarriers are transmitted from the sixth communication device. Thus, the first communication device may be configured to efficiently determine the estimated signal state information. Further, the third communication device may be configured to transmit null subcarriers based on which pilot signals are transmitted by the sixth communication device. The third communication device may be configured to transmit precoded signals instead of null subcarriers. Thus, the third communication device may be configured to increase the data rate.

In an example, aspects of the communication device 302 based on FIG. 3 may be aspects of the communication device 402. The circuit 406 may be based on the circuit 306.

In an example, the communication device 402 of FIG. 4 may be based on the communication devices based on FIG. 1, FIG. 2 and FIG. 3.

It should be noted that aspects of the communication device 402 of FIG. 4 may be combined with aspects of the communication device based on FIG. 3. Aspects of the communication device 402 of FIG. 4 may be combined with aspects of the scenarios based on FIG. 1 and FIG. 2.

Figure 5:
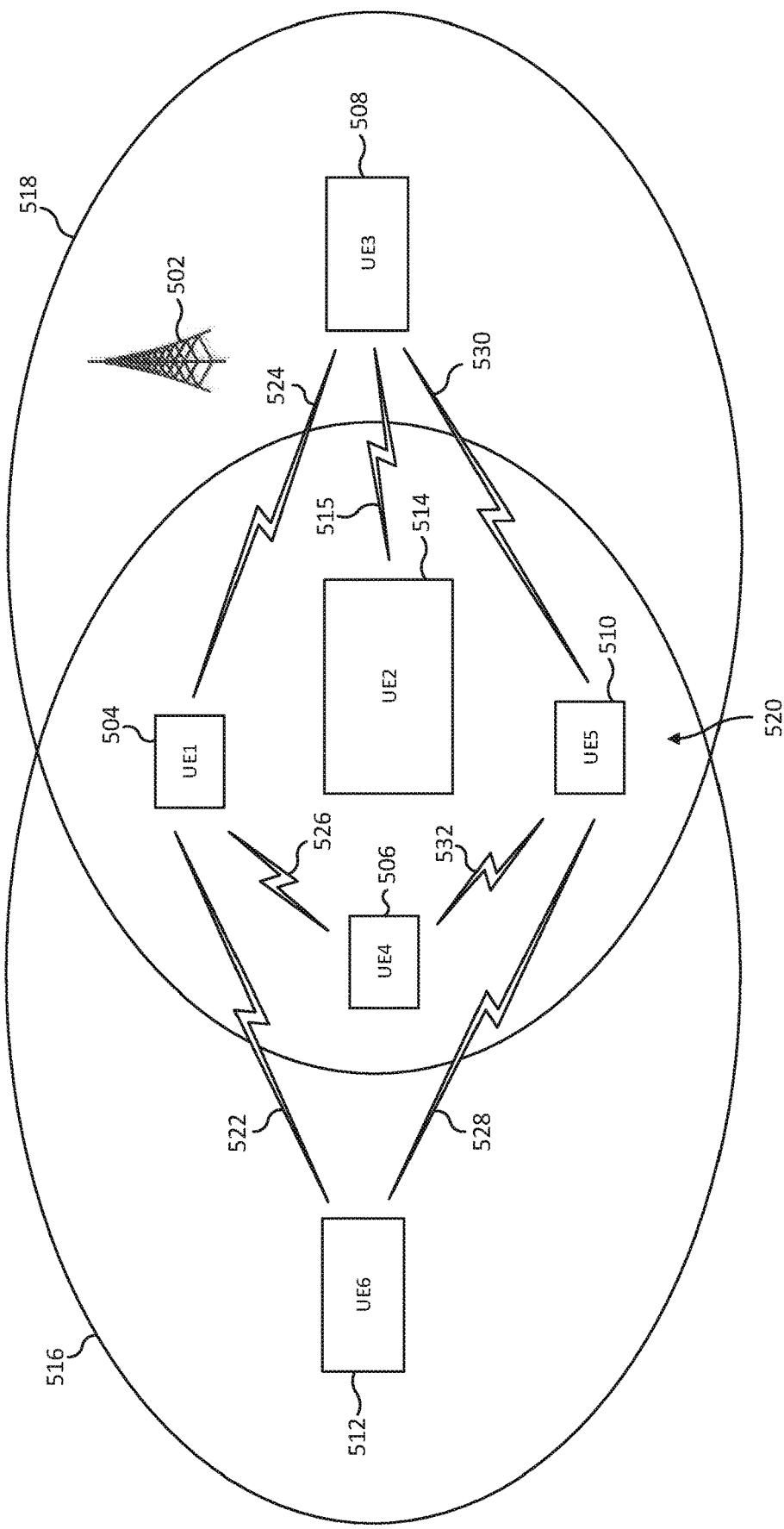
FIG. 5 shows a schematic diagram of a scenario of a base station and six communication devices.

FIG. 5 shows a schematic diagram of a scenario of a base station 502, a first communication device 504 (UE1), a second communication device 514 (UE2), a third communication device 508 (UE3), a fourth communication device 506 (UE4), a fifth communication device 510 (UE5) and a sixth communication device 512 (UE6). The sixth communication device 512 may be configured to transmit and receive radio frequency signals in a first radio frequency range in a first cell 516. Further, the base station 502 may be configured to provide radio frequency connections in a second cell 518 in a second radio frequency range. The second cell 518 may cover an area 520 that may be covered by the first cell 516. Further, the base station 502 may be configured to provide a first radio frequency connection to the first communication device 504 and a second radio frequency connection to the fifth communication device 510. Moreover, the second communication device 514 may be configured to provide a third radio frequency connection 515 to the third communication device 508.

The sixth communication device 512 may be configured to transmit a first signal via a first transmission path 522. The third communication device 508 may be configured to transmit a second signal via a second transmission path 524 to the first communication device 504. The fourth communication device 506 may be configured to transmit a third signal via a third transmission path 526.

The sixth communication device 512 may be configured to transmit a fourth signal via a fourth transmission path 528. The third communication device 508 may be configured to transmit a fifth signal via a fifth transmission path 530. The fourth communication device 506 may be configured to transmit a sixth signal via a sixth transmission path 532.

The first communication device 504 may be configured to receive radio frequency signals based on the first radio frequency range from which a received first signal may be shaped by the first transmission path 522, from which a received second signal may be shaped by the second transmission path 524 and from which a received third signal may be shaped by the third transmission path 526.

The fifth communication device 510 may be configured to receive radio frequency signals based on the first radio frequency range from which a received fourth signal may be shaped by the fourth transmission path 528, from which a received fifth signal may be shaped by the fifth transmission path 530 and from which a received sixth signal may be shaped by the sixth transmission path 532.

In an example, aspects of the communication device 402 based on FIG. 4 may be aspects of the sixth communication device 512.

It should be noted that aspects of the scenario of FIG. 5 may be combined with aspects of the communication devices based on FIG. 3 and FIG. 4. Aspects of the scenario of FIG. 5 may be combined with aspects of the scenarios based on FIG. 1 and FIG. 2.

Figure 6:
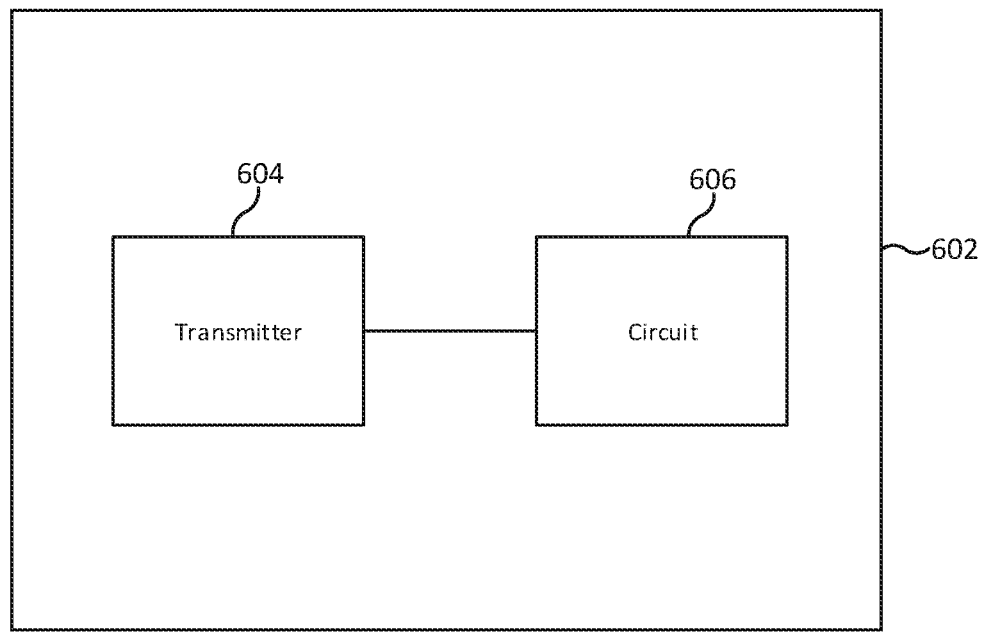
FIG. 6 shows a schematic diagram of a communication device that may include a transmitter and a circuit.

FIG. 6 shows a schematic diagram of a communication device 602 that may include a transmitter 604 and a circuit 606. The circuit 606 may be connected with the transmitter 604. Features of FIG. 6 that may be similar to features based on FIG. 5 may be referenced alike.

The circuit 606 may be configured to determine the estimated signal state information based on an interpolation of the received first signal and the received fourth signal. Thus, the circuit 606 may be configured to accurately determine a data basis for the determination of the projected signals.

The circuit 606 may be configured to determine the estimated second signal state information based on an interpolation of the received second signal and the received fifth signal.

The circuit 606 may be configured to determine the projected signal $p_1$ based on a first projection information.

The circuit 606 may be configured to determine an interpolated first signal based on the first signal and the fourth signal.

The circuit 606 may be configured to determine an interpolated second signal based on the second signal and the fifth signal.

A shaped interpolated first signal may be shaped based on the interpolated first signal in correspondence to the estimated linear process.

The circuit 606 may be configured to determine a projected interpolated first signal based on the interpolated first signal and the first projection information.

A shaped projected interpolated first signal may be shaped based on the projected interpolated first signal in correspondence to the estimated linear process.

A shaped interpolated second signal may be shaped based on the interpolated second signal in correspondence to the estimated linear process.

The circuit 606 may be configured to determine a projected interpolated second signal based on the interpolated second signal and the first projection information.

A shaped projected interpolated second signal may be shaped based on the projected interpolated second signal in correspondence to the estimated linear process.

The circuit 606 may be configured to determine an interpolated shaped interpolated first signal based on the shaped interpolated first signal and the shaped interpolated second signal.

The circuit 606 may be configured to determine an interpolated shaped projected interpolated first signal based on the shaped projected interpolated first signal and the shaped projected interpolated second signal.

The circuit 606 may be configured to determine the first projection information based on the estimated linear process, the interpolated first signal and the interpolated second signal such that a fifth absolute value of a fifth scalar product of the projected interpolated first signal and the interpolated shaped projected interpolated first signal is smaller than a sixth absolute value of a sixth scalar product of the interpolated first signal and the interpolated shaped interpolated first signal. Thus, the circuit 606 may be configured to effectively reduce the interference of downlink signals with signals that the second communication device 108 receives from other communication devices.

In an example, the circuit 606 may be a baseband circuit.

In an example, the circuit 606 may be configured to determine the estimated third signal state information based on weight factors that are associated with the received first signal, the received fourth signal, the received second signal and the received fifth signal based on distances of the first communication device 504 and the fifth communication device 510 to the second communication device 514. The weight of the weight factor decreases based on an increase of the distance of the respective communication device to the second communication device 510. Thus, the circuit 606 may be configured to increase the accuracy of the data basis for the determination of the projected signals.

In an example, the transmitter 604 may be configured to transmit signals based on at least one of time division multiplexing and frequency division multiplexing. The fourth communication device 506 may be configured to receive signals and transmit signals based on at least one of time division multiplexing and frequency division multiplexing.

In an example, the circuit 606 may be configured to transmit the fourth signal in a time period that follows the transmissions of the first signal. Thus, the first circuit 606 may be configured to flexibly and accurately determine the projected signal.

In an example, the sixth communication device may be configured to determine the estimated signal state information based on a received sample signal based on a sample signal that is transmitted from the first communication device and a sample signal that is transmitted from the fifth communication device. The received sample signals may include a pilot signal.

In an example, the first communication device and the fifth communication device may be configured to transmit sample signals based on a time division multiplexing technology. The first communication device and the fifth communication device may be configured to transmit pilot signals in time periods in which no pilot signal is transmitted from the third communication device. Thus, the sixth communication device may be configured to efficiently determine the estimated signal state information based on channel reciprocity. Further, the first communication device and the fifth communication device may be configured to transmit null subcarriers based on subcarriers that are transmitted by the third communication device and include pilot signals. Thus, the first communication device and the fifth communication device may be configured to increase the accuracy of determined channel parameters.

In an example, the sixth communication device may be configured to transmit sample signals based on a frequency division multiplexing technology. The sixth communication device may be configured to transmit pilot signals based on subcarriers based on which null subcarriers are transmitted from the third communication device. Thus, the sixth communication device may be configured to efficiently determine the estimated signal state information. Further, the sixth communication device may be configured to transmit null subcarriers based on which pilot signals are transmitted by the third communication device. The sixth communication device may be configured to transmit precoded signals instead of null subcarriers. Thus, the sixth communication device may be configured to increase the data rate.

In an example, aspects based on the circuit 406 of FIG. 4 may be aspects of the circuit 606.

In an example, the communication device 602 of FIG. 6 may be based on the communication devices based on FIG. 1, FIG. 2, FIG. 3, FIG. 4, FIG. 5 and FIG. 6.

It should be noted that aspects of the communication device 602 of FIG. 6 may be combined with aspects of the communication devices based on FIG. 1, FIG. 2, FIG. 3 and FIG. 4. Aspects of the communication device 602 of FIG. 6 may be combined with aspects of the scenarios based on FIG. 1, FIG. 2 and FIG. 5.

Figure 7:
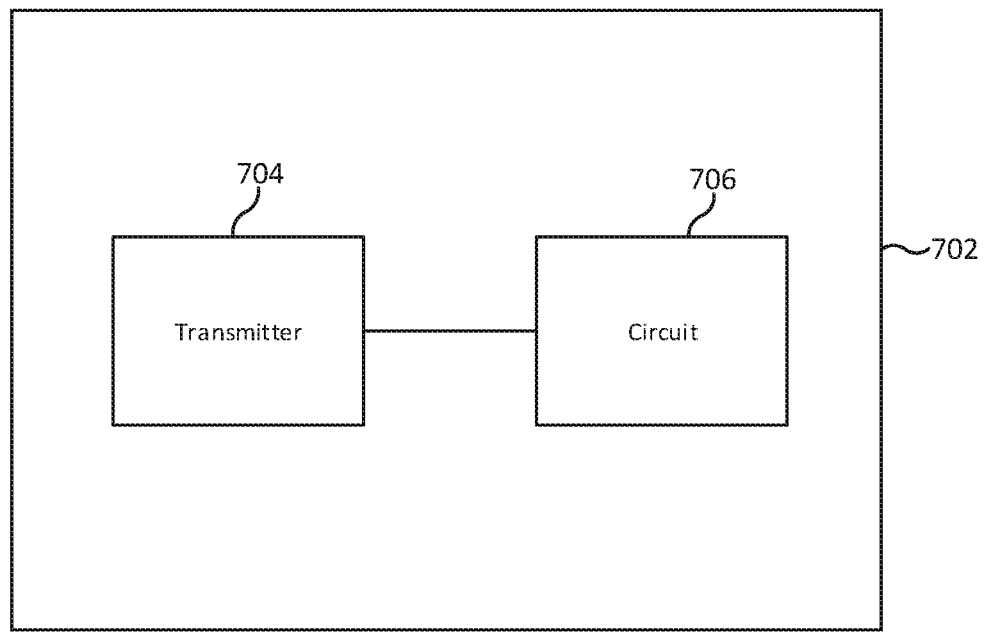
FIG. 7 shows a schematic diagram of a communication device that may include a transmitter and a circuit.

FIG. 7 shows a schematic diagram of a communication device 702 that may include a transmitter 704 and a circuit 706. The circuit 706 may be connected with the transmitter 704. Features of FIG. 7 that may be similar to features based on FIG. 5 and FIG. 6 may be referenced alike.

The circuit 706 may be configured to determine the estimated third signal state information based on an interpolation of the received third signal and a received sixth signal. Thus, the circuit 706 may be configured to accurately determine a data basis for the determination of the projected signals.

The circuit 706 may be configured to determine an interpolated third signal based on the third signal and the sixth signal.

A shaped interpolated third signal may be shaped based on the interpolated third signal in correspondence to the estimated second linear process.

The circuit 706 may be configured to determine a projected interpolated third signal based on the interpolated third signal and the second projection information.

A shaped projected interpolated third signal may be shaped based on the projected interpolated third signal in correspondence to the estimated second linear process.

A shaped interpolated fourth signal may be shaped based on the interpolated second signal in correspondence to the estimated second linear process.

The circuit 706 may be configured to determine a projected interpolated fourth signal based on the interpolated second signal and the second projection information.

A shaped projected interpolated fourth signal may be shaped based on the projected interpolated fourth signal in correspondence to the estimated second linear process.

The circuit 706 may be configured to determine an interpolated shaped interpolated third signal based on the shaped interpolated third signal and the shaped interpolated fourth signal.

The circuit 706 may be configured to determine an interpolated shaped projected interpolated third signal based on the shaped projected interpolated third signal and the shaped projected interpolated fourth signal.

The circuit 706 may be configured to determine the second projection information based on the estimated second linear process, the interpolated second signal and the interpolated third signal such that a seventh absolute value of a seventh scalar product of a projected interpolated third signal and the interpolated shaped projected interpolated third signal is smaller than an eighth absolute value of an eighth scalar product of the interpolated third signal and the interpolated shaped interpolated third signal. Thus, the circuit 706 may be configured to effectively reduce the interference of uplink signals with signals that the second communication device 108 receives from other communication devices.

In an example, the circuit 706 may be a baseband circuit.

In an example, the circuit 706 may be configured to determine the estimated third signal state information based on weight factors that are associated with the received third signal and the received sixth signal based on distances of the first communication device 504 and the fifth communication device 510 to the second communication device 510. The weight of the weight factor decreases based on an increase of the distance of the respective communication device to the second communication device 510. Thus, the circuit 706 may be configured to increase the accuracy of the data basis for the determination of the projected signals.

In an example, the transmitter 704 may be configured to transmit signals based on at least one of time division multiplexing and frequency division multiplexing.

In an example, aspects based on the circuit 606 of FIG. 6 may be aspects of the circuit 706.

In an example, the communication device 702 of FIG. 7 may be based on the communication devices of FIG. 1, FIG. 2, FIG. 3, FIG. 4, FIG. 5 and FIG. 6.

It should be noted that aspects of the communication device 702 of FIG. 7 may be combined with aspects of the communication devices based on FIG. 3, FIG. 4 and FIG. 6. Aspects of the communication device 702 of FIG. 7 may be combined with aspects of the scenarios based on FIG. 1, FIG. 2 and FIG. 5.

Figure 8:
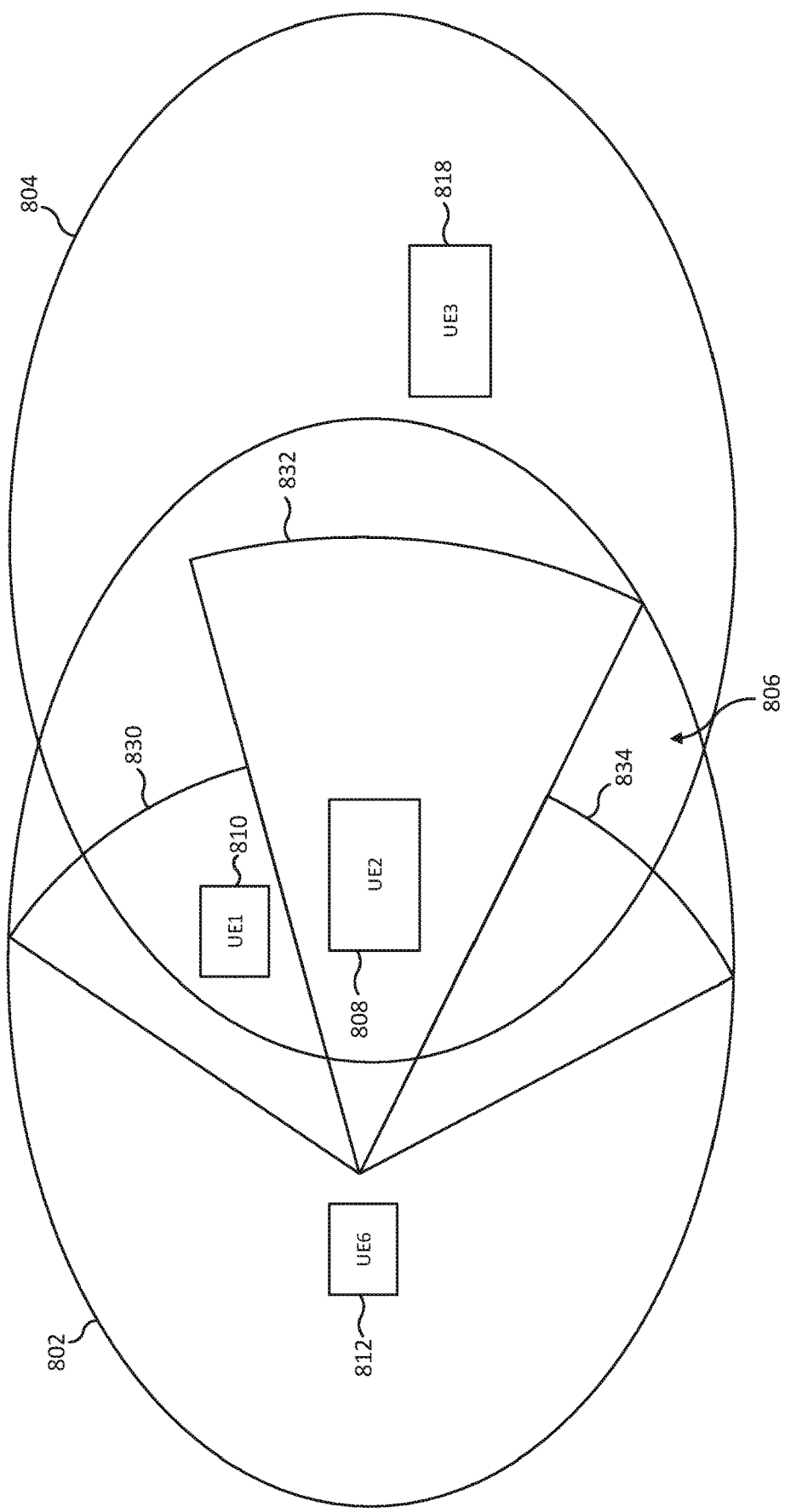
FIG. 8 shows a schematic diagram of a scenario in which a sixth communication device may be configured to transmit signals in a first cell based on a shared frequency range.

FIG. 8 shows a schematic diagram of a scenario in which a sixth communication device 812 may be configured to transmit signals in a first cell 802 based on a shared frequency range. A second communication device 808 may be configured to transmit signals in a second cell 804 based on the shared frequency range. The second cell 804 may share a shared area 806 with the first cell 802.

A first communication device 810 and the second communication device 808 may be configured to receive signals from the sixth communication device 812 based on the shared frequency range. A third communication device 818 may be configured to transmit signals to the second communication device 808 based on the shared frequency range.

The sixth communication device 812 may be configured to transmit the signals in a first sector 830, a second sector 832 and a third sector 834.

It should be noted that aspects of the scenario of FIG. 8 may be combined with aspects of the communication devices based on FIG. 3, FIG. 4, FIG. 6 and FIG. 7. Aspects of the scenario of FIG. 8 may be combined with aspects of the scenarios based on FIG. 1, FIG. 2 and FIG. 5.

Figure 9:
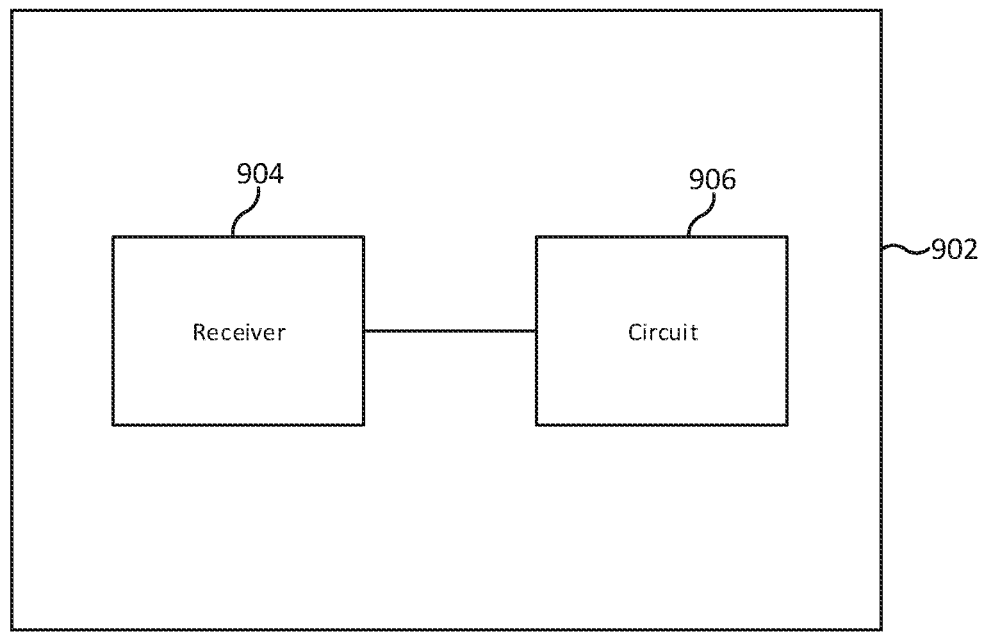
FIG. 9 shows a schematic diagram of a communication device that may include a receiver and a circuit.

FIG. 9 shows a schematic diagram of a communication device 902 that may include a receiver 904 and a circuit 906. The receiver 904 may be connected with the circuit 906. Features based on FIG. 8 that may be similar to features of FIG. 9 may be referenced alike.

The circuit 906 may be configured to determine formed signal based on a location information. The circuit 906 may be configured to determine the formed signal such that a received second energy based on the formed signal that is received from the second communication device 808 is smaller than a received first energy based on the formed signal that is received from the first communication device 810. Thus, the circuit 906 may be configured to effectively form signals based on a location of a communication device such that the received energy of the communication device is reduced.

In an example, the circuit 906 may be a baseband circuit.

In an example, the signals that are received from the first communication device may comprise the location information. Thus, the circuit 906 may be configured to obtain a reliable location information.

In an example, the formed signal may be based on the shared frequency.

In an example, the transmitter may be configured to transmit signals in a plurality of sectors in an angular distribution. The second communication device may be in the second sector 832. The circuit 906 may be configured to form the signal such that the transmitted power in the second sector 832 is smaller than each of the transmitted powers that are transmitted in different sectors based on the formed signal. Thus, the circuit 906 may be configured to efficiently reduce a received energy of the second communication device.

In an example, the formed signal is not transmitted in the second sector 832. Thus, the circuit 906 may be configured to reliably reduce a received energy of the second communication device.

In an example, the communication device 902 of FIG. 9 may be based on the communication devices based on FIG. 1, FIG. 2, FIG. 3, FIG. 4, FIG. 5, FIG. 6, FIG. 7 and FIG. 8.

It should be noted that aspects of the communication device 902 of FIG. 9 may be combined with aspects of the communication devices based on FIG. 3, FIG. 4, FIG. 6 and FIG. 7. Aspects of the communication device 902 of FIG. 9 may be combined with aspects of the scenarios based on FIG. 1, FIG. 2, FIG. 5 and FIG. 8.

Figure 10:
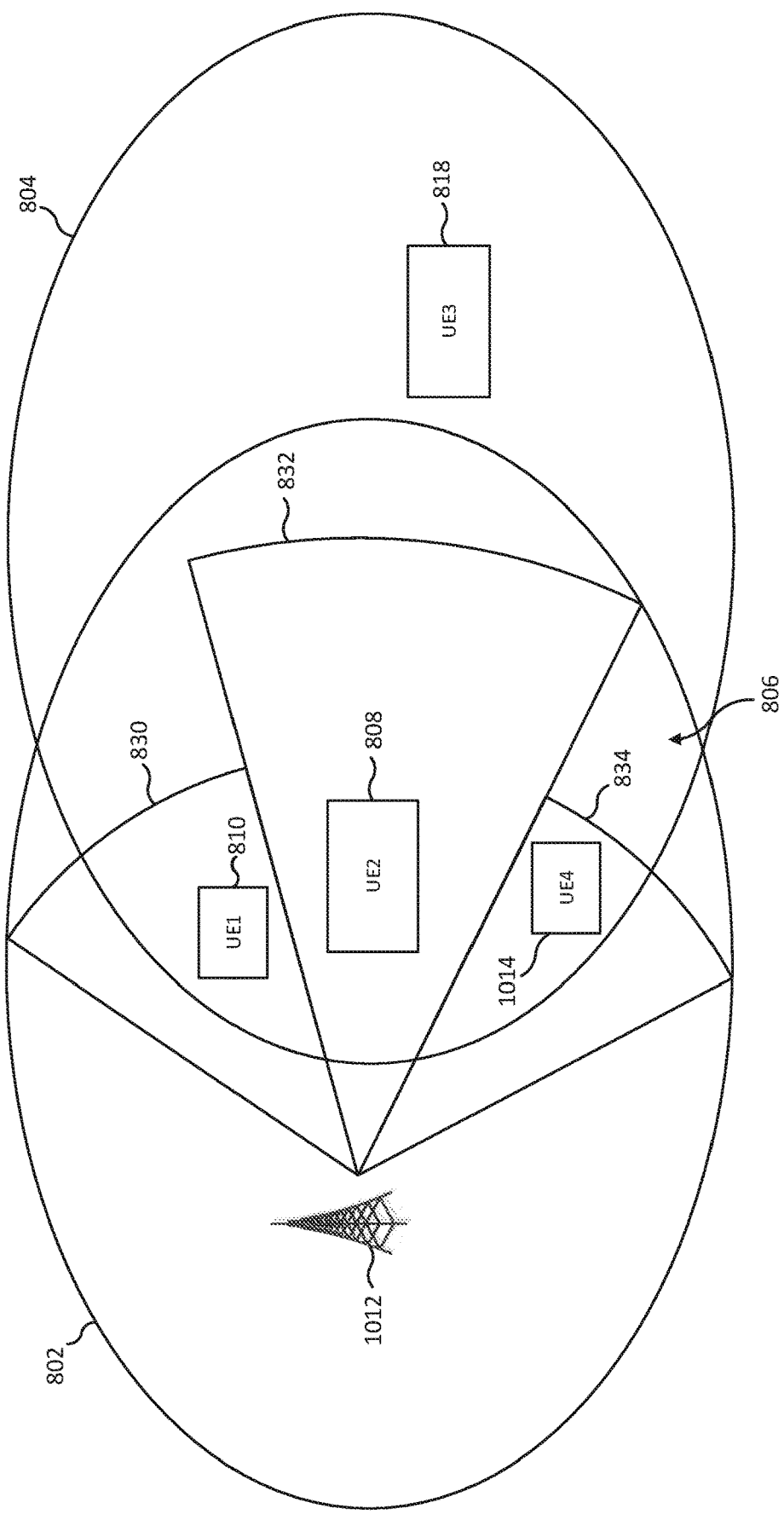
FIG. 10 shows a schematic diagram of a scenario in which a use of the shared frequency range is restricted in an Exclusion-, Protection- or Restriction zone.

FIG. 10 shows a schematic diagram of a scenario in which a use of the shared frequency range is restricted in an Exclusion-, Protection- or Restriction (EPR) zone 804. Features FIG. 10 that may be similar to features based on FIG. 8 may be referenced alike.

A base station 1012 may be configured to provide radio frequency connections based on the shared frequency range in a first cell 802. The base station 1012 may be configured to transmit signals in the first sector 830 and the second sector 834. Further, the base station 1012 may be configured to provide radio frequency connections based on a second frequency range that is different from the shared frequency range. The base station 1012 may be based on the communication device 902 of FIG. 9.

The first communication device 810 may be configured to receive signals based on the second frequency range in the first sector 830. The second communication device 808 may be configured to receive signals from the third communication device 818 based on the shared frequency range. A fourth communication device 1014 may be configured to receive signals based on the shared frequency range in the third sector 834.

The base station 1012 may be configured to prevent radio frequency transmissions based on the shared frequency range in the second sector 832. Thus, an interference of signals that are received by the second communication device 808 with signals of the third communication device 818 may be reliably reduced.

In an example, aspects of the communication device 902 based on FIG. 9 may be aspects of the base station 1012.

It should be noted that aspects of the scenario of FIG. 10 may be combined with aspects of the communication devices based on FIG. 3, FIG. 4, FIG. 6, FIG. 7 and FIG. 9. Aspects of the scenario of FIG. 10 may be combined with aspects of the scenarios based on FIG. 1, FIG. 2, FIG. 5 and FIG. 8.

Figure 11:
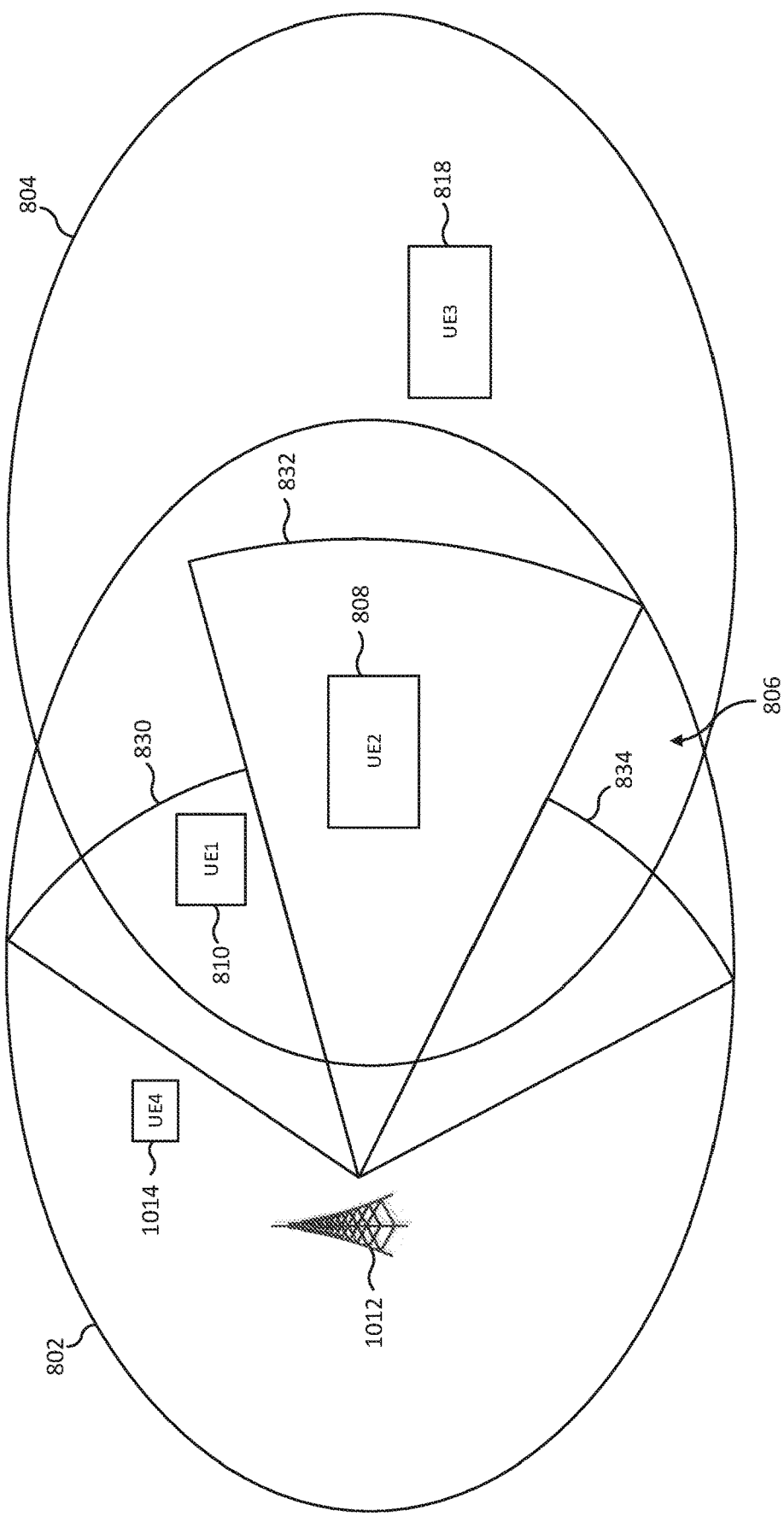
FIG. 11 shows a schematic diagram of a scenario in which the base station may be configured to provide a radio frequency connection to the fourth communication device.

FIG. 11 shows a schematic diagram of a scenario in which the base station 1012 may be configured to provide a radio frequency connection to the fourth communication device 1014. Features of FIG. 11 that may be similar to features based on FIG. 10 may be referenced alike.

The fourth communication device 1014 may be in the first cell 802 and outside of the EPR zone 804. The fourth communication device 1014 may be configured to connect with the base station 1012 based on the second frequency range.

In an example, aspects of the base station 1012 of FIG. 10 may be aspects of the base station 1012 of FIG. 11.

Aspects of FIG. 11 may be combined with aspects based on FIG. 8 and FIG. 10.

It should be noted that aspects of the scenario of FIG. 11 may be combined with aspects of the communication devices based on FIG. 3, FIG. 4, FIG. 6, FIG. 7 and FIG. 9. Aspects of the scenario of FIG. 11 may be combined with aspects of the scenarios based on FIG. 1, FIG. 2, FIG. 5, FIG. 8 and FIG. 10.

Figure 12:
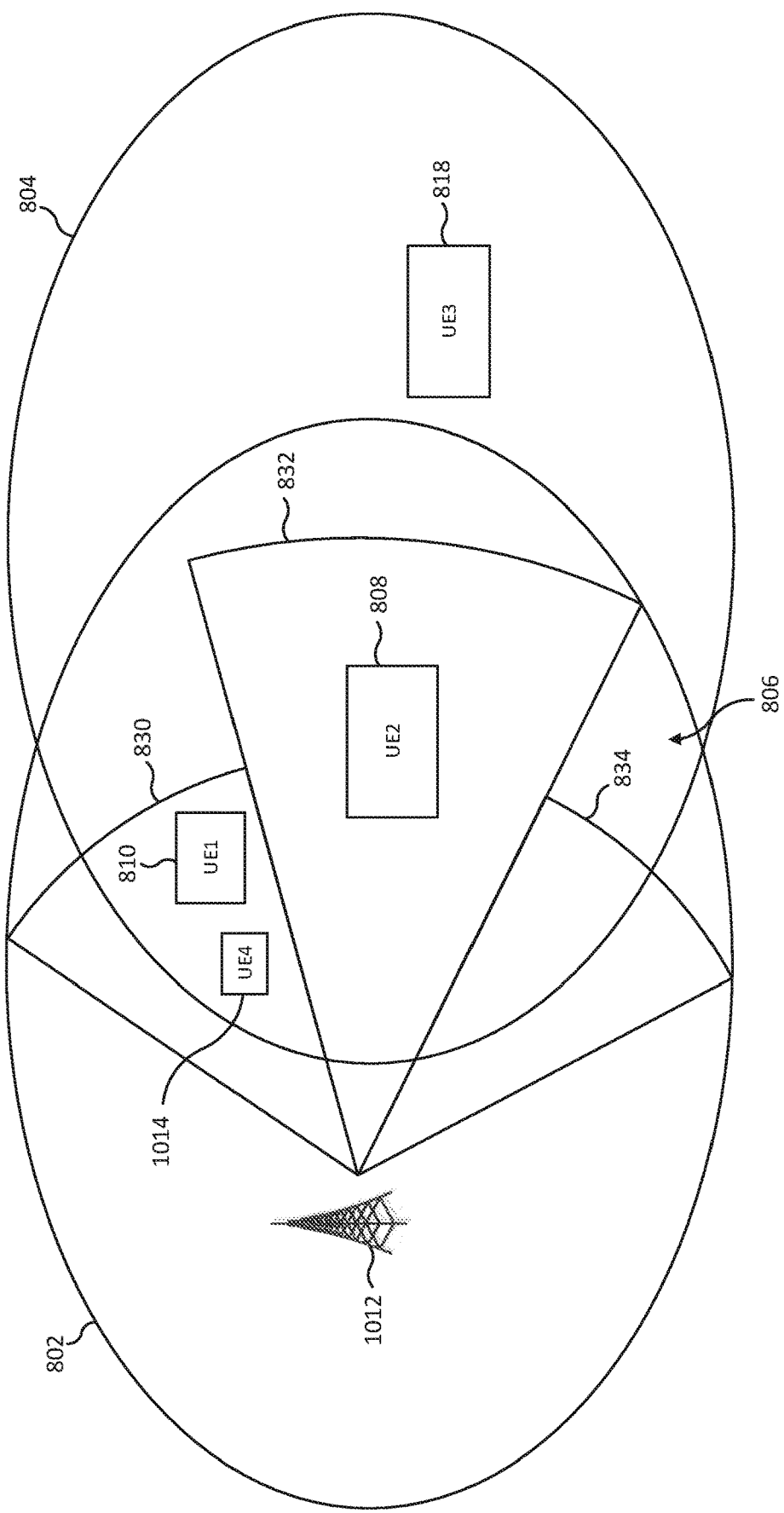
FIG. 12 shows a schematic diagram of a scenario in which the fourth communication device may be moved to the shared area to the first sector.

FIG. 12 shows a schematic diagram of a scenario in which the fourth communication device 1014 may be moved to the shared area 806 to the first sector 830. Features of FIG. 12 that may be similar to features based on FIG. 11 may be referenced alike.

The fourth communication device 1014 may be configured to perform a handover procedure from the second frequency range to the shared frequency range in case a change of frequencies is desired.

Aspects of FIG. 12 may correspond to aspects based on FIG. 8, FIG. 10 and FIG. 11.

It should be noted that aspects of the scenario of FIG. 12 may be combined with aspects of the communication devices based on FIG. 3, FIG. 4, FIG. 6, FIG. 7 and FIG. 9. Aspects of the scenario of FIG. 12 may be combined with aspects of the scenarios based on FIG. 1, FIG. 2, FIG. 5, FIG. 8, FIG. 10 and FIG. 11.

Figure 13:
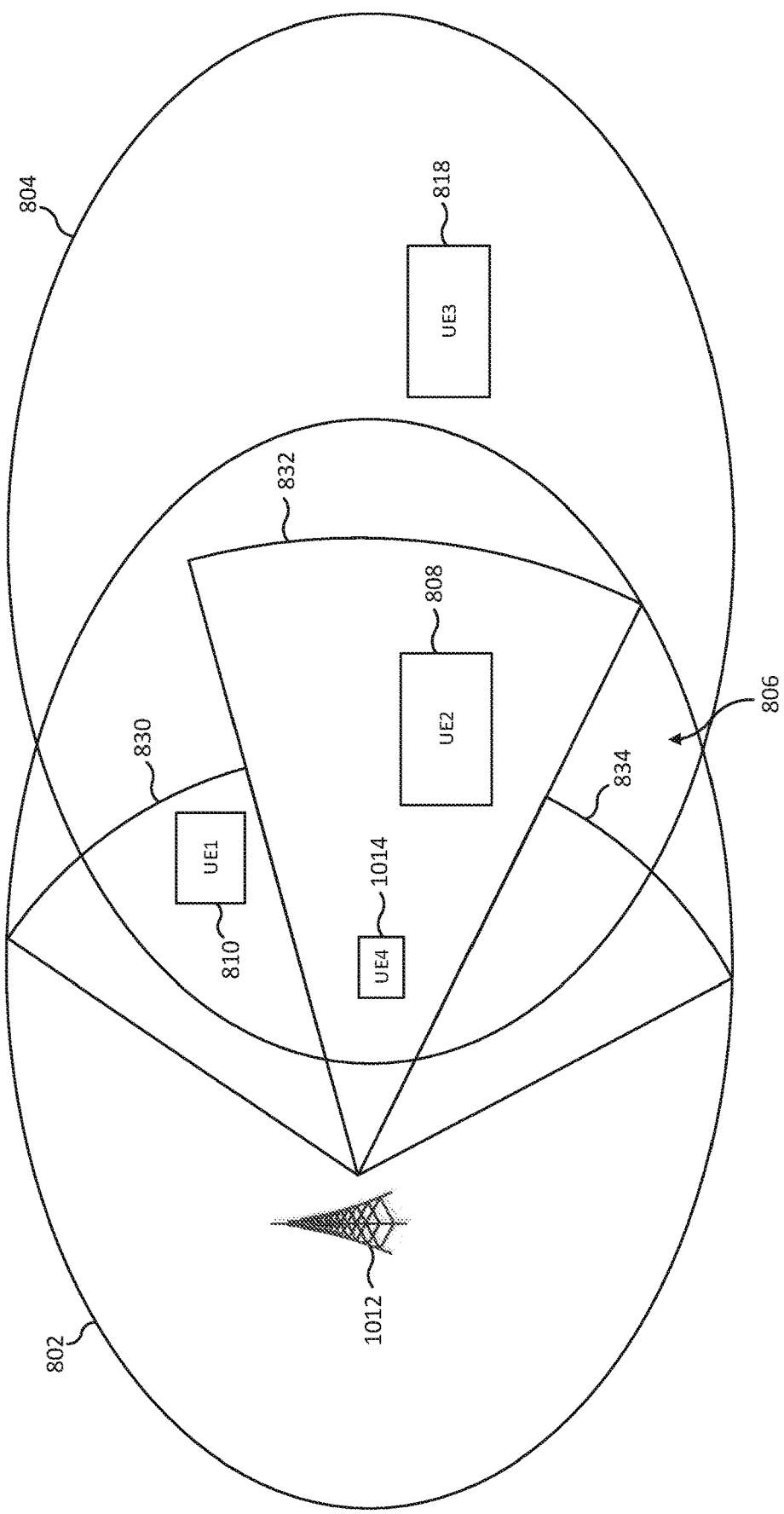
FIG. 13 shows a schematic diagram of a scenario in which the fourth communication device may be moved in the shared area to the second sector.

FIG. 13 shows a schematic diagram of a scenario in which the fourth communication device 1014 may be moved in the shared area 806 to the second sector 832.

The fourth communication device 1014 may be configured to perform a handover procedure from the shared frequency range to the second frequency range.

Aspects of FIG. 13 may be combined with aspects based on FIG. 8, FIG. 10, FIG. 11 and FIG. 12.

It should be noted that aspects of the scenario of FIG. 13 may be combined with aspects of the communication devices based on FIG. 3, FIG. 4, FIG. 6, FIG. 7 and FIG. 9. Aspects of the scenario of FIG. 13 may be combined with aspects of the scenarios based on FIG. 1, FIG. 2, FIG. 5, FIG. 8, FIG. 10, FIG. 11 and FIG. 12.

Figure 14:
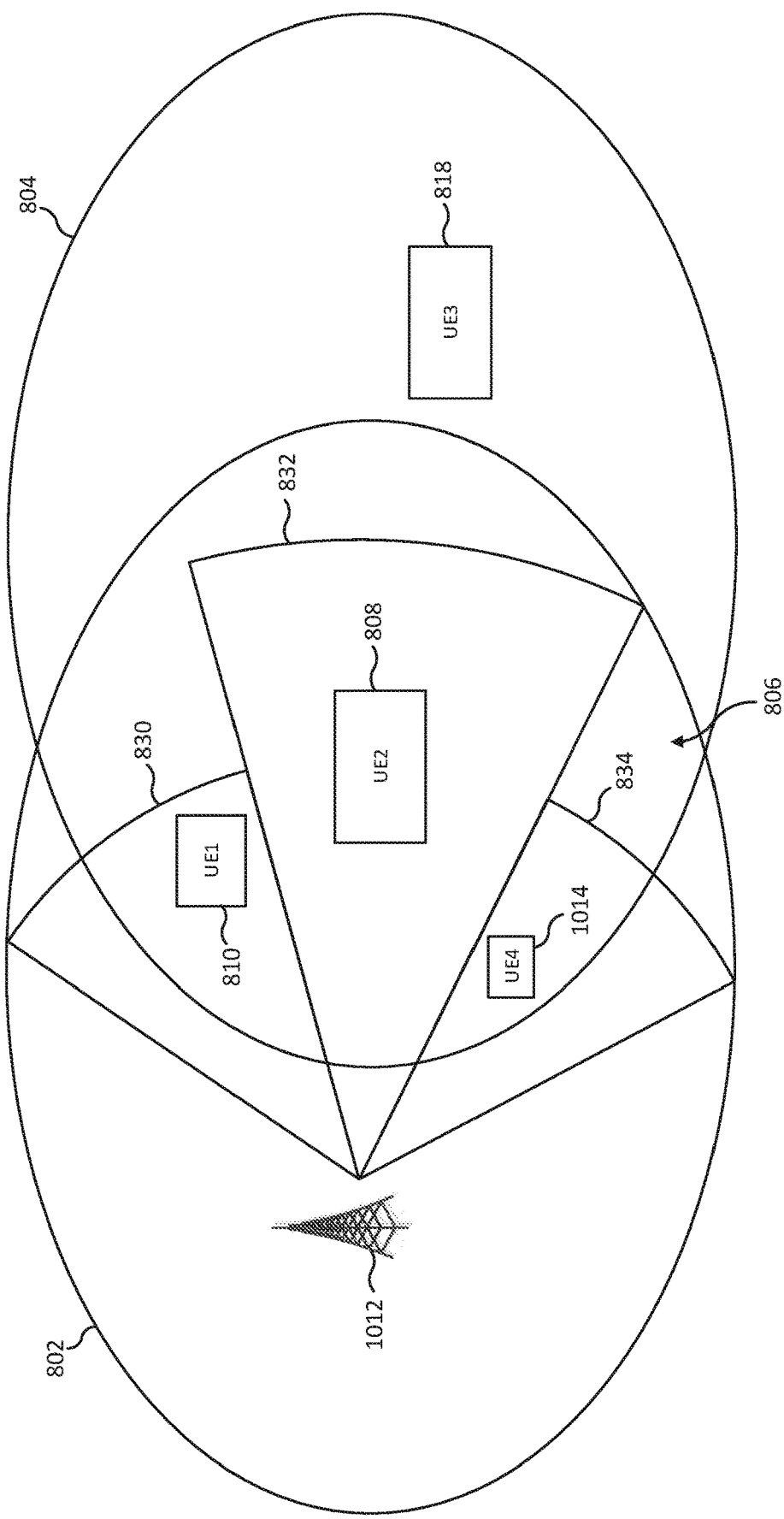
FIG. 14 shows a schematic diagram of a scenario in which the fourth communication device may be moved in the shared area to the third sector.

FIG. 14 shows a schematic diagram of a scenario in which the fourth communication device 1014 may be moved in the shared area 806 to the third sector 833.

The fourth communication device 1014 may be configured to perform a handover procedure from the shared frequency range to the second frequency range in case a change of frequencies is desired.

If a connection based on the shared frequency range and the second frequency range is desired the fourth communication device 1014 may be configured to perform an initialization procedure for an additional connection to the base station 1012 based on the shared frequency range.

Aspects of FIG. 13 may correspond to aspects based on FIG. 8, FIG. 10, FIG. 11, FIG. 12 and FIG. 13.

It should be noted that aspects of the scenario of FIG. 14 may be combined with aspects of the communication devices based on FIG. 3, FIG. 4, FIG. 6, FIG. 7 and FIG. 9. Aspects of the scenario of FIG. 14 may be combined with aspects of the scenarios based on FIG. 1, FIG. 2, FIG. 5, FIG. 8, FIG. 10, FIG. 11, FIG. 12 and FIG. 13.

Figure 15:
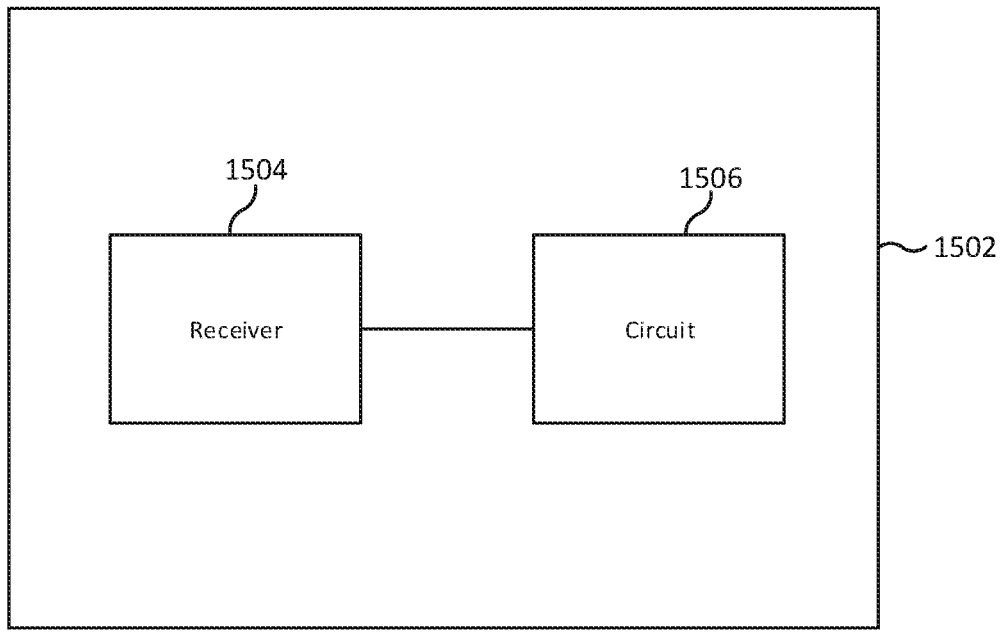
FIG. 15 shows a schematic diagram of a communication device that may include a receiver and a circuit.

FIG. 15 shows a schematic diagram of a communication device 1502 that may include a receiver 1504 and a circuit 1506. The receiver 1504 may be connected with the circuit 1506. Features of FIG. 15 that may be similar to features based on FIG. 9 may be referenced alike.

The circuit 1506 may be configured to transmit a first signal and the formed signal. The circuit 1506 may be configured to estimate a signal state information to determine an estimated signal state information. The signal state information may be based on a received first signal that is received from the second communication device 808 based on the first signal.

The circuit 1506 may be configured to determine the shaped formed signal based on the formed signal received from the second communication device and filtered by a filter of the second communication device.

The circuit 1506 may be configured to determine a shaped signal based on the received first signal filtered by the filter of the second communication device.

The circuit 1506 may be configured to determine the formed signal based on the estimated signal state information and the second signal such that an energy of the shaped formed signal is smaller than an energy of the shaped signal. Thus, the circuit 1506 may be configured to effectively reduce a received interference energy at a second communication device based on signals from a third communication device.

In an example, the circuit 1506 may be a baseband circuit.

In an example, the circuit 1506 may be configured to determine the shaped formed signal based on the formed signal such that the formed signal is shaped based on the estimated signal state information and filtered by the filter of the second communication device.

In an example, the circuit 1506 may be configured to determine a shaped signal based on a second signal such that the second signal is shaped based on the estimated signal state information and filtered by the filter of the second communication device.

In an example, aspects of the circuit 906 of FIG. 9 may be aspects of the circuit 1506.

In an example, the communication device 1502 of FIG. 15 may be based on the communication devices based on FIG. 3, FIG. 4, FIG. 6, FIG. 7 and FIG. 9. In an example, aspects of the communication devices based on FIG. 3, FIG. 4, FIG. 6, FIG. 7 and FIG. 9 may be aspects of the communication device 1502 of FIG. 15.

It should be noted that aspects of the communication device 1502 of FIG. 15 may be combined with aspects of the communication devices based on FIG. 3, FIG. 4, FIG. 6, FIG. 7 and FIG. 9. Aspects of the communication device 1502 of FIG. 15 may be combined with aspects of the scenarios based on FIG. 1, FIG. 2, FIG. 5, FIG. 8, FIG. 10, FIG. 11, FIG. 12, FIG. 13 and FIG. 14.

Figure 16:
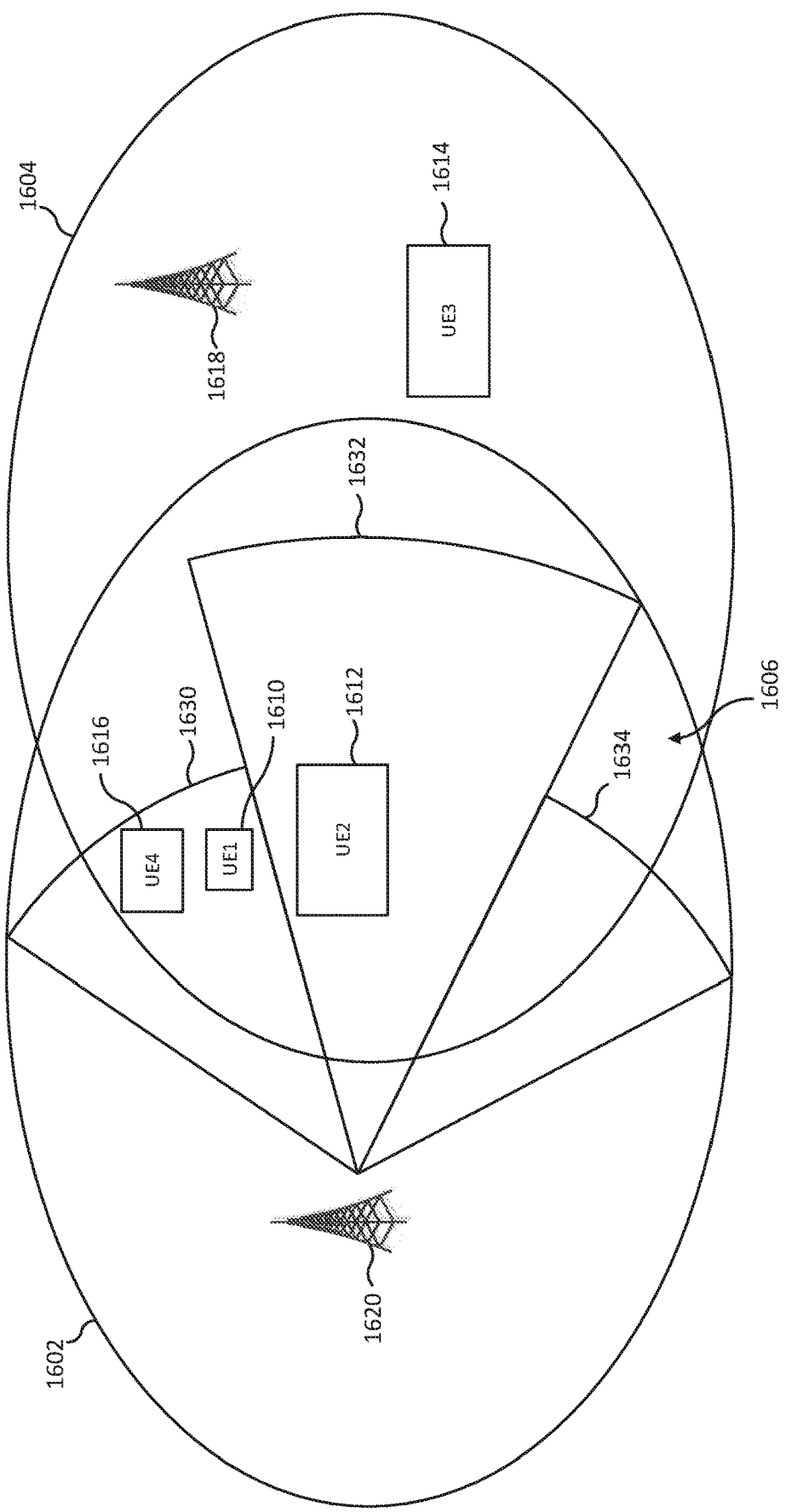
FIG. 16 shows a schematic diagram of a scenario in which a first base station may be configured to provide radio frequency connections based on a first frequency.

FIG. 16 shows a schematic diagram of a scenario in which a first base station 1618 may be configured to provide radio frequency connections based on a first frequency. A first communication device 1610 may be configured to receive signals based on the first frequency. A second base station 1620 may be configured to provide radio frequency connections based on a shared frequency and based on a second frequency in a first cell 1602. A fourth communication device 1616 may be configured to connect via radio frequency connections based on the first frequency and the shared frequency. A second communication device 1612 may be configured to provide radio frequency connections based on the shared frequency in a second cell 1604. The second cell 1604 may cover a shared area 1606 that may be covered from the first cell 1602. A third communication device 1614 may be configured to connect via radio frequency connections to the second communication device 1612 based on the shared frequency. The second base station 1620 may be configured to transmit signals in a first sector 1630 and a third sector 1634. Further, the second base station 1620 may be configured to prevent to transmit signals in a second sector 1632.

In an example, the fourth communication device 1616 may be connected with the second base station 1620 based on the second frequency. The fourth communication device 1620 may be configured to select the second base station 1620 based on the shared frequency. Thus, the fourth communication device 1620 may be configured to flexibly select a connection that provides a higher data rate.

In an example, the fourth communication device 1616 may be connected with the second base station 1620 based on the second frequency. The fourth communication device 1620 may be configured to select the second base station 1620 based on the shared frequency in addition to the connection based on the second frequency. Thus, the fourth communication device 1616 may be configured to exploit the available spectrum to increase data rates, provide a stable connection and flexibly utilize one connection as downlink and the other connection as uplink.

In an example, the fourth communication device 1616 may be connected with the first base station 1618 based on the first frequency. The fourth communication device 1620 may be configured to select the second base station 1620 based on the shared frequency. Thus, the fourth communication device 1620 may be configured to flexibly select a connection that provides a higher data rate.

In an example, the fourth communication device 1616 may be connected with the first base station 1618 based on the first frequency. The fourth communication device 1620 may be configured to select the second base station 1620 based on the shared frequency in addition to the connection to the first base station 1618 based on the first frequency. Thus, the fourth communication device 1616 may be configured to exploit the available spectrum to increase data rates, provide a reliable connection and flexibly utilize one connection as downlink and the other connection as uplink.

In an example, the fourth communication device 1616 may be connected to the first base station 1618 based on the first frequency. The fourth communication device 1616 may be configured to receive a signal from the first base station 1618 that may include a reselection prevention information. The reselection prevention information may indicate that the fourth communication device 1616 is prohibited to select a base station based on the first frequency.

It should be noted that aspects of the scenario of FIG. 16 may be combined with aspects of the communication devices based on FIG. 3, FIG. 4, FIG. 6, FIG. 7, FIG. 9 and FIG. 15. Aspects of the scenario of FIG. 16 may be combined with aspects of the scenarios based on FIG. 1, FIG. 2, FIG. 5, FIG. 8, FIG. 10, FIG. 11, FIG. 12, FIG. 13 and FIG. 14.

Figure 17:
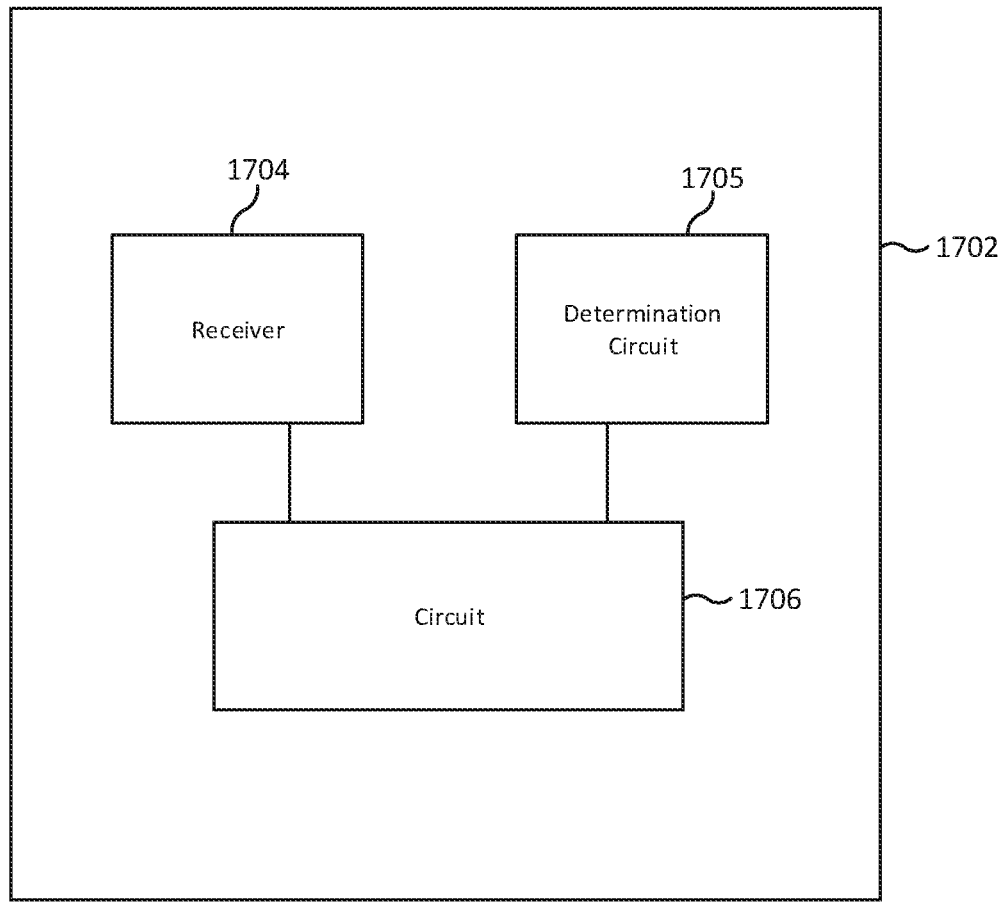
FIG. 17 shows a schematic diagram of a first communication device that may include a receiver, a determination circuit and a circuit.

FIG. 17 shows a schematic diagram of a first communication device 1702 that may include a receiver 1704, a determination circuit 1705 and a circuit 1706. The receiver 1704 may be connected with the determination circuit 1705. The determination circuit 1705 may be connected with the circuit 1706.

The receiver 1704 may be configured to receive a first signal from the second base station and a second signal from the third communication device. The first signal and the second signal may be based on a shared frequency.

The determination circuit 1705 may be configured to determine a first power level of the first signal and a second power level of the second signal.

The circuit 1706 may be configured to determine a power ratio of the first power level to the second power level. The circuit 1706 may be configured to determine a third signal that comprises an interference parameter information based on the power ratio. Thus, the first communication device 1702 may be configured to measure an interference level of signals from a base station with signals from a third communication device. Further, the first communication device 1702 may be configured to efficiently inform about an interference level of a base station and a communication device.

In an example, the circuit 1706 may be a baseband circuit.

In an example, the circuit 1706 may be configured to determine the interference parameter to indicate if the power ratio is smaller than a threshold.

In an example, the second communication device 1612 may be configured to provide the threshold to the first communication device 1702.

In an example, the second communication device 1612 may be configured to provide the threshold to the first communication device 1702. The threshold may indicate a required minimum signal to interference ratio. The signal to interference ratio may be a ratio of a first power level of a received first signal received by the second communication device 1612 to a received interference signal received by the second communication device.

In an example, the second communication device 1612 may be configured to determine a filter characteristic vector provided to filter the received signal. The filter characteristic vector may be based on a vector of received signals received by a multiple input multiple output receiver. Further, the second communication device 1612 may be configured to transmit the information representative of the determined filter characteristic vector to the other communication device.

In an example, the first communication device 1702 may be configured to periodically determine the signal to interference ratios and report the determined signal to interference ratios to the second base station and/or the fourth communication device 1902. Thus, the first communication device may be effectively configured to reliably reduce an interference at the incumbent base station with signals that are received at the incumbent base station in the first radio frequency range.

In an example, the first communication device 1702 may be configured to receive the threshold from the second communication device. Thus, the communication system may be configured to reliably reduce an interference of interference signals based on the shared frequency with signals of a third communication device at a second communication device.

In an example, the first communication device 1702 of FIG. 17 may be based on the communication devices based on FIG. 3, FIG. 4, FIG. 6, FIG. 7, FIG. 9 and FIG. 15.

It should be noted that aspects of the first communication device 1702 of FIG. 17 may be combined with aspects of the communication devices based on FIG. 3, FIG. 4, FIG. 6, FIG. 7, FIG. 9 and FIG. 15. Aspects of the first communication device 1702 of FIG. 17 may be combined with aspects of the scenarios based on FIG. 1, FIG. 2, FIG. 5, FIG. 8, FIG. 10, FIG. 11, FIG. 12, FIG. 13, FIG. 14 and FIG. 16.

Figure 18:
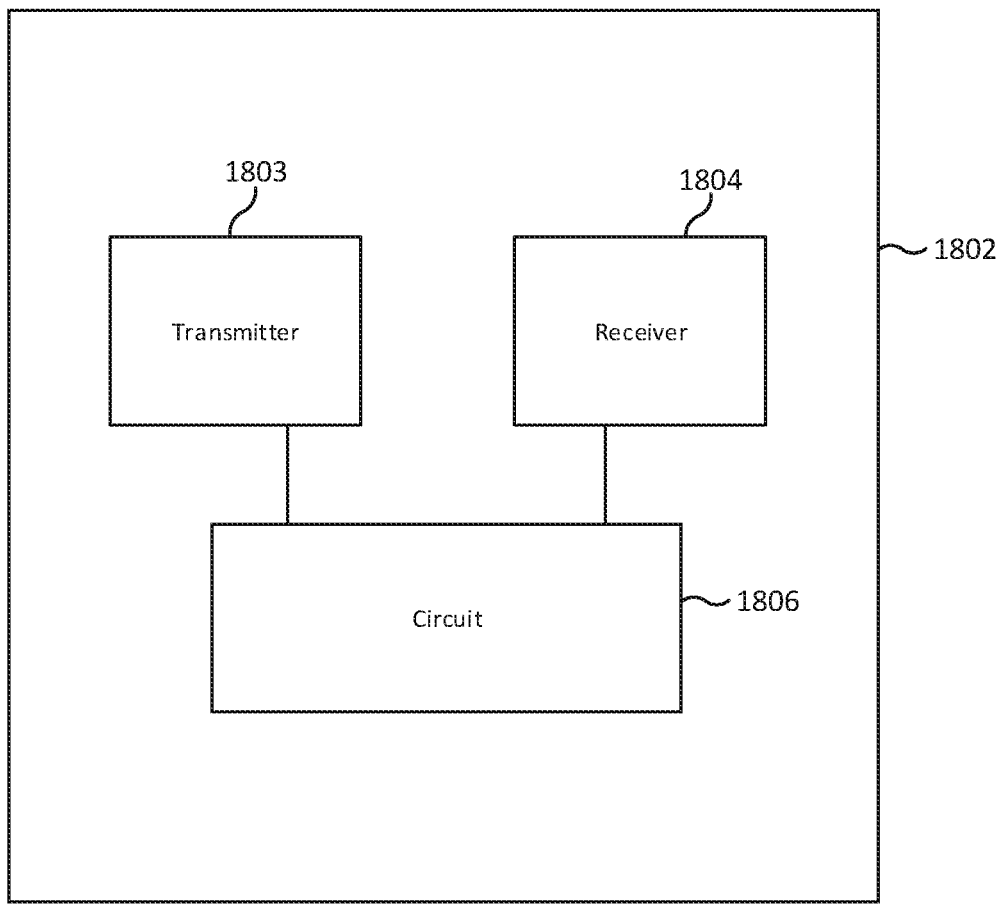
FIG. 18 shows a schematic diagram of the second base station that may include a transmitter, a receiver and a circuit.

FIG. 18 shows a schematic diagram of the second base station 1802 that may include a transmitter 1803, a receiver 1804 and a circuit 1806. The receiver 1804 may be connected with the circuit 1806.

The transmitter 1803 may be configured to transmit signals based on a shared frequency.

The receiver 1804 may be configured to receive a connection request signal based on the shared frequency from a fourth communication device.

The circuit 1806 may be configured to determine a first signal based on the shared frequency that comprises a request information of an interference parameter. The circuit 1806 may be configured to determine signals based on the interference parameter to transmit based on the shared frequency. Thus, the second base station 1802 may be configured to efficiently determine if an interference level of downlink signals is low enough to provide a connection based on the downlink signals. The request information of the interference parameter may include a request to receive the interference parameter.

In an example, the circuit 1806 may be a baseband circuit.

In an example, if the measured signal to interference ratio in a search process of a fourth communication device 1902 in all frequency bands of the second base station 1802 is greater than the threshold the second base station 1802 may be configured to transmit a message to the fourth communication device 1902 that indicates that the fourth communication device 1902 may be prohibited from selecting the second base station 1802. The second base station 1802 may be barred. Thus, the second base station 1802 may be configured to effectively prevent high interference levels with signals of a third communication device at the second communication device.

In an example, the second base station 1802 of FIG. 18 may be based on the communication devices based on FIG. 3, FIG. 4, FIG. 6, FIG. 7, FIG. 9, FIG. 15 and FIG. 17.

It should be noted that aspects of the second base station 1802 of FIG. 18 may be combined with aspects of the communication devices based on FIG. 3, FIG. 4, FIG. 6, FIG. 7, FIG. 9, FIG. 15 and FIG. 17. Aspects of the second base station 1802 of FIG. 18 may be combined with aspects of the scenarios based on FIG. 1, FIG. 2, FIG. 5, FIG. 8, FIG. 10, FIG. 11, FIG. 12, FIG. 13, FIG. 14 and FIG. 16.

Figure 19:
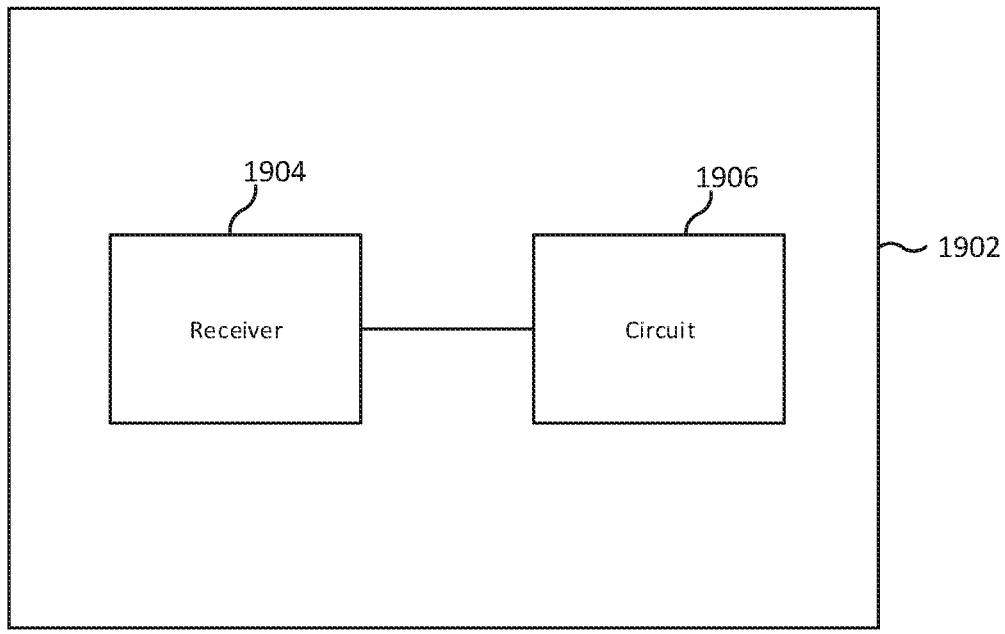
FIG. 19 shows a schematic diagram of a fourth communication device that may include a receiver and a circuit.

FIG. 19 shows a schematic diagram of a fourth communication device 1902 that may include a receiver 1904 and a circuit 1906. The receiver 1904 may be connected with the circuit 1906.

The receiver 1904 may be configured to receive signals from base stations.

The circuit 1906 may be configured to select a second base station from the base stations. The first base station may be configured to transmit a first signal. A first communication device may be configured to receive a received first signal. A third communication device may be configured to transmit a second signal. The first communication device may be configured to receive a received second signal. A parameter may be based on a first power level of the first signal and a second power level of the second signal. The circuit 1906 may be configured to select the first base station based on the parameter. Thus, the fourth communication device 1902 may be configured to effectively connect to a base station based on a restricted frequency.

In an example, the circuit 1906 may be a baseband circuit.

In an example, the circuit 1906 may be configured to determine a signal selection receive level $S_{rxlev}$ of a third signal that is received from the second base station based on measured signal receive level $Q_{rxlevmeas}$ of the third signal, a minimum required receive level $Q_{rxlevmin}$, a first offset $Q_{rxlevminoffset}$, a maximum uplink transmission power level $P_{EMAX}$, a maximum radio frequency output $P_{PowerClass}$, a compensation power level $P_{compensation}$ and a temporarily applied offset $Q_{offsettemp}$ by a formula (30):

$$S_{rxlev} = Q_{rxlevmeas} - (Q_{rxlevmin} + Q_{rxlevminoffset}) - \max(P_{EMAX} - P_{PowerClass}, 0) - Q_{offsettemp}. \quad (30)$$

Further, the circuit 1906 may be configured to determine a signal selection quality value $S_{qual}$ of the third signal based on a measured signal quality value of the third signal $Q_{qualmeas}$, a minimum required quality level of the signal $Q_{qualmin}$, an offset $Q_{qualminoffset}$ that may be an offset to the signaled $Q_{qualmin}$ and a temporarily applied offset $Q_{offsettemp}$ by a formula (31):

$$S_{qual} = Q_{qualmeas} - (Q_{qualmin} + Q_{qualminoffset}) - Q_{offsettemp}. \quad (31)$$

The circuit 1906 may be configured to select the second base station only if the signal selection receive level $S_{rxlev}$ of the third signal is greater than zero and the signal selection quality value $S_{qual}$ of the third signal is greater than zero. Thus, the communication device 1902 may be configured to ensure a minimally required signal quality of a radio frequency signal.

In an example, the fourth communication device 1902 may be configured to exclude a barred base station and base stations based on the same frequency as the frequency with respect to which the barred base station is barred as candidate for selection in a time period of 300 seconds. Thus, the fourth communication device 1902 may be configured to avoid unnecessary traffic.

In an example, the fourth communication device 1902 of FIG. 19 may be based on the communication devices based on FIG. 3, FIG. 4, FIG. 6, FIG. 7, FIG. 9, FIG. 15, FIG. 17 and FIG. 18.

It should be noted that aspects of the fourth communication device 1902 of FIG. 19 may be combined with aspects of the communication devices based on FIG. 3, FIG. 4, FIG. 6, FIG. 7, FIG. 9, FIG. 15, FIG. 17 and FIG. 18. Aspects of the fourth communication device 1902 of FIG. 19 may be combined with aspects of the scenarios based on FIG. 1, FIG. 2, FIG. 5, FIG. 8, FIG. 10, FIG. 11, FIG. 12, FIG. 13, FIG. 14 and FIG. 16.

Figure 20:
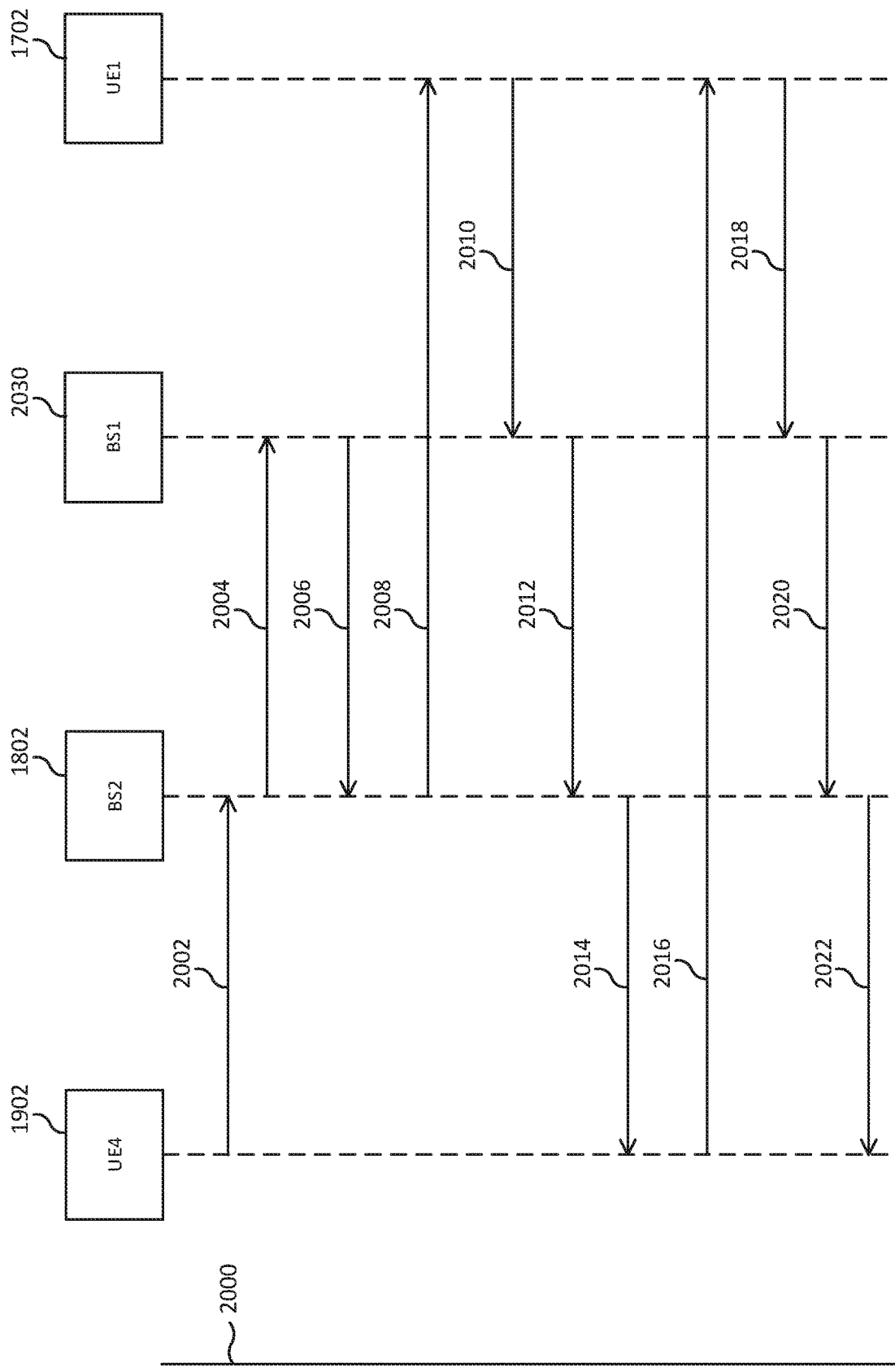
FIG. 20 shows a schematic diagram of a selection scenario which may be based on the first communication device, the second base station and the fourth communication device.

FIG. 20 shows a schematic diagram of a selection scenario which may be based on the first communication device 1702 of FIG. 17, the second base station 1802 of FIG. 18 and the fourth communication device 1902 of FIG. 19. The diagram shows an execution flow of execution steps that the fourth communication device 1902, the second base station 1802, a first base station 2030 and the first communication device 1702 may be configured to execute in a time order that may be indicated by a time axis 2000.

A second communication device may be configured to transmit and receive signals based on a shared frequency band in a first cell. The second base station 1802 may be configured to transmit signals based on the shared frequency band in a second cell. The second cell may cover a shared area that may be covered by the first cell. The fourth communication device 1902 and the first communication device 1702 may be located in the shared area. Further, a third communication device may be configured to transmit signals based on the shared frequency band.

In 2002, the fourth communication device 1902 may be configured to scan all radio frequency channels based on a shared frequency band. In an example, the scan may be restricted to frequency bands based on a Universal Mobile Telecommunications System (UMTS) of an evolved UMTS Terrestrial Radio Access (e-UTRA) system. Further, the fourth communication device 1902 may be configured to base stations based on a shared frequency band that have a selection receive level $S_{rxlev}$ that is greater than zero and a selection quality value $S_{qual}$ that is greater than zero. Further, the fourth communication device 1902 may be configured to select a base station from the detected base stations that has the greatest signal power from the detected base stations. Moreover, the fourth communication device 1902 may be configured to send a feedback signal that includes an information about the selected base station to the second base station 1802.

In 2004, the second base station 1802 may be configured to request an information that indicates a communication device such that the distance of the communication device to the second communication device is a smallest distance from distances of communication devices that are available in the second cell.

In 2006, the first base station 2030 may be configured to determine a communication device that may be located closest to the second communication device and to send the requested information to the second base station 1802.

In 2008, the second base station 1802 may be configured to transmit a first reference signal based on the shared frequency band.

In 2010, the first communication device 1702 may be configured to determine a first interference power level of a received first signal based on the first reference signal and a second power level of a received second signal that is transmitted by the third communication device and received from the first communication device 1702. Moreover, the first communication device 1702 may be configured to determine a first signal to interference ratio of the first interference power level to the second power level. The first communication device 1702 may be configured to determine a first interference parameter to indicate if the first signal to interference ratio is smaller than a threshold. Further, the first communication device 1702 may be configured to transmit the first interference parameter to the first base station 2030. In an example, the first communication device 1702 may be configured to transmit the first interference parameter to the second base station 1802.

In 2012, the first base station 2030 may be configured to transmit the first interference parameter to the second base station 1802.

In 2014, if the first signal to interference ratio is smaller than a threshold the second base station 1802 may be configured to establish a downlink connection with the fourth communication device 1902. Further, the second base station 1802 may be configured to request the transmission of a second reference signal based on the shared frequency band from the fourth communication device 1902. If the first signal to interference ratio is greater than the threshold the second base station 1802 may be configured to refuse a downlink connection with the fourth communication device 1902.

In 2016, the fourth communication device 1902 may be configured to transmit a second reference signal based on the shared frequency band.

In 2018, the first communication device 1702 may be configured to determine a third interference power level of a received third signal based on the second reference signal. Moreover, the first communication device 1702 may be configured to determine a second signal to interference ratio of the third interference power level to the second power level. The first communication device 1702 may be configured to determine a second interference parameter to indicate if the second signal to interference ratio is smaller than a threshold. Further, the first communication device 1702 may be configured to transmit the second interference parameter to the first base station 2030. In an example, the first communication device 1702 may be configured to transmit the second interference parameter to the second base station 1802. In an example, the first communication device 1702 may be configured to transmit the second interference parameter to the fourth communication device 1902.

In 2020, the first base station 2030 may be configured to transmit the second interference parameter to the second base station 1802.

In 2022, if the second signal to interference ratio is smaller than the threshold the second base station 1802 may be configured to permit an uplink connection with the fourth communication device 1902. If the second signal to interference ratio is greater than the threshold the second base station 1802 may be configured to refuse an uplink connection with the fourth communication device 1902. In an example, the second base station 1802 may be configured to transmit the second interference parameter to the fourth communication device 1902.

In an example, the fourth communication device 1902 may be connected to the first base station 2030. The fourth communication device 1902 may be configured to reselect the second base station 1802 based on the shared frequency band. Thus, the fourth communication device may be configured to efficiently reselect a second base station.

In an example, in the cell reselection process, if at least one of the cell selection receive level $S_{rxlev}$ is smaller than zero, the cell selection quality value $S_{qual}$ is smaller than zero, the first signal to interference ratio is greater than the threshold and the second signal to interference ratio is greater than the threshold the fourth communication device 1902 may be configured to perform inter frequency measurements and/or intra frequency measurements. Thus, the fourth communication device may be configured to reliably reselect a base station.

In an example, the first base station 1702 may be configured to, on request of the second base station 1802, determine distances of communication devices in recurring time intervals and report the communication device that corresponds to the smallest distance to the second base station 1802. The second base station 1802 may be configured to forward the information of the reported communication device to the fourth communication device 1902. Thus, the second base station 1802 may be configured to persistently reduce an interference of signals based on the shared frequency range with signals of a third communication device at a second communication device.

The first communication device 1702, the fourth communication device 1902, the first base station 2030 and the second base station 1802 of FIG. 20 may be based on the communication devices based on FIG. 3, FIG. 4, FIG. 6, FIG. 7, FIG. 9, FIG. 15, FIG. 17, FIG. 18 and FIG. 19.

It should be noted that aspects of the cell selection process of FIG. 20 may be combined with aspects of the communication devices based on FIG. 3, FIG. 4, FIG. 6, FIG. 7, FIG. 9, FIG. 15, FIG. 17, FIG. 18 and FIG. 19. Aspects of the cell selection process of FIG. 20 may be combined with aspects of the scenarios based on FIG. 1, FIG. 2, FIG. 5, FIG. 8, FIG. 10, FIG. 11, FIG. 12, FIG. 13, FIG. 14 and FIG. 16.

Figure 21:
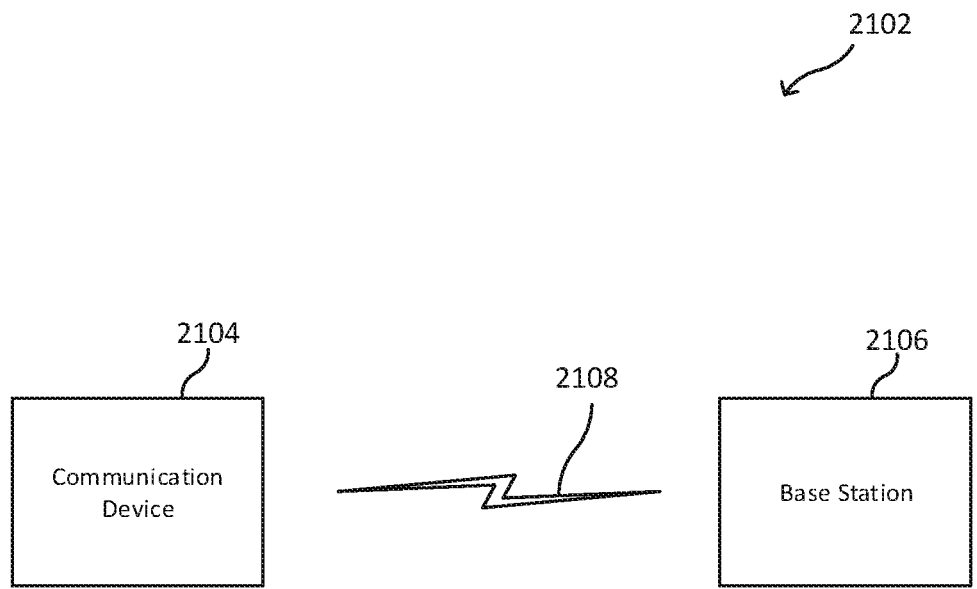
FIG. 21 shows a schematic diagram of a communication system that may include a first communication device and a base station.

FIG. 21 shows a schematic diagram of a communication system 2102 that may include a first communication device 2104 and a base station 2106. The first communication device 2104 may be connected to the base station 2106 based on a radio frequency connection 2108.

The base station 2106 may be configured to transmit a sample signal.

In an example, the sample signal that is transmitted by the base station 2106 is the first sample signal $t_1$.

The first communication device 2104 may be configured to determine an estimated signal state information. The estimated signal state information may be an estimate of a signal state information. The signal state information may be based on a third signal $a_3$ that is transmitted from the base station and a received third signal that is received from the second communication device. The estimated signal state information may be based on a third operator $G_3$.

In an example, the received signal that is received from the second communication device may be the first interference signal $w_1$.

The base station 2106 may be configured to determine a projected third signal $p_3$ based on the estimated signal state information such that an energy of a shaped projected third signal $u_3$ is smaller than an energy of a shaped third signal $s_3$. The base station 2106 may be configured to determine the shaped third signal $s_3$ based on the third signal $a_3$, the estimated signal state information and a filter of a second communication device. The shaped third signal $s_3$ may be related with the third signal $a_3$ based on the third operator $G_3$ by a formula (32):

$$s_3 = G_3 a_3. \tag{32}$$

The base station 2106 may be configured to determine the shaped projected third signal $u_3$ based on the projected third signal $p_3$, the estimated signal state information and the filter of the second communication device. The shaped projected third signal $u_3$ may be related with the projected third signal $p_3$ based on the third operator $G_3$ by a formula (33):

$$U_3 = G_3 p_3. \tag{33}$$

Further, the base station 2106 may be configured to transmit the projected third signal $p_3$. Thus, the communication system 2102 may be configured to effectively reduce interference energies of interference signals that interfere with signals that are transmitted from a third communication device and received from the second communication device.

In an example, the second communication device may be configured to receive the energy of the shaped projected third signal $u_3$ and the energy of the shaped third signal $s_3$ in a predefined time period.

In an example, the energy of the shaped projected third signal $u_3$ may be an estimated energy of the shaped projected third signal $u_3$. The energy of the shaped third signal $s_3$ may be an estimated energy of the shaped third signal $s_3$.

In an example, the base station 2106 may be configured to estimate the estimated energy of the shaped projected third signal $u_3$ and the estimated energy of the shaped third signal $s_3$ based on the estimated signal state information and the filter of the second communication device.

In an example, the communication device 2104 of FIG. 21 may be based on the communication devices based on FIG. 3, FIG. 4, FIG. 6, FIG. 7, FIG. 9, FIG. 15, FIG. 17, FIG. 18 and FIG. 19.

In an example, the base station 2106 of FIG. 21 may be based on the communication devices based on FIG. 3, FIG. 4, FIG. 6, FIG. 7, FIG. 9, FIG. 15, FIG. 17, FIG. 18 and FIG. 19.

It should be noted that aspects of the communication system 2102 of FIG. 21 may be combined with aspects of the communication devices based on FIG. 3, FIG. 4, FIG. 6, FIG. 7, FIG. 9, FIG. 15, FIG. 17, FIG. 18 and FIG. 19. Aspects of the communication system 2102 of FIG. 21 may be combined with aspects of the scenarios based on FIG. 1, FIG. 2, FIG. 5, FIG. 8, FIG. 10, FIG. 11, FIG. 12, FIG. 13, FIG. 14, FIG. 16 and FIG. 20.

Figure 22:
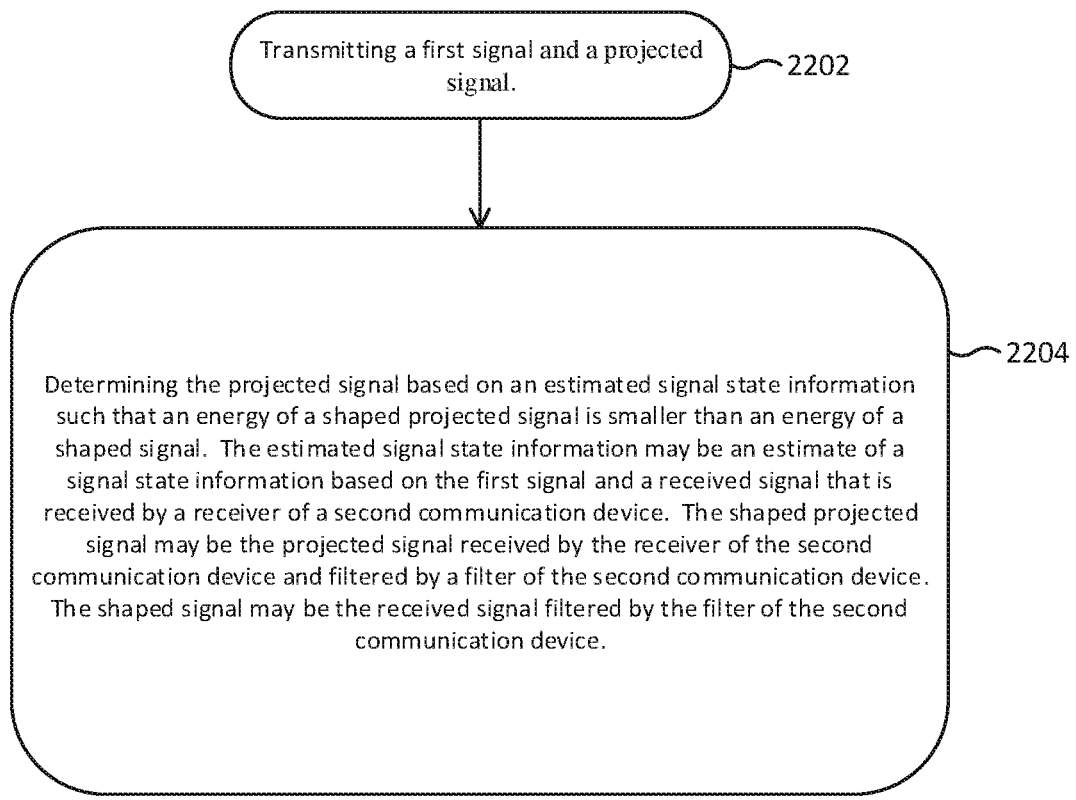
FIG. 22 shows a method for radio communication.

FIG. 22 shows a method for radio communication according to an example.

The method may include, in 2202, transmitting a first signal and a projected signal.

The method may include, in 2204, determining the projected signal based on an estimated signal state information such that an energy of a shaped projected signal is smaller than an energy of a shaped signal. The estimated signal state information may be an estimate of a signal state information based on the first signal and a received signal that is received by a receiver of a second communication device. The shaped projected signal may be the projected signal received by the receiver of the second communication device and filtered by a filter of the second communication device. The shaped signal may be the received signal filtered by the filter of the second communication device.

In an example, the method of FIG. 22 may be performed by a communication device based on FIG. 3, FIG. 4, FIG. 6 and FIG. 7.

Figure 23:
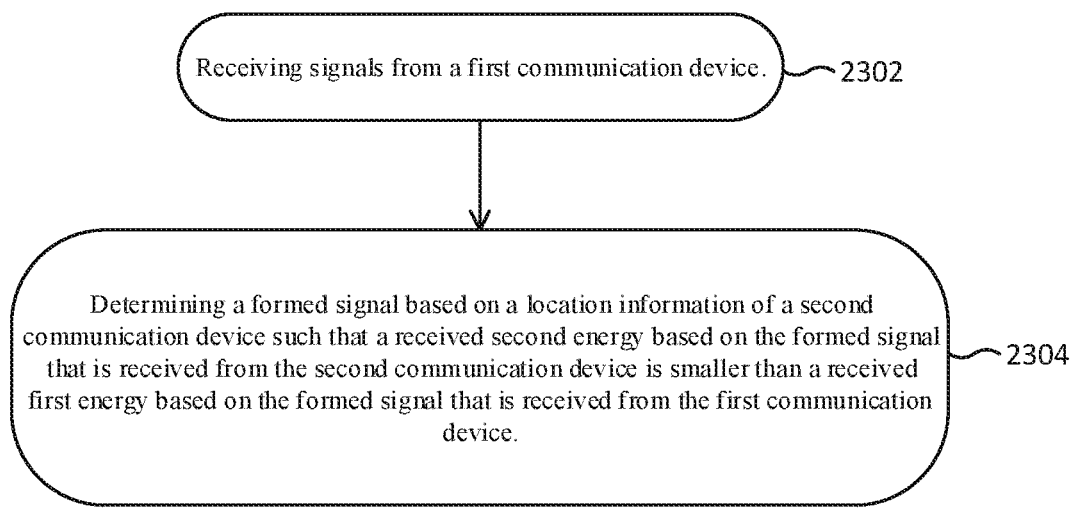
FIG. 23 shows a method for radio communication.

FIG. 23 shows a method for radio communication according to an example.

The method may include, in 2302, receiving signals from a first communication device.

The method may include, in 2304, determining a formed signal based on a location information of a second communication device such that a received second energy based on the formed signal that is received from the second communication device is smaller than a received first energy based on the formed signal that is received from the first communication device.

In an example, the method of FIG. 23 may be performed by a communication device based on FIG. 9 and FIG. 15.

Figure 24:
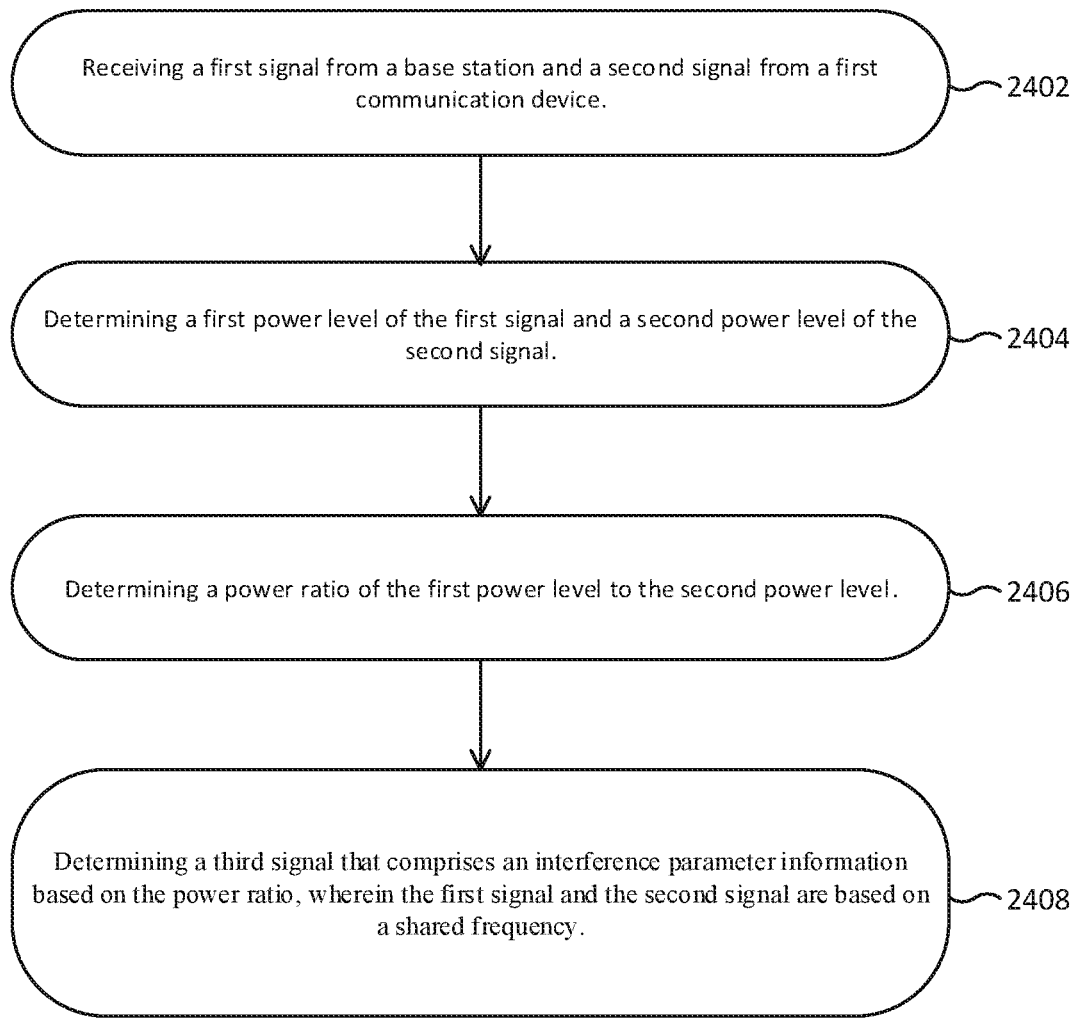
FIG. 24 shows a method for radio communication.

FIG. 24 shows a method for radio communication according to an example.

The method may include, in 2402, receiving a first signal from a base station and a second signal from a first communication device.

The method may include, in 2404, determining a first power level of the first signal and a second power level of the second signal.

The method may include, in 2406, determining a power ratio of the first power level to the second power level.

The method may include, in 2408, determining a third signal that comprises an interference parameter information based on the power ratio, wherein the first signal and the second signal are based on a shared frequency.

In an example, the method of FIG. 24 may be performed by a communication device based on FIG. 17.

Figure 25:
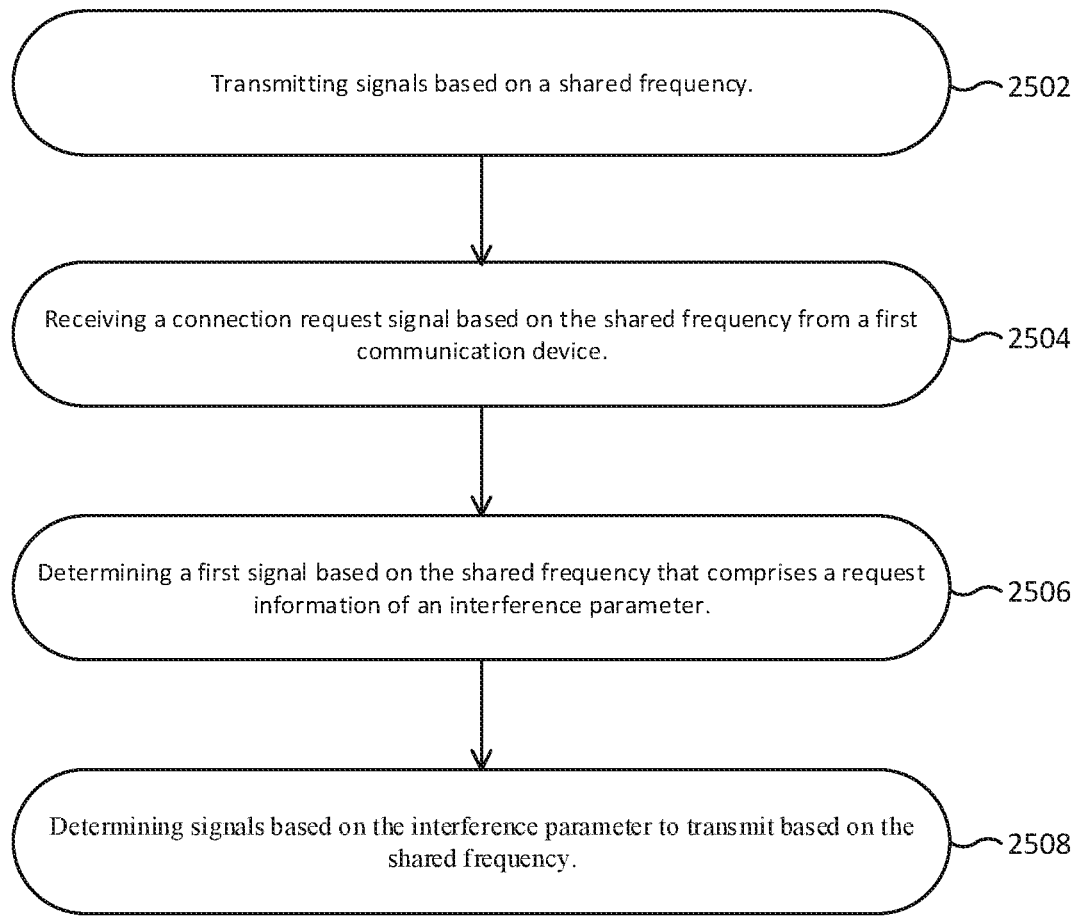
FIG. 25 shows a method for radio communication.

FIG. 25 shows a method for radio communication according to an example.

The method may include, in 2502, transmitting signals based on a shared frequency.

The method may include, in 2504, receiving a connection request signal based on the shared frequency from a first communication device.

The method may include, in 2506, determining a first signal based on the shared frequency that comprises a request information of an interference parameter.

The method may include, in 2508, determining signals based on the interference parameter to transmit based on the shared frequency.

In an example, the method of FIG. 25 may be performed by a communication device based on FIG. 18.

Figure 26:
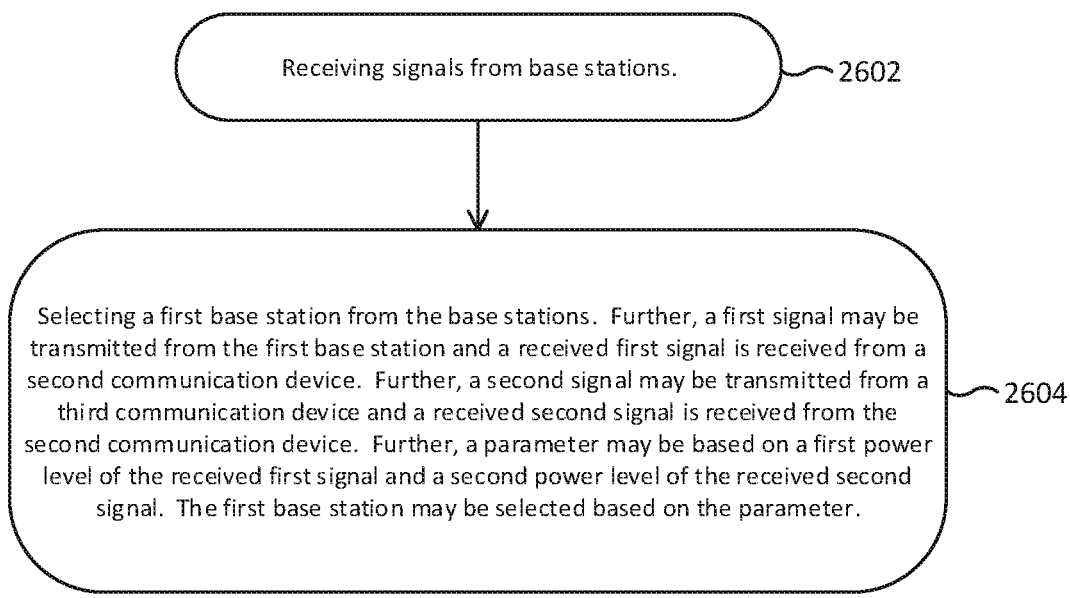
FIG. 26 shows a method for radio communication.

FIG. 26 shows a method for radio communication according to an example.

The method may include, in 2602, receiving signals from base stations.

The method may include, in 2604, selecting a first base station from the base stations. Further, a first signal may be transmitted from the first base station and a received first signal is received from a second communication device. Moreover, a second signal may be transmitted from a third communication device and a received second signal is received from the second communication device. Further, a parameter may be based on a first power level of the received first signal and a second power level of the received second signal. The first base station may be selected based on the parameter.

In an example, the method of FIG. 26 may be performed by a communication device based on FIG. 19.

Figure 27:
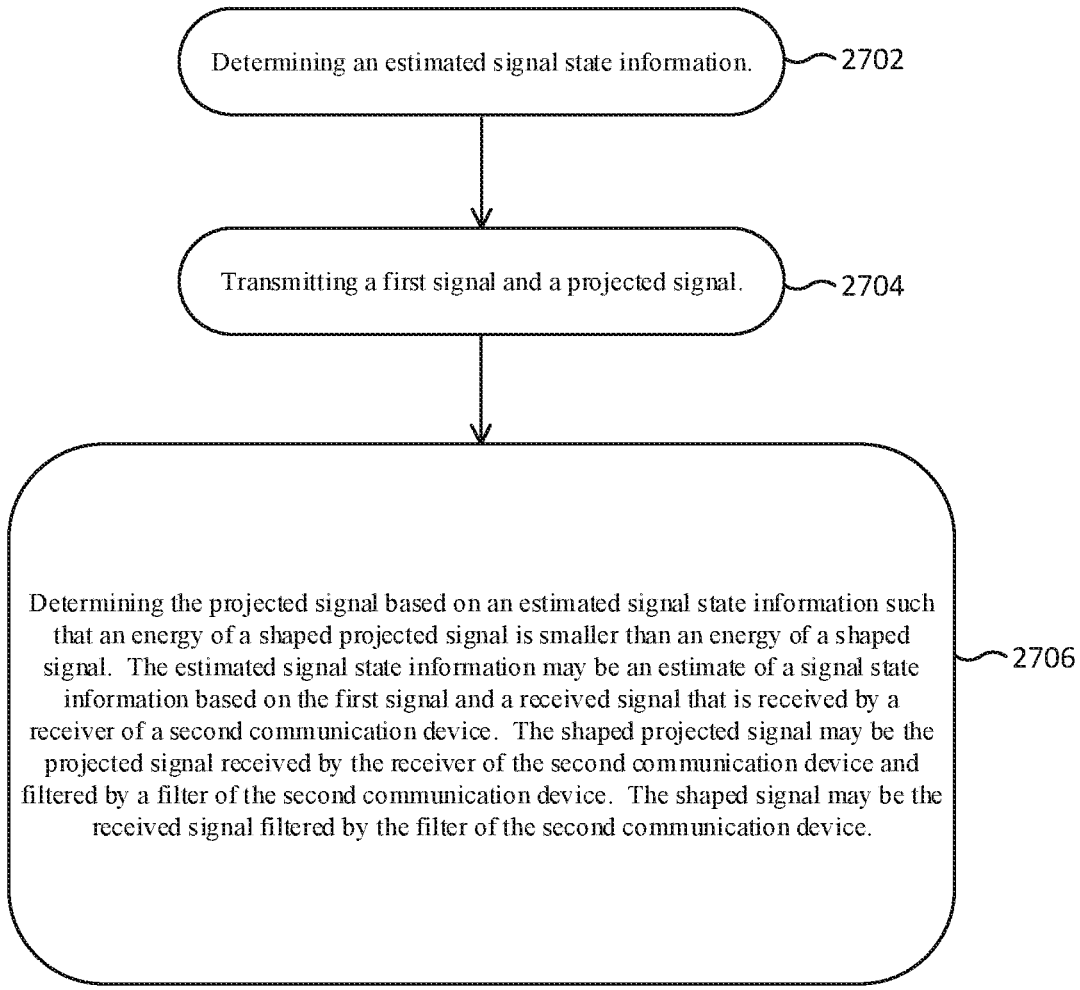
FIG. 27 shows a method for radio communication.

FIG. 27 shows a method for radio communication according to an example.

The method may include, in 2702, determining an estimated signal state information.

The method may include, in 2704, transmitting a first signal and a projected signal.

The method may include, in 2706, determining the projected signal based on an estimated signal state information such that an energy of a shaped projected signal is smaller than an energy of a shaped signal. The estimated signal state information may be an estimate of a signal state information based on the first signal and a received signal that is received by a receiver of a second communication device. The shaped projected signal may be the projected signal received by the receiver of the second communication device and filtered by a filter of the second communication device. The shaped signal may be the received signal filtered by the filter of the second communication device.

In an example, the method of FIG. 27 may be performed by a communication system based on FIG. 21.

Figure 28:
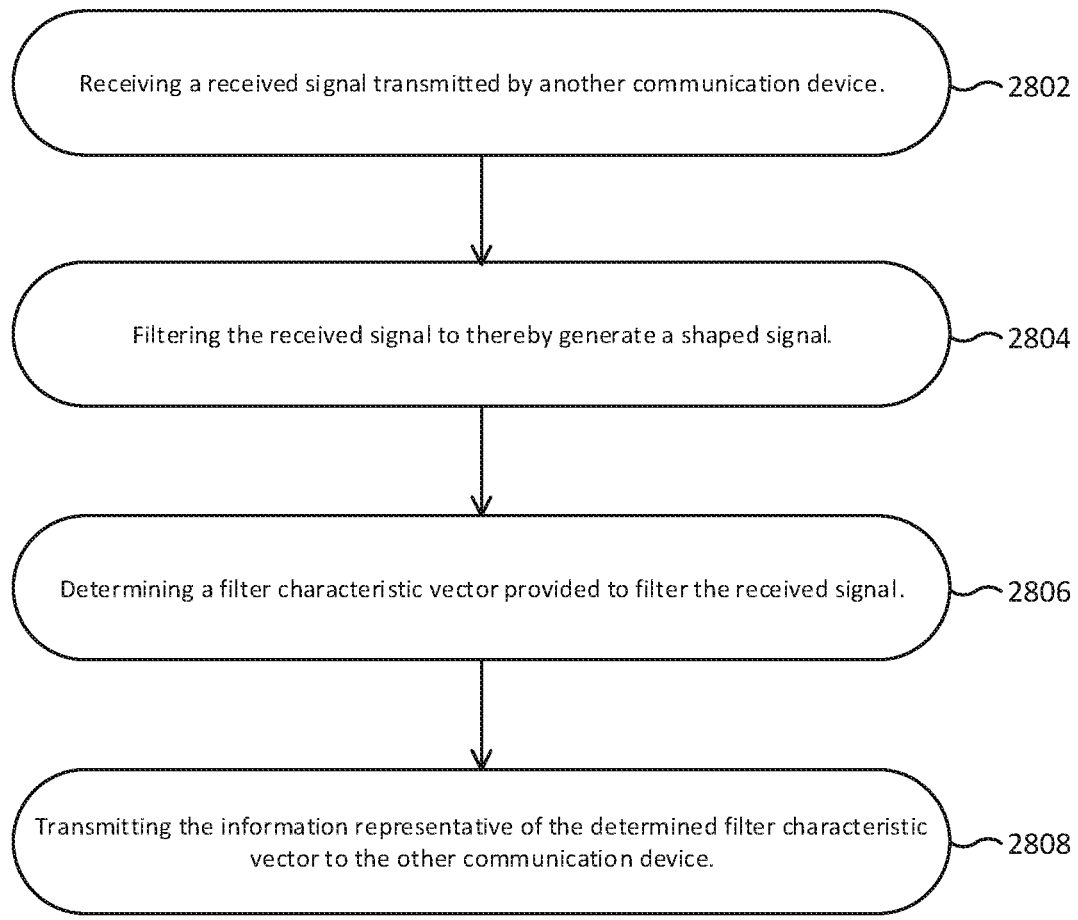
FIG. 28 shows a method of operating a communication device.

FIG. 28 shows a method of operating a communication device according to an example.

The method may include, in 2802, receiving a received signal transmitted by another communication device.

The method may include, in 2804, filtering the received signal to thereby generate a shaped signal.

The method may include, in 2806, determining a filter characteristic vector provided to filter the received signal.

The method may include, in 2808, transmitting the information representative of the determined filter characteristic vector to the other communication device.

It should be noted that aspects of the examples of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21 and FIG. 22 may be combined with aspects of the above described methods.

Figure 29:
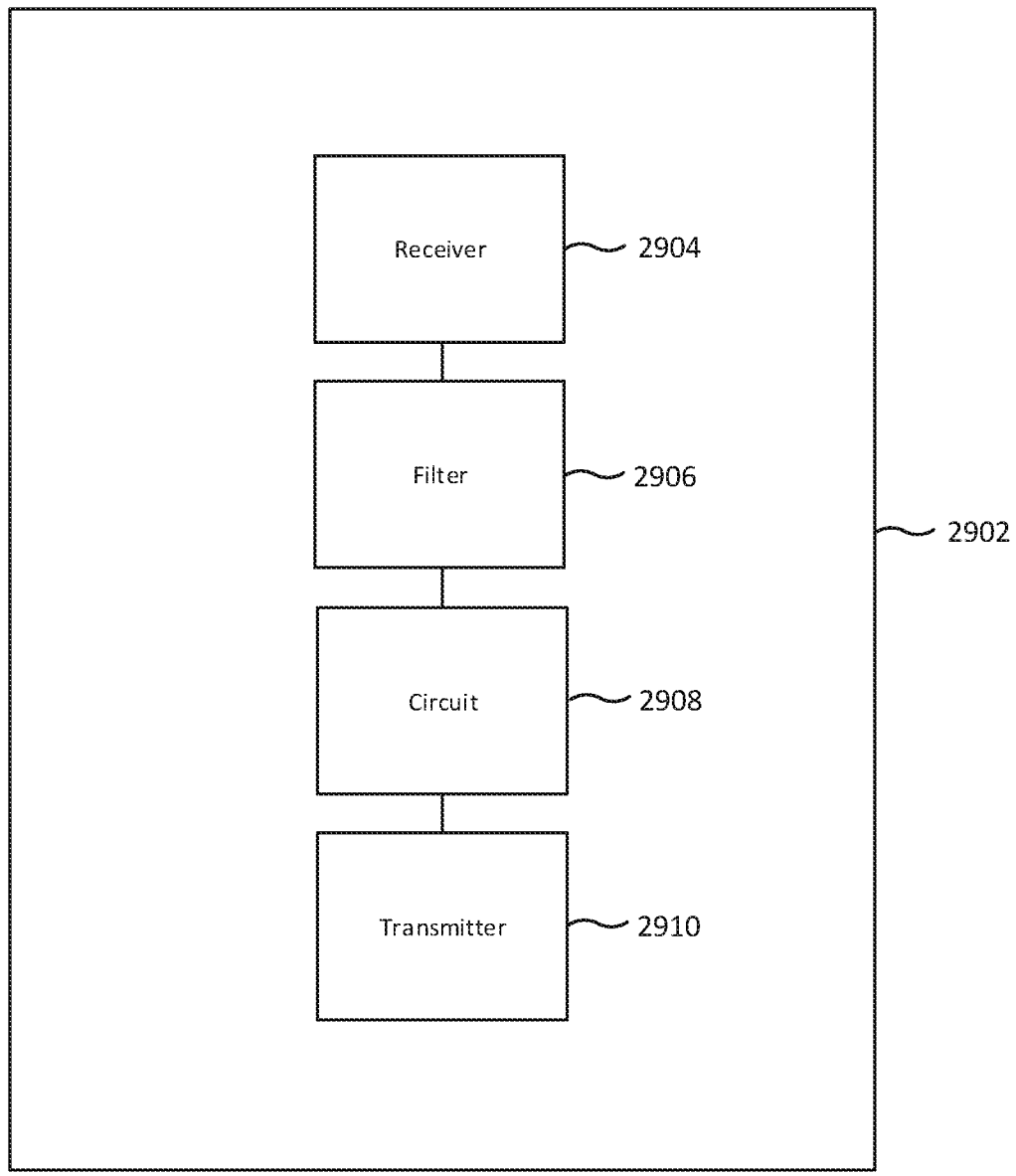
FIG. 29 shows a schematic diagram of a communication device.

FIG. 29 may be a schematic diagram that shows a communication device 2902. The communication device 2902 may include a receiver 2904 configured to receive a received signal transmitted by another communication device. Further, the communication device 2902 may include a filter 2906 configured to filter the received signal to thereby generate a shaped signal. Further, the communication device 2902 may include a circuit 2908 configured to determine a filter characteristic vector provided to filter the received signal. Further, the communication device 2902 may include a transmitter 2910 configured to transmit the information representative of the determined filter characteristic vector to the other communication device. Thus, the communication device may be configured to efficiently reduce an interference of signals received from other communication devices.

It should be noted that aspects of the communication device of FIG. 29 may be combined with aspects of the communication devices based on FIG. 3, FIG. 4, FIG. 6, FIG. 7, FIG. 9, FIG. 15, FIG. 17, FIG. 18 and FIG. 19. Aspects of the communication device of FIG. 29 may be combined with aspects of the scenarios based on FIG. 1, FIG. 2, FIG. 5, FIG. 8, FIG. 10, FIG. 11, FIG. 12, FIG. 13, FIG. 14 and FIG. 16 and the cell selection process based on FIG. 22.

The radio frequency connections and signals of the examples based on FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26 and FIG. 27 may be configured in accordance with any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V21) and Infrastructure-to-Vehicle (I2V) communication technologies, 3GPP cellular V2X, DSRC (Dedicated Short Range Communications) communication systems such as Intelligent-Transport-Systems and others.

The examples based on FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26 and FIG. 27 may be applicable based on any spectrum management scheme including dedicated licensed spectrum, unlicensed spectrum, (licensed) shared spectrum such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies. Applicable spectrum bands include International Mobile Telecommunications (IMT) spectrum, IMT-advanced spectrum, IMT-2020 spectrum and spectrum made available under FCC's "Spectrum Frontier" 5G initiative.

Further, the radio frequency connections and signals of the examples of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26 and FIG. 27 may be based on Orthogonal Frequency Division Multiplexing (OFDM), for example Single Carrier-Frequency Division Multiple Access (SC-FDMA), Single Carrier-Orthogonal Frequency Division Multiplexing (SC-OFDM), Filter Bank-based Multicarrier (FBMC), Orthogonal Frequency Division Multiple Access (OFDMA) and 3GPP NR (New Radio) by allocating the OFDM carrier data bit vectors to the corresponding symbol resources.

In the following, various aspects of this disclosure will be illustrated:

Example 1 is a communication device. The communication device may include a transmitter configured to transmit a first signal and a projected signal. The communication device may include a circuit configured to determine the projected signal based on an estimated signal state information such that an energy of a shaped projected signal is smaller than an energy of a shaped signal. The estimated signal state information may be an estimate of a signal state information based on the first signal and a received signal that may be received by a receiver of a second communication device. The shaped projected signal may be the projected signal received by the receiver of the second communication device and filtered by a filter of the second communication device. The shaped signal may be the received signal filtered by the filter of the second communication device.

In Example 2, the subject matter of Example 1 can optionally include that the projected signal may be determined in accordance with a Multiple Input Multiple Output communication technology.

In Example 3, the subject matter of any one of Examples 1 to 2 can optionally include that the projected signal may be based on a first vector of input signals. The first vector may be based on a first plurality of input signals. The first signal may be based on a second vector of input signals. The second vector may be based on a second plurality of input signals.

In Example 4, the subject matter of Example 3 can optionally include that the shaped projected signal may be based on a third vector of output signals. The third vector may be based on a third plurality of output signals that may be received by the receiver of the second communication device based on the projected signal. The shaped signal may be based on a fourth vector of output signals. The fourth vector may be based on a fourth plurality of output signals that may be received by the receiver of the second communication device based on the first signal.

In Example 5, the subject matter of Example 4 can optionally include that the transmitter may be configured to transmit signals based on a plurality of antennas. The signals of the first vector may be transmitted based on the antennas of the plurality of antennas, respectively. The signals of the second vector may be transmitted based on the antennas of the plurality of antennas, respectively.

In Example 6, the subject matter of any one of Examples 4 to 5 can optionally include that the circuit may be configured to determine the first vector such that a first absolute value of a first scalar product of the first vector and the third vector is smaller than a second absolute value of a second scalar product of the second vector and the fourth vector.

In Example 7, the subject matter of any one of Examples 1 to 6 can optionally include that a second signal state information may be based on a third signal that may be transmitted from a third communication device and a received third signal that may be received by the receiver of the second communication device. The second signal state information may be an estimate of a channel state information. The filter may be configured to filter based on the channel state information.

In Example 8, the subject matter of Example 7 can optionally include that the circuit may be configured to determine the projected signal based on an estimated linear process. The circuit may be configured to determine the estimated linear process based on the estimated signal state information and an estimated second signal state information such that the estimated linear process is an estimate of a linear process. The linear process may be based on the signal state information and the second signal state information. The estimated second signal state information may be an estimate of the second signal state information.

In Example 9, the subject matter of Example 8 can optionally include that the first vector may be determined such that the first vector is a first eigenvector based on the estimated linear process. The second vector may be a second eigenvector based on the estimated linear process. An eigenvalue of the first eigenvector based on the estimated linear process may be smaller than an eigenvalue of the second eigenvector based on the estimated linear process.

In Example 10, the subject matter of Example 8 can optionally include that the first vector may be determined such that the first vector is a first eigenvector based on the estimated linear process. The second vector may be the sum of second eigenvectors based on the estimated linear process. An eigenvalue of the first eigenvector based on the estimated linear process may be smaller than eigenvalues of the second eigenvectors based on the estimated linear process.

In Example 11, the subject matter of Example 11 can optionally include that the first vector may be determined such that the first vector is the sum of first eigenvectors based on the estimated linear process. The second vector may be a second eigenvector based on the estimated linear process. Eigenvalues of the first eigenvectors based on the estimated linear process may be smaller than an eigenvalue of the second eigenvector based on the estimated linear process.

In Example 12, the subject matter of Example 8 can optionally include that the first vector may be determined such that the first vector is the sum of first eigenvectors based on the estimated linear process. The second vector may be the sum of second eigenvectors based on the estimated linear process. Eigenvalues of the first eigenvectors based on the estimated linear process may be smaller than a smallest eigenvalue of eigenvalues of the second eigenvectors based on the estimated linear process.

In Example 13, the subject matter of any one of Examples 1 to 12 can optionally include that the circuit may be configured to determine a second projection information. The second projection information may be determined based on an estimated third signal state information such that an energy of a shaped projected fourth signal is smaller than an energy of a shaped fourth signal. A third signal state information may be based on a fifth signal that may be transmitted from a fourth communication device and a received fifth signal that may be received by the receiver of the second communication device. The estimated third signal state information may be an estimate of the third signal state information. The projected fourth signal may be projected based on the second projection information and a fourth signal. The shaped projected fourth signal may be shaped based on the projected fourth signal that may be transmitted from the fourth communication device, received by the receiver of the second communication device and filtered by the filter. The shaped fourth signal may be shaped based on the fourth signal that may be transmitted from the fourth communication device, received by the receiver of the second communication device and filtered by the filter.

In Example 14, the subject matter of Example 13 can optionally include that the projected fourth signal may be based on a fifth vector of input signals. The fifth vector may be based on a fifth plurality of input signals. The fourth signal may be based on a sixth vector of input signals. The sixth vector may be based on a sixth plurality of input signals.

In Example 15, the subject matter of Example 14 can optionally include that the shaped projected fourth signal may be based on a seventh vector of output signals. The seventh vector may be based on a seventh plurality of output signals that may be received by the receiver of the second communication device based on the projected fourth signal. The shaped fourth signal may be based on an eighth vector of output signals. The eighth vector may be based on an eighth plurality of output signals that may be received by the receiver of the second communication device based on the fourth signal.

In Example 16, the subject matter of Example 15 can optionally include that the signals of the fifth vector may be transmitted from the fourth communication device based on antennas of a second plurality of antennas of the fourth communication device, respectively. The signals of the sixth vector may be transmitted from the fourth communication device based on the antennas of the second plurality of antennas, respectively.

In Example 17, the subject matter of any one of Examples 15 to 16 can optionally include that the second projection information may be determined such that a third absolute value of a third scalar product of the fifth vector and the seventh vector is smaller than a fourth absolute value of a fourth scalar product of the sixth vector and the eighth vector.

In Example 18, the subject matter of any one of Examples 13 to 17 can optionally include that the second projection information may be determined based on an estimated second linear process. The circuit may be configured to determine the estimated second linear process based on the estimated second signal state information and an estimated third signal state information such that the estimated second linear process is an estimate of a second linear process. The second linear process may be based on the third signal state information and the second signal state information. The estimated third signal state information may be an estimate of the third signal state information.

In Example 19, the subject matter of Example 18 can optionally include that the second projection information may be determined such that the fifth vector is a third eigenvector based on the estimated second linear process. The sixth vector may be a fourth eigenvector based on the estimated second linear process. An eigenvalue of the third eigenvector based on the estimated second linear process may be smaller than an eigenvalue of the fourth eigenvector based on the estimated second linear process.

In Example 20, the subject matter of Example 18 can optionally include that the second projection information may be determined such that the fifth vector is a third eigenvector based on the estimated second linear process. The sixth vector may be the sum of fourth eigenvectors based on the estimated second linear process. An eigenvalue of the third eigenvector based on the estimated second linear process may be smaller than eigenvalues of the fourth eigenvectors based on the estimated second linear process.

In Example 21, the subject matter of Example 18 can optionally include that the second projection information may be determined such that the fifth vector is the sum of third eigenvectors based on the estimated second linear process. The sixth vector may be a fourth eigenvector based on the estimated second linear process. Eigenvalues of the third eigenvectors based on the estimated second linear process may be smaller than an eigenvalue of the fourth eigenvector based on the estimated second linear process.

In Example 22, the subject matter of Example 18 can optionally include that the second projection information may be determined such that the fifth vector is the sum of third eigenvectors based on the estimated second linear process. The sixth vector may be the sum of fourth eigenvectors based on the estimated second linear process. Eigenvalues of the third eigenvectors based on the estimated second linear process may be smaller than a smallest eigenvalue of eigenvalues of the fourth eigenvectors based on the estimated second linear process.

In Example 23, the subject matter of any one of Examples 1 to 22 can optionally include that the circuit may be configured to determine the estimated signal state information based on an interpolation of a received signal that may be received from the first communication device based on the first signal, and a received signal that may be received from a fifth communication device based on a sixth signal that may be transmitted by the transmitter.

In Example 24, the subject matter of Example 23 can optionally include that the estimated second signal state information may be determined based on an interpolation of a received signal that may be received from the first communication device based on a seventh signal that may be transmitted from the third communication device, and a received signal that may be received from the fifth communication device based on an eighth signal that may be transmitted from the third communication device.

In Example 25, the subject matter of Example 24 can optionally include that the projected signal may be projected based on a first projection information. The circuit may be configured to determine the first projection information based on the estimated linear process, an interpolated first signal and an interpolated second signal such that a fifth absolute value of a fifth scalar product of a projected interpolated first signal and an interpolated shaped projected interpolated first signal is smaller than a sixth absolute value of a sixth scalar product of the interpolated first signal and an interpolated shaped interpolated first signal. The interpolated first signal may be interpolated based on the first signal and the sixth signal. The interpolated second signal may be interpolated based on the seventh signal and the eighth signal. A shaped interpolated first signal may be shaped based on the interpolated first signal in correspondence to the estimated linear process. The projected interpolated first signal may be projected based on the interpolated first signal and the first projection information. A shaped projected interpolated first signal may be shaped based on the projected interpolated first signal in correspondence to the estimated linear process. A shaped interpolated second signal may be shaped based on the interpolated second signal in correspondence to the estimated linear process. A projected interpolated second signal may be projected based on the interpolated second signal and the first projection information. A shaped projected interpolated second signal may be shaped based on the projected interpolated second signal in correspondence to the estimated linear process. The interpolated shaped interpolated first signal may be interpolated based on the shaped interpolated first signal and the shaped interpolated second signal. The interpolated shaped projected interpolated first signal may be interpolated based on the shaped projected interpolated first signal and the shaped projected interpolated second signal.

In Example 26, the subject matter of any one of Examples 24 to 25 can optionally include that the estimated third signal state information may be based on an interpolation of a received signal that may be received from the first communication device based on a ninth signal that may be transmitted from the fourth communication device, and a received signal that may be received from the fifth communication device based on a tenth signal that may be transmitted from the fourth communication device.

In Example 27, the subject matter of Example 26 can optionally include that the second projection information may be determined based on the estimated second linear process, the interpolated second signal and an interpolated third signal such that a seventh absolute value of a seventh scalar product of a projected interpolated third signal and an interpolated shaped projected interpolated third signal is smaller than an eighth absolute value of an eighth scalar product of the interpolated third signal and an interpolated shaped interpolated third signal. The interpolated third signal may be interpolated based on the ninth signal and the tenth signal. A shaped interpolated third signal may be shaped based on the interpolated third signal in correspondence to the estimated second linear process. The projected interpolated third signal may be projected based on the interpolated third signal and the second projection information. A shaped projected interpolated third signal may be shaped based on the projected interpolated third signal in correspondence to the estimated second linear process. A shaped interpolated fourth signal may be shaped based on the interpolated second signal in correspondence to the estimated second linear process. A projected interpolated fourth signal may be projected based on the interpolated second signal and the second projection information. A shaped projected interpolated fourth signal may be shaped based on the projected interpolated fourth signal in correspondence to the estimated second linear process. The interpolated shaped interpolated third signal may be interpolated based on the shaped interpolated third signal and the shaped interpolated fourth signal. The interpolated shaped projected interpolated third signal may be interpolated based on the shaped projected interpolated third signal and the shaped projected interpolated fourth signal.

In Example 28, the subject matter of any one of Examples 25 to 27 can optionally include that the circuit may be configured to determine a first weight factor based on a first distance of the first communication device from the second communication device and a second weight factor based on a second distance of the fifth communication device from the second communication device. The first projection information may be determined based on the weight factors.

In Example 29, the subject matter of Example 28 can optionally include that the second projection information may be determined based on the weight factors.

In Example 30, the subject matter of any one of Examples 1 to 22 can optionally include that the circuit may be configured to determine a fourth signal state information that may be based on a received signal that may be received from the first communication device based on the first signal. The estimated signal state information may be the fourth signal state information.

In Example 31, the subject matter of any one of Examples 8 to 30 can optionally include that the circuit may be configured to determine a fifth signal state information that may be based on a received signal that may be received from the first communication device based on the third signal. The estimated second signal state information may be the fifth signal state information.

In Example 32, the subject matter of any one of Examples 13 to 31 can optionally include that the circuit may be configured to determine a sixth signal state information that may be based on a received signal that may be received from the first communication device based on the fifth signal. The estimated third signal state information may be the sixth signal state information.

In Example 33, the subject matter of any one of Examples 1 to 32 can optionally include that the receiver may be configured to receive signals based on a frequency of signals that may be transmitted from the second communication device based on a shared frequency. The projected signal may be based on the shared frequency.

In Example 34, the subject matter of Example 33 can optionally include that the communication device and the second communication device may be registered in a control device to transmit based on the shared frequency in a shared area.

In Example 35, the subject matter of Example 34 can optionally include that the first communication device may be in the shared area.

In Example 36, the subject matter of any one of Examples 1 to 35 can optionally include that the circuit may be configured to select the first communication device from a plurality of communication devices such that a distance of the first communication device from the second communication device may be a smallest distance from the distances of the communication devices of the plurality of communication devices from the second communication device.

In Example 37, the subject matter of any one of Examples 1 to 36 can optionally include that the signal state information may be based on a first linear transfer function that maps the first signal to the received signal.

In Example 38, the subject matter of any one of Examples 7 to 37 can optionally include that the second signal state information may be based on a second linear transfer function that maps the third signal to the received third signal.

In Example 39, the subject matter of any one of Examples 13 to 38 can optionally include that the third signal state information may be based on a third linear transfer function that maps the fifth signal to the received fifth signal.

In Example 40, the subject matter of any one of Examples 1 to 39 can optionally include that the first signal, the third signal and the fifth signal may be based on an Evolved Universal Terrestrial Radio Access communication technology.

In Example 41, the subject matter of Example 40 can optionally include that the first signal, the third signal and/or the fifth signal include a pilot signal.

In Example 42, the subject matter of any one of Examples 1 to 41 can optionally include that the filter may be configured to filter based on maximal ratio combining.

In Example 43, the subject matter of any one of Examples 1 to 42 can optionally include that the received signal may be received based on the first signal.

Example 44 is a communication device. The communication device may include a receiver configured to receive signals from a first communication device. Further, the communication device may include a circuit configured to determine a formed signal based on a location information of a second communication device such that a received second energy based on the formed signal that may be received from the second communication device is smaller than a received first energy based on the formed signal that may be received from the first communication device.

In Example 45, the subject matter of Example 44 can optionally include that a received signal that may be received from the first communication device may include the location information.

In Example 46, the subject matter of any one of Examples 44 to 45 can optionally include that the formed signal may be determined based on at least one of a group of communication technologies consisting of Single Input Single Output, Single Input Multiple Output, Multiple Input Single Output, Multiple Input Multiple Output, beamforming, time multiplexing and frequency multiplexing.

In Example 47, the subject matter of any one of Examples 44 to 46 can optionally include that the circuit may be configured to determine if the first communication device is able to transmit second formed signals such that second received energies based on the second formed signals that may be received from the second communication device may be smaller than first received energies based on the second formed signals that may be received from the first communication device, respectively. The circuit may be configured to generate a grant message to allow the first communication device to transmit the second formed signals.

In Example 48, the subject matter of any one of Examples 44 to 47 can optionally include that the communication device and the second communication device may be registered in a control device to transmit based on a shared frequency in a shared area. The formed signal may be based on the shared frequency.

In Example 49, the subject matter of any one of Examples 44 to 48 can optionally include that the receiver may be configured to receive a signal from the second communication device that may include a second frequency information. The circuit may be configured to determine a third formed signal that may be transmitted based on the second frequency.

In Example 50, the subject matter of any one of Examples 44 to 49 can optionally include that the communication device may further include a transmitter configured to transmit signals in a plurality of sectors of an angular transmission distribution. The second communication device may be in a first sector of the plurality of sectors. The formed signal may be formed such that a transmitted power of the formed signal that may be transmitted in the first sector is smaller than each of the transmitted powers of the formed signal that may be transmitted in sectors of the plurality of sectors that may be different from the first sector.

In Example 51, the subject matter of Example 50 can optionally include that the formed signal may be determined such that the formed signal is not transmitted in the first sector.

In Example 52, the subject matter of Example 51 can optionally include that the circuit may be configured to determine signals based on a third frequency that may be different from the shared frequency and/or the second frequency. The transmitter may be configured to transmit the signals to communication devices that may be located in the first sector.

In Example 53, the subject matter of any one of Examples 44 to 49 can optionally include that the communication device may further include a transmitter configured to transmit a first signal and the formed signal. The circuit may be configured to determine an estimated signal state information. The estimated signal state information may be an estimate of a signal state information based on a received signal that may be received by a receiver of a second communication device based on the first signal. The formed signal may be determined based on the estimated signal state information such that an energy of a shaped formed signal is smaller than an energy of a shaped signal. The shaped formed signal may be the formed signal received by the receiver of the second communication device and filtered by a filter of the second communication device. The shaped signal may be the received signal filtered by the filter of the second communication device.

Example 54 is a communication device. The communication device may include a receiver configured to receive a first signal from a base station and a second signal from a first communication device. Further, the communication device may include a determination circuit configured to determine a first power level of the first signal and a second power level of the second signal. Further, the communication device may include a circuit configured to determine a power ratio of the first power level to the second power level. The first signal and the second signal may be based on a shared frequency. The circuit may be configured to determine a third signal that may include an interference parameter information based on the power ratio.

In Example 55, the subject matter of Example 54 can optionally include that the interference parameter information may indicate if the power ratio is smaller than a threshold.

In Example 56, the subject matter of any one of Examples 54 to 55 can optionally include that the receiver may be configured to receive a fourth signal from a second communication device. The fourth signal may be based on the shared frequency. The determination circuit may be configured to determine a third power level of the fourth signal. The circuit may be configured to determine a second power ratio of the third power level to the second power level. The interference parameter information indicates if the second power ratio is smaller than a second threshold.

In Example 57, the subject matter of Example 56 can optionally include that the receiver may be configured to receive signals from a third communication device based on the shared frequency. The receiver may be configured to receive a signal that may include the threshold and/or the second threshold from the third communication device.

In Example 58, the subject matter of any one of Examples 54 to 57 can optionally include that the first signal and the second signal may be received at a first time. The receiver may be configured to receive a fifth signal from the base station at a second time after the first time and a sixth signal from the first communication device at the second time. The determination circuit may be configured to determine a fourth power level of the fifth signal and a fifth power level of the sixth signal. The circuit may be configured to determine a third power ratio of the fourth power level to the fifth power level. The circuit may be configured to determine a prevention signal to prevent the base station from transmitting signals based on the shared frequency if the third power ratio is equal to or greater than the threshold.

In Example 59, the subject matter of Example 58 can optionally include that the receiver may be configured to receive a seventh signal that may be based on the shared frequency from the second communication device at the second time. The determination circuit may be configured to determine a sixth power level of the seventh signal. The circuit may be configured to determine a fourth power ratio of the sixth power level to the fifth power level. The prevention signal may be determined to prevent the second communication device from transmitting signals based on the shared frequency if the fourth power ratio is equal to or greater than the second threshold.

In Example 60, the subject matter of any one of Examples 54 to 59 can optionally include that the signals that may be received from the receiver may be radio frequency signals.

In Example 61, the subject matter of any one of Examples 54 to 60 can optionally include that the first signal, the fourth signal, the fifth signal, the sixth signal and the seventh signal may be based on an Evolved Universal Terrestrial Radio Access communication technology.

In Example 62, the subject matter of Example 61 can optionally include that the first signal, the fourth signal, the fifth signal, the sixth signal and the seventh signal include pilot signals, respectively.

Example 63 is a base station. The base station may include a transmitter configured to transmit signals based on a shared frequency. Further, the base station may include a receiver configured to receive a connection request signal based on the shared frequency from a first communication device. Further, the base station may include a circuit configured to determine a first signal based on the shared frequency that may include a request information of an interference parameter. The circuit may be configured to determine signals based on the interference parameter to transmit based on the shared frequency.

In Example 64, the subject matter of Example 63 can optionally include that the receiver may be configured to receive signals from a third communication device based on the shared frequency.

In Example 65, the subject matter of any one of Examples 63 to 64 can optionally include that the interference parameter may be based on a first power level of a received first signal and a second power level of a received second signal. The received first signal may be received from a second communication device based on the first signal. The received second signal may be received from the second communication device based on a second signal that may be transmitted from a fourth communication device based on the shared frequency.

In Example 66, the subject matter of Example 65 can optionally include that the interference parameter may be a power ratio of the first power level to the second power level.

In Example 67, the subject matter of Example 66 can optionally include that the determined signals may be determined if the power ratio is smaller than a threshold.

In Example 68, the subject matter of any one of Examples 65 to 67 can optionally include that the receiver may be configured to receive a third signal from the second communication device that may include the interference parameter.

In Example 69, the subject matter of any one of Examples 65 to 68 can optionally include that the circuit may be configured to determine a fourth signal that may include a second request information of a second interference parameter. The second interference parameter may be a second power ratio of a third power level of a received fifth signal that may be received from the second communication device based on a fifth signal that may be transmitted from the first communication device based on the shared frequency to the second power level.

In Example 70, the subject matter of any one of Examples 65 to 69 can optionally include that the circuit may be configured to select the second communication device from a plurality of communication devices such that a distance of the second communication device to the third communication device is a smallest distance from the distances of the communication devices of the plurality of communication devices to the third communication device.

In Example 71, the subject matter of any one of Examples 63 to 70 can optionally include that the first signal may include a reference signal.

In Example 72, the subject matter of any one of Examples 63 to 71 can optionally include that the first signal may be based on an Evolved Universal Terrestrial Radio Access communication technology. The first signal may include a pilot signal.

Example 73 is a communication device. The communication device may include a receiver configured to receive signals from base stations. Further, the communication device may include a circuit configured to select a first base station from the base stations. A first signal may be transmitted from the first base station and a received first signal may be received from a second communication device. A second signal may be transmitted from a third communication device and a received second signal may be received from the second communication device. A parameter may be based on a first power level of the received first signal and a second power level of the received second signal. The first base station may be selected based on the parameter.

In Example 74, the subject matter of Example 73 can optionally include that the receiver may be configured to receive signals from a fourth communication device based on a shared frequency. The received signals from the base stations may be based on the shared frequency.

In Example 75, the subject matter of any one of Examples 73 to 74 can optionally include that the received first signal may be received based on the first signal. The received second signal may be received based on the second signal.

In Example 76, the subject matter of Example 75 can optionally include that the parameter may be a power ratio of the first power level to the second power level. The first base station may be selected if the power ratio is smaller than a threshold.

In Example 77, the subject matter of any one of Examples 73 to 76 can optionally include that the circuit may be configured to determine a signal selection receive level $S_{rxlev}$ of each signal that may be received from the base stations, the each signal may be a third signal, by $$S_{rxlev} = Q_{rxlevmeas} - (Q_{rxlevmin} + Q_{rxlevminoffset}) - \max(P_{EMAX} - P_{PowerClass}, 0) - Q_{offsettemp}.$$

$Q_{rxlevmeas}$ may be a measured signal receive level of the third signal, $Q_{rxlevmin}$ may be a minimum required receive level, $Q_{rxlevminoffset}$ may be a first offset, $P_{EMAX}$ may be a maximum uplink transmission power level, $P_{PowerClass}$ may be a maximum radio frequency output power, $P_{compensation}$ may be a compensation power level and $Q_{offsettemp}$ may be a temporarily applied offset. The circuit may be configured to determine a signal selection quality value $S_{qual}$ of the third signal by $S_{qual} = Q_{qualmeas} - (Q_{qualmin} + Q_{qualminoffset}) - Q_{offsettemp}$. $Q_{qualmeas}$ may be a measured signal quality value of the third signal, $Q_{qualmin}$ may be a minimum required quality level of the signal, $Q_{qualminoffset}$ may be an offset that may be an offset to the signaled $Q_{qualmin}$ and $Q_{offsettemp}$ may be a temporarily applied offset. The first base station may be only selected if the signal selection receive level $S_{rxlev}$ of the third signal is greater than zero and the signal selection quality value $S_{qual}$ of the third signal is greater than zero.

In Example 78, the subject matter of Example 77 can optionally include that the circuit may be configured to select a second base station from the base stations based on a second power ratio of a third power level of a received fourth signal, the received fourth signal being received from the second communication device based on a fourth signal that may be transmitted from the second base station, to the second power level if the signal selection receive level $S_{rxlev}$ of the third signal is equal to or smaller than zero or the signal selection quality value $S_{qual}$ of the third signal is equal to or smaller than zero or the power ratio is greater than the threshold. The signal selection receive level $S_{rxlev}$ of the fourth signal may be greater than zero and the signal selection quality value $S_{qual}$ of the fourth signal may be greater than zero.

In Example 79, the subject matter of any one of Examples 77 to 78 can optionally include that the circuit may be configured to prevent the selection of the first base station if the signal selection receive level $S_{rxlev}$ of the third signal is greater than zero, the signal selection quality value $S_{qual}$ of the third signal is greater than zero and the power ratio is smaller than the threshold.

In Example 80, the subject matter of any one of Examples 77 to 79 can optionally include that the shared frequency may be one of a plurality of shared frequencies. The circuit may be configured to select a second frequency of the plurality of shared frequencies based on a second power ratio of a second power level of a fifth signal, the fifth signal being transmitted from the first base station based on the second frequency and received from the second communication device, to the second power level if the signal selection receive level $S_{rxlev}$ of the third signal is equal to or smaller than zero or the signal selection quality value $S_{qual}$ of the third signal is equal to or smaller than zero or the power ratio is equal to or greater than the threshold.

In Example 81, the subject matter of Example 80 can optionally include that the circuit may be configured to prevent the selection of the second frequency if the signal selection receive level $S_{rxlev}$ of the each signal that may be received from the first base station based on the shared frequency is greater than zero, the signal selection quality value $S_{qual}$ of the each signal that is received from the first base station based on the shared frequency is greater than zero and the power ratio is smaller than the threshold.

In Example 82, the subject matter of any one of Examples 73 to 81 can optionally include that the shared frequency may be one of a plurality of shared frequencies. The power ratio may be one of a plurality of power ratios that may be received from the first base station. The power ratios of the plurality of power ratios may be ratios of first power levels of signals, the signals being transmitted from the first base station based on the shared frequencies and received from the second communication device, to the second power level. The circuit may be configured to prohibit the selection of the first base station if the power ratios may be equal to or greater than the threshold.

In Example 83, the subject matter of Example 82 can optionally include that the selection of the first base station may be prohibited during a predefined time period.

Example 84 is a communication system. The communication system may include a first communication device configured to determine an estimated signal state information and a base station configured to transmit a first signal and a projected signal and to determine a projected signal based on an estimated signal state information such that an energy of a shaped projected signal is smaller than an energy of a shaped signal. The estimated signal state information may be an estimate of a signal state information based on the first signal and a received signal that may be received by a receiver of a second communication device. The shaped projected signal may be the projected signal received by the receiver of the second communication device and filtered by a filter of the second communication device. The shaped signal may be the received signal filtered by the filter of the second communication device.

In Example 85, the subject matter of Example 84 can optionally include that the projected signal may be determined in accordance with a Multiple Input Multiple Output communication technology.

In Example 86, the subject matter of any one of Examples 84 to 85 can optionally include that the projected signal may be based on a first vector of input signals. The first vector may be based on a first plurality of input signals. The second signal may be based on a second vector of input signals. The second vector may be based on a second plurality of input signals.

In Example 87, the subject matter of Example 86 can optionally include that the shaped projected signal may be based on a third vector of output signals. The third vector may be based on a third plurality of output signals that may be received by the receiver of the second communication device based on the projected signal. The shaped signal may be based on a fourth vector of output signals. The fourth vector may be based on a fourth plurality of output signals that may be received by the receiver of the second communication device based on the first signal.

In Example 88, the subject matter of Example 87 can optionally include that the base station may be configured to transmit signals based on a plurality of antennas. The signals of the first vector may be transmitted based on the antennas of the plurality of antennas, respectively. The signals of the second vector may be transmitted based on the antennas of the plurality of antennas, respectively.

In Example 89, the subject matter of any one of Examples 87 to 88 can optionally include that the base station may be configured to determine the first vector such that a first absolute value of a first scalar product of the first vector and the third vector is smaller than a second absolute value of a second scalar product of the second vector and the fourth vector.

Example 90 is a method for radio communication. The method may include transmitting a first signal and a projected signal. Further, the method may include determining the projected signal based on an estimated signal state information such that an energy of a shaped projected signal is smaller than an energy of a shaped signal. The estimated signal state information may be an estimate of a signal state information based on the first signal and a received signal that may be received by a receiver of a second communication device. The shaped projected signal may be the projected signal received by the receiver of the second communication device and filtered by a filter of the second communication device. The shaped signal may be the received signal filtered by the filter of the second communication device.

In Example 91, the subject matter of Example 90 can optionally include that the projected signal may be determined in accordance with a Multiple Input Multiple Output communication technology.

In Example 92, the subject matter of any one of Examples 90 to 91 can optionally include that the projected signal may be based on a first vector of input signals. The first vector may be based on a first plurality of input signals. The first signal may be based on a second vector of input signals. The second vector may be based on a second plurality of input signals.

In Example 93, the subject matter of Example 92 can optionally include that the shaped projected signal may be based on a third vector of output signals. The third vector may be based on a third plurality of output signals that may be received by the receiver of the second communication device based on the projected signal. The shaped signal may be based on a fourth vector of output signals. The fourth vector may be based on a fourth plurality of output signals that may be received by the receiver of the second communication device based on the first signal.

In Example 94, the subject matter of Example 93 can optionally include that the method may further include transmitting signals based on a plurality of antennas. The signals of the first vector may be transmitted based on the antennas of the plurality of antennas, respectively. The signals of the second vector may be transmitted based on the antennas of the plurality of antennas, respectively.

In Example 95, the subject matter of any one of Examples 93 to 94 can optionally include that the method may further include determining the first vector such that a first absolute value of a first scalar product of the first vector and the third vector is smaller than a second absolute value of a second scalar product of the second vector and the fourth vector.

In Example 96, the subject matter of any one of Examples 90 to 95 can optionally include that a second signal state information may be based on a third signal that may be transmitted from a third communication device and a received third signal that may be received by the receiver of the second communication device. The second signal state information may be an estimate of a channel state information. The filter may be configured to filter based on the channel state information.

In Example 97, the subject matter of Example 96 can optionally include that the method may further include determining the projected signal based on an estimated linear process. The method may further include determining the estimated linear process based on the estimated signal state information and an estimated second signal state information such that the estimated linear process is an estimate of a linear process. The linear process may be based on the signal state information and the second signal state information. The estimated second signal state information may be an estimate of the second signal state information.

In Example 98, the subject matter of Example 97 can optionally include that the first vector may be determined such that the first vector is a first eigenvector based on the estimated linear process. The second vector may be a second eigenvector based on the estimated linear process. An eigenvalue of the first eigenvector based on the estimated linear process may be smaller than an eigenvalue of the second eigenvector based on the estimated linear process.

In Example 99, the subject matter of Example 97 can optionally include that the first vector may be determined such that the first vector is a first eigenvector based on the estimated linear process. The second vector may be the sum of second eigenvectors based on the estimated linear process. An eigenvalue of the first eigenvector based on the estimated linear process may be smaller than eigenvalues of the second eigenvectors based on the estimated linear process.

In Example 100, the subject matter of Example 97 can optionally include that the first vector may be determined such that the first vector is the sum of first eigenvectors based on the estimated linear process. The second vector may be a second eigenvector based on the estimated linear process. Eigenvalues of the first eigenvectors based on the estimated linear process may be smaller than an eigenvalue of the second eigenvector based on the estimated linear process.

In Example 101, the subject matter of Example 97 can optionally include that the first vector may be determined such that the first vector is the sum of first eigenvectors based on the estimated linear process. The second vector may be the sum of second eigenvectors based on the estimated linear process. Eigenvalues of the first eigenvectors based on the estimated linear process may be smaller than a smallest eigenvalue of eigenvalues of the second eigenvectors based on the estimated linear process.

In Example 102, the subject matter of any one of Examples 90 to 101 can optionally include that the method may further include determining a second projection information. The second projection information may be determined based on an estimated third signal state information such that an energy of a shaped projected fourth signal is smaller than an energy of a shaped fourth signal. A third signal state information may be based on a fifth signal that may be transmitted from a fourth communication device and a received fifth signal that may be received by the receiver of the second communication device. The estimated third signal state information may be an estimate of the third signal state information. The projected fourth signal may be projected based on the second projection information and a fourth signal. The shaped projected fourth signal may be shaped based on the projected fourth signal that may be transmitted from the fourth communication device, received by the receiver of the second communication device and filtered by the filter of the second communication device. The shaped fourth signal may be shaped based on the fourth signal that may be transmitted from the fourth communication device, received by the receiver of the second communication device and filtered by the filter of the second communication device.

In Example 103, the subject matter of Example 102 can optionally include that the projected fourth signal may be based on a fifth vector of input signals. The fifth vector may be based on a fifth plurality of input signals. The fourth signal may be based on a sixth vector of input signals. The sixth vector may be based on a sixth plurality of input signals.

In Example 104, the subject matter of Example 103 can optionally include that the shaped projected fourth signal may be based on a seventh vector of output signals. The seventh vector may be based on a seventh plurality of output signals that may be received by the receiver of the second communication device based on the projected fourth signal. The shaped fourth signal may be based on an eighth vector of output signals. The eighth vector may be based on an eighth plurality of output signals that may be received by the receiver of the second communication device based on the fourth signal.

In Example 105, the subject matter of Example 104 can optionally include that the signals of the fifth vector may be transmitted from the fourth communication device based on antennas of a second plurality of antennas of the fourth communication device, respectively. The signals of the sixth vector may be transmitted from the fourth communication device based on the antennas of the second plurality of antennas, respectively.

In Example 106, the subject matter of any one of Examples 104 to 105 can optionally include that the second projection information may be determined such that a third absolute value of a third scalar product of the fifth vector and the seventh vector is smaller than a fourth absolute value of a fourth scalar product of the sixth vector and the eighth vector.

In Example 107, the subject matter of any one of Examples 102 to 106 can optionally include that the method may further include determining an estimated second linear process based on the estimated second signal state information and an estimated third signal state information such that the estimated second linear process is an estimate of a second linear process. The second linear process may be based on the third signal state information and the second signal state information. The estimated third signal state information may be an estimate of the third signal state information. The second projection information may be determined based on an estimated second linear process.

In Example 108, the subject matter of Example 107 can optionally include that the second projection information may be determined such that the fifth vector is a third eigenvector based on the estimated second linear process. The sixth vector may be a fourth eigenvector based on the estimated second linear process. An eigenvalue of the third eigenvector based on the estimated second linear process may be smaller than an eigenvalue of the fourth eigenvector based on the estimated second linear process.

In Example 109, the subject matter of Example 107 can optionally include that the second projection information may be determined such that the fifth vector may be a third eigenvector based on the estimated second linear process. The sixth vector may be the sum of fourth eigenvectors based on the estimated second linear process. An eigenvalue of the third eigenvector based on the estimated second linear process may be smaller than eigenvalues of the fourth eigenvectors based on the estimated second linear process.

In Example 110, the subject matter of Example 107 can optionally include that the second projection information may be determined such that the fifth vector is the sum of third eigenvectors based on the estimated second linear process. The sixth vector may be a fourth eigenvector based on the estimated second linear process. Eigenvalues of the third eigenvectors based on the estimated second linear process may be smaller than an eigenvalue of the fourth eigenvector based on the estimated second linear process.

In Example 111, the subject matter of Example 107 can optionally include that the second projection information may be determined such that the fifth vector may be the sum of third eigenvectors based on the estimated second linear process. The sixth vector may be the sum of fourth eigenvectors based on the estimated second linear process. Eigenvalues of the third eigenvectors based on the estimated second linear process may be smaller than a smallest eigenvalue of eigenvalues of the fourth eigenvectors based on the estimated second linear process.

In Example 112, the subject matter of any one of Examples 90 to 111 can optionally include that the method may further include determining the estimated signal state information based on an interpolation of a received signal that may be received from the first communication device based on the first signal, and a received signal that may be received from a fifth communication device based on a sixth signal that may be transmitted by the transmitter.

In Example 113, the subject matter of Example 112 can optionally include that the estimated second signal state information may be determined based on an interpolation of a received signal that may be received from the first communication device based on a seventh signal that may be transmitted from the third communication device, and a received signal that may be received from the fifth communication device based on an eighth signal that may be transmitted from the third communication device.

In Example 114, the subject matter of Example 113 can optionally include that the method may further include determining the first projection information based on the estimated linear process, an interpolated first signal and an interpolated second signal such that a fifth absolute value of a fifth scalar product of a projected interpolated first signal and an interpolated shaped projected interpolated first signal is smaller than a sixth absolute value of a sixth scalar product of the interpolated first signal and an interpolated shaped interpolated first signal. The projected signal may be projected based on a first projection information. The interpolated first signal may be interpolated based on the first signal and the sixth signal. The interpolated second signal may be interpolated based on the seventh signal and the eighth signal. A shaped interpolated first signal may be shaped based on the interpolated first signal in correspondence to the estimated linear process. The projected interpolated first signal may be projected based on the interpolated first signal and the first projection information. A shaped projected interpolated first signal may be shaped based on the projected interpolated first signal in correspondence to the estimated linear process. A shaped interpolated second signal may be shaped based on the interpolated second signal in correspondence to the estimated linear process. A projected interpolated second signal may be projected based on the interpolated second signal and the first projection information. A shaped projected interpolated second signal may be shaped based on the projected interpolated second signal in correspondence to the estimated linear process. The interpolated shaped interpolated first signal may be interpolated based on the shaped interpolated first signal and the shaped interpolated second signal. The interpolated shaped projected interpolated first signal may be interpolated based on the shaped projected interpolated first signal and the shaped projected interpolated second signal.

In Example 115, the subject matter of any one of Examples 113 to 114 can optionally include that the estimated third signal state information may be based on an interpolation of a received signal that may be received from the first communication device based on a ninth signal that may be transmitted from the fourth communication device, and a received signal that may be received from the fifth communication device based on a tenth signal that may be transmitted from the fourth communication device.

In Example 116, the subject matter of Example 115 can optionally include that the second projection information may be determined based on the estimated second linear process, the interpolated second signal and an interpolated third signal such that a seventh absolute value of a seventh scalar product of a projected interpolated third signal and an interpolated shaped projected interpolated third signal is smaller than an eighth absolute value of an eighth scalar product of the interpolated third signal and an interpolated shaped interpolated third signal. The interpolated third signal may be interpolated based on the ninth signal and the tenth signal. A shaped interpolated third signal may be shaped based on the interpolated third signal in correspondence to the estimated second linear process. The projected interpolated third signal may be projected based on the interpolated third signal and the second projection information. A shaped projected interpolated third signal may be shaped based on the projected interpolated third signal in correspondence to the estimated second linear process. A shaped interpolated fourth signal may be shaped based on the interpolated second signal in correspondence to the estimated second linear process. A projected interpolated fourth signal may be projected based on the interpolated second signal and the second projection information. A shaped projected interpolated fourth signal may be shaped based on the projected interpolated fourth signal in correspondence to the estimated second linear process. The interpolated shaped interpolated third signal may be interpolated based on the shaped interpolated third signal and the shaped interpolated fourth signal. The interpolated shaped projected interpolated third signal may be interpolated based on the shaped projected interpolated third signal and the shaped projected interpolated fourth signal.

In Example 117, the subject matter of any one of Examples 114 to 116 can optionally include that the method may further include determining a first weight factor based on a first distance of the first communication device from the second communication device and a second weight factor based on a second distance of the fifth communication device from the second communication device. The first projection information may be determined based on the weight factors.

In Example 118, the subject matter of Example 117 can optionally include that the second projection information may be determined based on the weight factors.

In Example 119, the subject matter of any one of Examples 90 to 111 can optionally include that the method may further include determining a fourth signal state information that may be based on a received signal that may be received from the first communication device based on the first signal. The estimated signal state information may be the fourth signal state information.

In Example 120, the subject matter of any one of Examples 97 to 119 can optionally include that the method may further include determining a fifth signal state information that may be based on a received signal that may be received from the first communication device based on the third signal. The estimated second signal state information may be the fifth signal state information.

In Example 121, the subject matter of any one of Examples 102 to 120 can optionally include that the method may further include determining a sixth signal state information that may be based on a received signal that may be received from the first communication device based on the fifth signal. The estimated third signal state information may be the sixth signal state information.

In Example 122, the subject matter of any one of Examples 90 to 121 can optionally include that the method may further include receiving signals based on a frequency of signals that may be transmitted from the second communication device based on a shared frequency. The projected signal may be based on the shared frequency.

In Example 123, the subject matter of any one of Examples 90 to 121 can optionally include that the communication device and the second communication device may be registered in a control device to transmit based on the shared frequency in a shared area.

In Example 124, the subject matter of Example 123 can optionally include that the first communication device may be in the shared area.

In Example 125, the subject matter of any one of Examples 90 to 124 can optionally include that the method may further include selecting the first communication device from a plurality of communication devices such that a distance of the first communication device from the second communication device may be a smallest distance from the distances of the communication devices of the plurality of communication devices from the second communication device.

In Example 126, the subject matter of any one of Examples 90 to 125 can optionally include that the signal state information may be based on a first linear transfer function that maps the first signal to the received signal.

In Example 127, the subject matter of any one of Examples 90 to 125 can optionally include that the second signal state information may be based on a second linear transfer function that maps the third signal to the received third signal.

In Example 128, the subject matter of any one of Examples 102 to 127 can optionally include that the third signal state information may be based on a third linear transfer function that maps the fifth signal to the received fifth signal.

In Example 129, the subject matter of any one of Examples 90 to 128 can optionally include that the first signal, the third signal and the fifth signal may be based on an Evolved Universal Terrestrial Radio Access communication technology.

In Example 130, the subject matter of any one of Examples 90 to 128 can optionally include that the first signal, the third signal and/or the fifth signal include a pilot signal.

In Example 131, the subject matter of any one of Examples 90 to 130 can optionally include that the filter may be configured to filter based on maximal ratio combining.

In Example 132, the subject matter of any one of Examples 90 to 131 can optionally include that the received signal may be received based on the first signal.

Example 133 is a method for radio communication. The method may include receiving signals from a first communication device. The method may further include determining a formed signal based on a location information of a second communication device such that a received second energy based on the formed signal that may be received from the second communication device is smaller than a received first energy based on the formed signal that may be received from the first communication device.

In Example 134, the subject matter of Example 133 can optionally include that a received signal that may be received from the first communication device may include the location information.

In Example 135, the subject matter of any one of Examples 133 to 134 can optionally include that the formed signal may be determined based on at least one of a group of communication technologies consisting of Single Input Single Output, Single Input Multiple Output, Multiple Input Single Output, Multiple Input Multiple Output, beamforming, time multiplexing and frequency multiplexing.

In Example 136, the subject matter of any one of Examples 133 to 135 can optionally include that the method may further include determining if the first communication device may be able to transmit second formed signals such that second received energies based on the second formed signals that may be received from the second communication device are smaller than first received energies based on the second formed signals that may be received from the first communication device, respectively. The method may further include generating a grant message to allow the first communication device to transmit the second formed signals.

In Example 137, the subject matter of any one of Examples 133 to 136 can optionally include that the second communication device may be registered in a control device to transmit based on a shared frequency in a shared area. The formed signal may be based on the shared frequency.

In Example 138, the subject matter of any one of Examples 133 to 137 can optionally include that the method may further include receiving a signal from the second communication device that may include a second frequency information. The method may further include determining a third formed signal that may be transmitted based on the second frequency.

In Example 139, the subject matter of any one of Examples 133 to 138 can optionally include that the method may further include transmitting signals in a plurality of sectors of an angular transmission distribution. The second communication device may be in a first sector of the plurality of sectors. The formed signal may be formed such that a transmitted power of the formed signal that may be transmitted in the first sector is smaller than each of the transmitted powers of the formed signal that may be transmitted in sectors of the plurality of sectors that may be different from the first sector.

In Example 140, the subject matter of Example 139 can optionally include that the formed signal may be determined such that the formed signal is not transmitted in the first sector.

In Example 141, the subject matter of Example 140 can optionally include that the method may further include determining signals based on a third frequency that may be different from the shared frequency and/or the second frequency. The method may further include transmitting the signals to communication devices that may be located in the first sector.

In Example 142, the subject matter of any one of Examples 133 to 1411 can optionally include that the method may further include transmitting a first signal and the formed signal. The method may further include determining an estimated signal state information. The estimated signal state information may be an estimate of a signal state information based on a received signal that may be received by a receiver of a second communication device based on the first signal. The formed signal may be determined based on the estimated signal state information such that an energy of a shaped formed signal is smaller than an energy of a shaped signal. The shaped formed signal may be the formed signal received by the receiver of the second communication device and filtered by a filter of the second communication device. The shaped signal may be the received signal filtered by the filter of the second communication device.

Example 143 is a method for radio communication. The method may include receiving a first signal from a base station and a second signal from a first communication device. The method may further include determining a first power level of the first signal and a second power level of the second signal. The method may further include determining a power ratio of the first power level to the second power level. The method may further include determining a third signal that may include an interference parameter information based on the power ratio. The first signal and the second signal may be based on a shared frequency.

In Example 144, the subject matter of Example 143 can optionally include that the interference parameter information indicates if the power ratio is smaller than a threshold.

In Example 145, the subject matter of any one of Examples 143 to 144 can optionally include that the method may further include receiving a fourth signal from a second communication device. The method may further include determining a third power level of the fourth signal. The method may further include determining a second power ratio of the third power level to the second power level. The fourth signal may be based on the shared frequency. The interference parameter information may indicate if the second power ratio is smaller than a second threshold.

In Example 146, the subject matter of Example 145 can optionally include that the method may further include receiving signals from a third communication device based on the shared frequency. The method may further include receiving a signal that may include the threshold and/or the second threshold from the third communication device.

In Example 147, the subject matter of any one of Examples 143 to 146 can optionally include that the method may further include receiving a fifth signal from the base station at a second time after a first time and a sixth signal from the first communication device at the second time. The first signal and the second signal may be received at the first time. The method may further include determining a fourth power level of the fifth signal and a fifth power level of the sixth signal. The method may further include determining a third power ratio of the fourth power level to the fifth power level. The method may further include determining a prevention signal to prevent the base station from transmitting signals based on the shared frequency if the third power ratio is equal to or greater than the threshold.

In Example 148, the subject matter of Example 147 can optionally include that the method may further include receiving a seventh signal that may be based on the shared frequency from the second communication device at the second time. The method may further include determining a sixth power level of the seventh signal. The method may further include determining a fourth power ratio of the sixth power level to the fifth power level. The prevention signal may be determined to prevent the second communication device from transmitting signals based on the shared frequency if the fourth power ratio is equal to or greater than the second threshold.

In Example 149, the subject matter of any one of Examples 143 to 148 can optionally include that the signals that may be received from the receiver may be radio frequency signals.

In Example 150, the subject matter of any one of Examples 143 to 149 can optionally include that the first signal, the fourth signal, the fifth signal, the sixth signal and the seventh signal may be based on an Evolved Universal Terrestrial Radio Access communication technology.

In Example 151, the subject matter of Example 150 can optionally include that the first signal, the fourth signal, the fifth signal, the sixth signal and the seventh signal include pilot signals, respectively.

Example 152 is a method for radio communication. The method may include transmitting signals based on a shared frequency. The method may further include receiving a connection request signal based on the shared frequency from a first communication device. The method may further include determining a first signal based on the shared frequency that may include a request information of an interference parameter. The method may further include determining signals based on the interference parameter to transmit based on the shared frequency.

In Example 153, the subject matter of Example 152 can optionally include that the method may further include receiving signals from a third communication device based on the shared frequency.

In Example 154, the subject matter of any one of Examples 152 to 153 can optionally include that the interference parameter may be based on a first power level of a received first signal and a second power level of a received second signal. The received first signal may be received from a second communication device based on the first signal. The received second signal may be received from the second communication device based on a second signal that may be transmitted from a fourth communication device based on the shared frequency.

In Example 155, the subject matter of Example 154 can optionally include that the interference parameter may be a power ratio of the first power level to the second power level.

In Example 156, the subject matter of Example 155 can optionally include that the determined signals may be determined if the power ratio is smaller than a threshold.

In Example 157, the subject matter of any one of Examples 154 to 156 can optionally include that the method may further include receiving a third signal from the second communication device that may include the interference parameter.

In Example 158, the subject matter of any one of Examples 154 to 157 can optionally include that the method may further include determining a fourth signal that may include a second request information of a second interference parameter. The second interference parameter may be a second power ratio of a third power level of a received fifth signal that may be received from the second communication device based on a fifth signal that may be transmitted from the first communication device based on the shared frequency to the second power level.

In Example 159, the subject matter of any one of Examples 154 to 158 can optionally include that the method may further include selecting the second communication device from a plurality of communication devices such that a distance of the second communication device to the third communication device is a smallest distance from the distances of the communication devices of the plurality of communication devices to the third communication device.

In Example 160, the subject matter of any one of Examples 152 to 159 can optionally include that the first signal may include a reference signal.

In Example 161, the subject matter of any one of Examples 152 to 160 can optionally include that the first signal may be based on an Evolved Universal Terrestrial Radio Access communication technology. The first signal may include a pilot signal.

Example 162 is a method for radio communication. The method may include receiving signals from base stations. The method may further include selecting a first base station from the base stations. A first signal may be transmitted from the first base station and a received first signal may be received from a second communication device. A second signal may be transmitted from a third communication device and a received second signal may be received from the second communication device. A parameter may be based on a first power level of the received first signal and a second power level of the received second signal. The first base station may be selected based on the parameter.

In Example 163, the subject matter of Example 162 can optionally include that the method may further include receiving signals from a fourth communication device based on a shared frequency. The received signals from the base stations may be based on the shared frequency.

In Example 164, the subject matter of any one of Examples 162 to 163 can optionally include that the received first signal may be received based on the first signal. The received second signal may be received based on the second signal.

In Example 165, the subject matter of Example 164 can optionally include that the parameter may be a power ratio of the first power level to the second power level. The first base station may be selected if the power ratio is smaller than a threshold.

In Example 166, the subject matter of any one of Examples 162 to 165 can optionally include that the method may further include determining a signal selection receive level $S_{rxlev}$ of each signal that may be received from the base stations, the each signal being a third signal, by $$S_{rxlev}=Q_{rxlevmeas}-(Q_{rxlevmin}+Q_{rxlevminoffset})-\max(P_{EMAX}-P_{PowerClass},0)-Q_{offsettemp}.$$

$Q_{rxlevmeas}$ may be a measured signal receive level of the third signal, $Q_{rxlevmin}$ may be a minimum required receive level, $Q_{rxlevminoffset}$ may be a first offset, $P_{EMAX}$ may be a maximum uplink transmission power level, $P_{PowerClass}$ may be a maximum radio frequency output power, $P_{compensation}$ may be a compensation power level and $Q_{offsettemp}$ may be a temporarily applied offset. The method may further include determining a signal selection quality value $S_{qual}$ of the third signal by $S_{qual}=Q_{qualmeas}-(Q_{qualmin}+Q_{qualminoffset})-Q_{offsettemp}$. $Q_{qualmeas}$ may be a measured signal quality value of the third signal, $Q_{qualmin}$ may be a minimum required quality level of the signal, $Q_{qualminoffset}$ may be an offset that may be an offset to the signaled $Q_{qualmin}$ and $Q_{offsettemp}$ may be a temporarily applied offset. The first base station may be only selected if the signal selection receive level $S_{rxlev}$ of the third signal is greater than zero and the signal selection quality value $S_{qual}$ of the third signal is greater than zero.

In Example 167, the subject matter of Example 166 can optionally include that the method may further include selecting a second base station from the base stations based on a second power ratio of a third power level of a received fourth signal, the received fourth signal being received from the second communication device based on a fourth signal that may be transmitted from the second base station, to the second power level if the signal selection receive level $S_{rxlev}$ of the third signal is equal to or smaller than zero or the signal selection quality value $S_{qual}$ of the third signal is equal to or smaller than zero or the power ratio is greater than the threshold. The signal selection receive level $S_{rxlev}$ of the fourth signal may be greater than zero and the signal selection quality value $S_{qual}$ of the fourth signal may be greater than zero.

In Example 168, the subject matter of any one of Examples 166 to 167 can optionally include that the method may further include preventing the selection of the first base station if the signal selection receive level $S_{rxlev}$ of the third signal is greater than zero, the signal selection quality value $S_{qual}$ of the third signal is greater than zero and the power ratio is smaller than the threshold.

In Example 169, the subject matter of any one of Examples 166 to 168 can optionally include that the method may further include selecting a second frequency of a plurality of shared frequencies based on a second power ratio of a second power level of a fifth signal, the fifth signal being transmitted from the first base station based on the second frequency and received from the second communication device, to the second power level if the signal selection receive level $S_{rxlev}$ of the third signal is equal to or smaller than zero or the signal selection quality value $S_{qual}$ of the third signal is equal to or smaller than zero or the power ratio is equal to or greater than the threshold. The shared frequency may be one of a plurality of shared frequencies.

In Example 170, the subject matter of Example 169 can optionally include that the method may further include preventing the selection of the second frequency if the signal selection receive level $S_{rxlev}$ of the each signal that may be received from the first base station based on the shared frequency is greater than zero, the signal selection quality value $S_{qual}$ of the each signal that may be received from the first base station based on the shared frequency is greater than zero and the power ratio is smaller than the threshold.

In Example 171, the subject matter of any one of Examples 162 to 170 can optionally include that the method may further include prohibiting the selection of the first base station if the power ratios may be equal to or greater than the threshold. The power ratios of the plurality of power ratios may be ratios of first power levels of signals, the signals being transmitted from the first base station based on the shared frequencies and received from the second communication device, to the second power level. The power ratio may be one of a plurality of power ratios that may be received from the first base station. The shared frequency may be one of a plurality of shared frequencies.

In Example 172, the subject matter of Example 171 can optionally include that the selection of the first base station may be prohibited during a predefined time period.

Example 173 is a method for radio communication. The method may include determining an estimated signal state information. The method may further include transmitting a first signal and a projected signal. The method may further include determining the projected signal based on an estimated signal state information such that an energy of a shaped projected signal is smaller than an energy of a shaped signal. The estimated signal state information may be an estimate of a signal state information based on the first signal and a received signal that may be received by a receiver of a second communication device. The shaped projected signal may be the projected signal received by the second communication device and filtered by a filter of the second communication device. The shaped signal may be the received signal filtered by the filter of the second communication device.

In Example 174, the subject matter of Example 173 can optionally include that the projected signal may be determined in accordance with a Multiple Input Multiple Output communication technology.

In Example 175, the subject matter of any one of Examples 173 to 174 can optionally include that the projected signal may be based on a first vector of input signals. The first vector may be based on a first plurality of input signals. The second signal may be based on a second vector of input signals. The second vector may be based on a second plurality of input signals.

In Example 176, the subject matter of Example 175 can optionally include that the shaped projected signal may be based on a third vector of output signals. The third vector may be based on a third plurality of output signals that may be received from the second communication device based on the projected signal. The shaped signal may be based on a fourth vector of output signals. The fourth vector may be based on a fourth plurality of output signals that may be received from the second communication device based on the first signal.

In Example 177, the subject matter of Example 176 can optionally include that the method may further include transmitting signals based on a plurality of antennas. The signals of the first vector may be transmitted based on the antennas of the plurality of antennas, respectively. The signals of the second vector may be transmitted based on the antennas of the plurality of antennas, respectively.

In Example 178, the subject matter of any one of Examples 176 to 177 can optionally include that the method may further include determining the first vector such that a first absolute value of a first scalar product of the first vector and the third vector is smaller than a second absolute value of a second scalar product of the second vector and the fourth vector.

Example 179 is a communication device. The communication device may include a receiver configured to receive a received signal transmitted by another communication device. Further, the communication device may include a filter configured to filter the received signal to thereby generate a shaped signal. Further, the communication device may include a circuit configured to determine a filter characteristic vector provided to filter the received signal. Further, the communication device may include a transmitter configured to transmit the information representative of the determined filter characteristic vector to the other communication device.

In Example 180, the subject matter of Example 179 can optionally include that the receiver may be a multiple input multiple output receiver.

In Example 181, the subject matter of any one of Examples 179 to 180 can optionally include that the filter may be configured to filter the received signal in accordance with a maximal ratio combining.

Example 182 is a method of operating a communication device. The method may include receiving a received signal transmitted by another communication device. The method may further include filtering the received signal to thereby generate a shaped signal. The method may further include determining a filter characteristic vector provided to filter the received signal. The method may further include transmitting the information representative of the determined filter characteristic vector to the other communication device.

In Example 183, the subject matter of Example 182 can optionally include that the received signal may be received by a multiple input multiple output receiver.

In Example 184, the subject matter of any one of Examples 182 to 183 can optionally include that the received signal may be filtered in accordance with a maximal ratio combining.

In Example 185, the subject matter of any one of Examples 1 to 83 and 179 to 181 can optionally include that the circuit is a baseband circuit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
    a transmitter configured to transmit a first signal, a third signal and a projected signal; and
    a circuit configured to determine the projected signal based on an estimated signal state information such that an energy of a shaped projected signal is smaller than an energy of a shaped signal,
        wherein a signal state information is based on the first signal and a second received signal that is received by a receiver of a second communication device,
        wherein the estimated signal state information is determined based on an interpolation of a first received signal that is received by a first communication device and a third received signal that is received by a third communication device,
        wherein the first received signal is received based on the first signal,
        wherein the third received signal is received based on the third signal,
        wherein the estimated signal state information is an estimate of the signal state information,
        wherein the shaped projected signal is the projected signal received by the receiver of the second communication device and filtered by a filter of the second communication device,
        wherein the shaped signal is the second received signal filtered by the filter of the second communication device.

2. The communication device of claim 1,
    wherein the projected signal is determined in accordance with a Multiple Input Multiple Output communication technology.

3. The communication device of claim 2,
    wherein the projected signal is based on a first vector of input signals,
    wherein the first vector is based on a first plurality of input signals,
    wherein the first signal is based on a second vector of input signals, and
    wherein the second vector is based on a second plurality of input signals.

4. The communication device of claim 3,
    wherein the shaped projected signal is based on a third vector of output signals,
    wherein the third vector is based on a third plurality of output signals that are received by the receiver of the second communication device based on the projected signal,
    wherein the shaped signal is based on a fourth vector of output signals, and
    wherein the fourth vector is based on a fourth plurality of output signals that are received by the receiver of the second communication device based on the first signal.

5. The communication device of claim 4,
    wherein the transmitter is configured to transmit signals based on a plurality of antennas,
    wherein the signals of the first vector are transmitted based on the antennas of the plurality of antennas, respectively, and
    wherein the signals of the second vector are transmitted based on the antennas of the plurality of antennas, respectively.

6. The communication device of claim 5,
    wherein the circuit is configured to determine the first vector such that a first absolute value of a first scalar product of the first vector and the third vector is smaller than a second absolute value of a second scalar product of the second vector and the fourth vector.

7. The communication device of claim 1,
    wherein a second signal state information is based on a third signal that is transmitted from a fourth communication device and a received third signal that is received by the receiver of the second communication device,
    wherein the second signal state information is an estimate of a channel state information,
    wherein the filter is configured to filter based on the channel state information,
    wherein the circuit is configured to determine the projected signal based on an estimated linear process,
    wherein the circuit is configured to determine the estimated linear process based on the estimated signal state information and an estimated second signal state information such that the estimated linear process is an estimate of a linear process,
    wherein the linear process is based on the signal state information and the second signal state information, and
    wherein the estimated second signal state information is an estimate of the second signal state information.

8. The communication device of claim 7,
    wherein a first vector is determined such that the first vector is a sum of first eigenvectors based on the estimated linear process,
    wherein a second vector is a sum of second eigenvectors based on the estimated linear process, and
    wherein eigenvalues of the first eigenvectors based on the estimated linear process are smaller than a smallest eigenvalue of eigenvalues of the second eigenvectors based on the estimated linear process.

9. The communication device of claim 8,
    wherein the receiver is configured to receive signals based on a frequency of signals that are transmitted from the second communication device based on a shared frequency, and
    wherein the projected signal is based on the shared frequency.

10. The communication device of claim 9,
    wherein the circuit is configured to select the first communication device from a plurality of communication devices such that a distance of the first communication device from the second communication device is a smallest distance from the distances of the communication devices of the plurality of communication devices from the second communication device.

11. The communication device of claim 10,
    wherein the signal state information is based on a first linear transfer function that maps the first signal to the second received signal.

12. The communication device of claim 11,
    wherein the filter is configured to filter based on maximal ratio combining.

13. A communication device, comprising:
    a receiver configured to receive signals from a first communication device, wherein one or more of the received signals from the first communication device comprises a location information of a second communication device;
    a circuit configured to determine a formed signal based on the location information of the second communication device such that a received second energy based on the formed signal that is received by the second communication device is smaller than a received first energy based on the formed signal that is received by the first communication device; and a transmitter configured to transmit signals in a plurality of sectors of an angular transmission distribution, wherein the second communication device is in a first sector of the plurality of sectors, and wherein the formed signal is determined such that a power of the formed signal that is transmitted in the first sector is smaller than powers of the formed signal that are transmitted in sectors of the plurality of sectors other than the first sector.

14. The communication device of claim 13, wherein the circuit is configured to determine signals based on a third frequency that is different from a shared frequency and/or a second frequency, and wherein the transmitter is configured to transmit the signals to communication devices that are located in the first sector.

15. The communication device of claim 13, further comprising:

the transmitter configured to transmit a first signal and the formed signal, wherein the circuit is configured to determine an estimated signal state information, wherein the estimated signal state information is an estimate of a signal state information based on a received signal that is received by a receiver of the second communication device based on the first signal, wherein the formed signal is determined based on the estimated signal state information such that an energy of a shaped formed signal is smaller than an energy of a shaped signal, wherein the shaped formed signal is the formed signal received by the receiver of the second communication device and filtered by a filter of the second communication device, and wherein the shaped signal is the received signal filtered by the filter of the second communication device.

16. A method for radio communications, comprising:

transmitting a first signal, a third signal and a projected signal; and determining the projected signal based on an estimated signal state information such that an energy of a shaped projected signal is smaller than an energy of a shaped signal, wherein a signal state information is based on the first signal and a second received signal that is received by a receiver of a second communication device, wherein the estimated signal state information is determined based on an interpolation of a first received signal that is received by a first communication device and a third received signal that is received by a third communication device, wherein the first received signal is received based on the first signal, wherein the third received signal is received based on the third signal, wherein the estimated signal state information is an estimate of the signal state information, wherein the shaped projected signal is the projected signal received by the receiver of the second communication device and filtered by a filter of the second communication device, and wherein the shaped signal is the second received signal filtered by the filter of the second communication device.

17. The method of claim 16, further comprising:

wherein the projected signal is determined in accordance with a Multiple Input Multiple Output communication technology.

18. The method of claim 17, wherein a second signal state information is based on a third signal that is transmitted from a fourth communication device and a received third signal that is received by the receiver of the second communication device, wherein the second signal state information is an estimate of a channel state information, wherein the filter is configured to filter based on the channel state information, determining the projected signal based on an estimated linear process, determining the estimated linear process based on the estimated signal state information and an estimated second signal state information such that the estimated linear process is an estimate of a linear process, wherein the linear process is based on the signal state information and the second signal state information, and wherein the estimated second signal state information is an estimate of the second signal state information.

* * * * *